United States Patent
Wu

(10) Patent No.: US 10,362,057 B1
(45) Date of Patent: Jul. 23, 2019

(54) ENTERPRISE DNS ANALYSIS

(71) Applicant: Acalvio Technologies, Inc., Cupertino, CA (US)

(72) Inventor: Erik Wu, Marietta, GA (US)

(73) Assignee: Acalvio Technologies, Inc., Cupertino, CA (US)

( * ) Notice: Subject to any disclaimer, the term of this patent is extended or adjusted under 35 U.S.C. 154(b) by 152 days.

(21) Appl. No.: 15/615,403

(22) Filed: Jun. 6, 2017

(51) Int. Cl.
H04L 29/06 (2006.01)

(52) U.S. Cl.
CPC ...... H04L 63/1491 (2013.01); H04L 63/1408 (2013.01)

(58) Field of Classification Search
CPC .................. H04L 63/1491; H04L 63/1408
See application file for complete search history.

(56) References Cited

U.S. PATENT DOCUMENTS

| | | | |
|---|---|---|---|
| 7,559,086 B2 | 7/2009 | Sobko | |
| 8,806,647 B1 | 8/2014 | Daswani | |
| 9,158,915 B1 | 10/2015 | Yumer et al. | |
| 9,325,735 B1 | 4/2016 | Xie et al. | |
| 9,495,188 B1 | 11/2016 | Ettema et al. | |
| 2002/0066034 A1 | 5/2002 | Schlossberg et al. | |
| 2003/0028803 A1 | 2/2003 | Bunker et al. | |
| 2008/0155694 A1* | 6/2008 | Kwon | H04L 29/12066 726/23 |
| 2009/0199265 A1 | 8/2009 | Hudis et al. | |
| 2012/0047173 A1* | 2/2012 | Thomas | G06F 21/552 707/777 |
| 2013/0145465 A1 | 6/2013 | Wang et al. | |
| 2014/0137180 A1 | 5/2014 | Lukacs | |
| 2014/0181966 A1 | 6/2014 | Carney et al. | |
| 2015/0156214 A1 | 6/2015 | Kaminsky | |
| 2015/0195299 A1* | 7/2015 | Zoldi | H04L 63/1433 726/25 |

(Continued)

FOREIGN PATENT DOCUMENTS

| | | |
|---|---|---|
| EP | 2 942 919 A1 | 11/2015 |
| WO | 2015/127472 A2 | 8/2015 |
| WO | 2017131963 A1 | 8/2017 |

OTHER PUBLICATIONS

U.S. Appl. No. 15/404,434, filed Jan. 12, 2017, Non-Final Office Action dated Dec. 28, 2017, all pages.

(Continued)

Primary Examiner — Ghodrat Jamshidi
(74) Attorney, Agent, or Firm — Kilpatrick Townsend & Stockton LLP

(57) ABSTRACT

Provided are methods, network devices, and computer-program products for a domain name system (DNS) threat detection engine for analyzing DNS traffic for potential threats. In various implementations, the DNS threat detection engine can include threat profiles that include characteristics of network threats associated with DNS. When a DNS message includes a characteristic associated with a particular threat profile, a remediation rule associated with the threat profile can be used to modify the DNS message, including modifying the destination for the DNS message. When the DNS message is received at the new destination, the DNS message can be analyzed to determine whether the DNS message is associated with a threat to the network.

20 Claims, 36 Drawing Sheets

(56) References Cited

U.S. PATENT DOCUMENTS

| | | | |
|---|---|---|---|
| 2016/0021056 A1* | 1/2016 | Chesla | H04L 63/02 |
| | | | 726/11 |
| 2016/0094566 A1 | 3/2016 | Parekh | |
| 2016/0112440 A1* | 4/2016 | Kolton | G06F 21/567 |
| | | | 726/1 |
| 2016/0192199 A1* | 6/2016 | Alvarez Dominguez | |
| | | | H04L 63/1408 |
| | | | 455/410 |
| 2017/0032147 A1* | 2/2017 | Denner | G06F 21/6263 |
| 2017/0171244 A1 | 6/2017 | Vissamsetty et al. | |
| 2017/0323102 A1* | 11/2017 | Manadhata | H04L 61/1511 |
| 2018/0103064 A1* | 4/2018 | Ahuja | H04L 63/20 |
| 2018/0139229 A1* | 5/2018 | Osterweil | H04L 63/1458 |
| 2018/0336353 A1* | 11/2018 | Manadhata | G06F 21/577 |

OTHER PUBLICATIONS

U.S. Appl. No. 15/404,693, filed Jan. 12, 2017, Final Office Action dated Nov. 24, 2017, all pages.

PCT/US2017/013190 received an International Search and Written Opinion Report dated Apr. 20, 2017, all pages.

U.S. Appl. No. 15/404,434 received a First Action Interview Pilot Program Pre-Interview Communication, dated Feb. 23, 2017, all pages.

U.S. Appl. No. 15/404,434 received a Final Office Action, dated Jul. 31, 2017, all pages.

U.S. Appl. No. 15/404,693 received a Non-Final Office Action, dated Mar. 24, 2017, all pages.

U.S. Appl. No. 15/404,693, filed Jan. 12, 2017, Non-Final Office Action dated Jun. 15, 2018, all pages.

U.S. Appl. No. 15/404,788, filed Jan. 12, 2017, Non-Final Office Action dated Aug. 28, 2018, all pages.

* cited by examiner

ENTERPRISE DNS ANALYSIS

CROSS REFERENCES TO RELATED APPLICATIONS

This application claims the benefit of U.S. Provisional Application No. 63/345,976 on Jun. 6, 2016, which is incorporated herein by reference in its entirety.

BRIEF SUMMARY

The Domain Name System (DNS) is the Internet's equivalent to a phone book. DNS servers maintain a directory of domain names, and can translate domain names to Internet Protocol (IP) addresses. DNS requests and responses are one of the few types of network traffic that can pass through enterprise firewalls and other network security infrastructure with little scrutiny. DNS traffic can thus be used to tunnel malicious programs, data, and/or protocols into an enterprise network.

Provided are methods, network devices, and computer-program products for detecting a network threat perpetrated through the Domain Name Service (DNS). DNS provides translation between textual representations of network domains, such as "www.home.com," with network addresses. Character strings are easier for humans to use and remember, but computing systems can operate more efficiently using network addresses. Because DNS is fairly ubiquitous, DNS message often pass through network security infrastructure with little scrutiny.

In various implementations, a network device that includes a DNS threat detection engine can be used to analyze DNS network traffic for potential threats. In various implementations, the network device can be configured to receive a DNS message. The DNS threat detection engine can include one or more threat profiles, where a threat profile includes one or more characteristics of a network threat associated with DNS. A threat profile can be associated with a remediation rule. The network device can further be configured to determine that the DNS message includes a characteristic associated with a particular threat profile from the one or more threat profiles. The network device can further be configured to determining a new destination for the DNS message. The new destination can be determined using a remediation rule associated with the particular threat profile. The network device can further be configured to modify the DNS message, where modifying includes changing an original destination for the DNS message to the new destination. The network device can further be configured to transmit the modified DNS message, where, when the modified DNS message is received at the new destination, the modified DNS message is analyzed to determine whether the DNS message is associated with a threat to the network.

In various implementations, the new destination includes a high-interaction network. In various implementations, the new destination includes a decoy DNS server.

In various implementations, the network device can further be configured to configure a new deception mechanism, where configuring includes using the characteristic associated with the particular threat profile. The network device can then deploy the new deception mechanism on the network.

In various implementations, the network device can further be configured to configure a new deception mechanism, where configuring includes using the particular threat profile. The network device can then deploy the new deception mechanism on the network.

In various implementations, the network device can further be configured to identify a domain name associated with the DNS message, and determine that the domain name does not exist in the network.

In various implementations, the DNS message is received from a source outside the network. In various implementations, the DNS message is received from a source inside the network. In various implementations, the original destination for the DNS message is a DNS server in the network.

BRIEF DESCRIPTION OF THE DRAWINGS

Illustrative embodiments are described in detail below with reference to the following figures.

DETAILED DESCRIPTION

Figure 1:
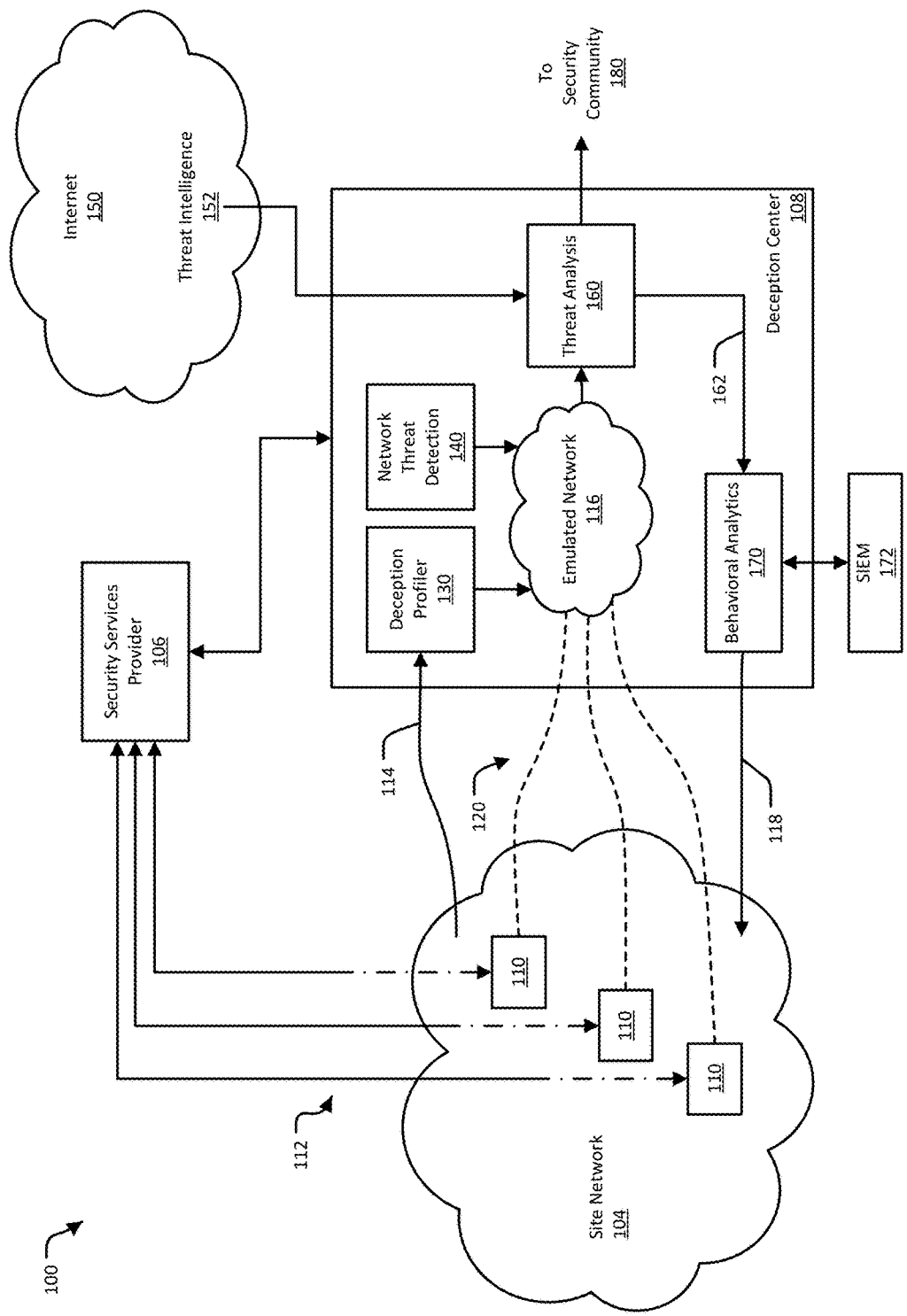
FIG. 1 illustrates an example of a network threat detection and analysis system, in which various implementations of a deception-based security system can be used.

Network deception mechanisms, often referred to as "honeypots," "honey tokens," and "honey nets," among others, defend a network from threats by distracting or diverting the threat. Honeypot-type deception mechanisms can be installed in a network for a particular site, such as a business office, to act as decoys in the site's network. Honeypot-type deception mechanisms are typically configured to be indistinguishable from active, production systems in the network. Additionally, such deception mechanisms are typically configured to be attractive to a network threat by having seemingly valuable data and/or by appearing vulnerable to infiltration. Though these deception mechanisms can be indistinguishable from legitimate parts of the site network, deception mechanisms are not part of the normal operation of the network, and would not be accessed during normal, legitimate use of the site network. Because normal users of the site network would not normally use or access a deception mechanism, any use or access to the deception mechanism is suspected to be a threat to the network.

"Normal" operation of a network generally includes network activity that conforms with the intended purpose of a network. For example, normal or legitimate network activity can include the operation of a business, medical facility, government office, education institution, or the ordinary network activity of a private home. Normal network activity can also include the non-business-related, casual activity of users of a network, such as accessing personal email and visiting websites on personal time, or using network resources for personal use. Normal activity can also include the operations of network security devices, such as firewalls, anti-virus tools, intrusion detection systems, intrusion protection systems, email filters, adware blockers, and so on. Normal operations, however, exclude deceptions mechanisms, in that deception mechanisms are not intended to take part in business operations or casual use. As such, network users and network systems do not normally access deceptions mechanisms except perhaps for the most routine network administrative tasks. Access to a deception mechanism, other than entirely routine network administration, may thus indicate a threat to the network.

Threats to a network can include active attacks, where an attacker interacts or engages with systems in the network to steal information or do harm to the network. An attacker may be a person, or may be an automated system. Examples of active attacks include denial of service (DoS) attacks, distributed denial of service (DDoS) attacks, spoofing attacks, "man-in-the-middle" attacks, attacks involving malformed network requests (e.g. Address Resolution Protocol (ARP) poisoning, "ping of death," etc.), buffer, heap, or stack overflow attacks, and format string attacks, among others. Threats to a network can also include self-driven, self-replicating, and/or self-triggering malicious software. Malicious software can appear innocuous until activated, upon which the malicious software may attempt to steal information from a network and/or do harm to the network. Malicious software is typically designed to spread itself to other systems in a network. Examples of malicious software include ransomware, viruses, worms, Trojan horses, spyware, keyloggers, rootkits, and rogue security software, among others.

The Domain Name system (DNS) is a protocol that network devices use to exchange information about how to locate each other. A network typically has a DNS server, or has access to a DNS server, whose primary task is to translate domain names into Internet Protocol (IP) addresses. A domain name is the name of a network or a location on the Internet. For example, google.com is the domain name of website search engine Google®. Domain names are typically character strings that are easy for humans to read and remember. Network devices, however, work more efficiently with numbers, and typically use IP addresses to route network traffic. An IP address is a combination of characters that informs a network device where to find a domain or a specific network device. For example, an Internet Protocol version 4 (IPv4) IP address may look like 1.160.10.240 and an Internet Protocol version 6 (IPv6) IP address may look like 3ffe:1900:4545:3:200:f8ff:fe21:67cf.

DNS is how networks manage the billions of possible IP addresses in use across the Internet. When a user accesses a domain for the first time, the user's computer will ask the nearest DNS server for the IP address of the domain. The nearest DNS server may be in the same local area network (LAN) as the user's computer, or may be at the user's Internet Service Provider (ISP). If the nearest DNS server knows the IP address of the domain, this server will provide the IP address to the user's computer. If the nearest DNS server does not know the IP address, this server will ask one or more next nearest DNS servers. The user's DNS request will thus be forwarded from one DNS server to another until one is found that has the IP address for the domain name. In some cases, the response containing the IP address is returned directly to the user's computer, while in other cases the response follows the route of the request from one DNS server to another. This process, by which the user's computer obtains the IP address of a domain name, is often referred to as domain name resolution, DNS resolution, or DNS lookup.

Having now acquired the IP address of the domain, the user's computer can store an association between the domain name and the IP address. Should the user visit the domain again, the user's computer thus need not ask the DNS system for the IP address a second time. The nearest DNS server, as well as any other DNS server that was involved in the domain name resolution process, may also store the association between the domain name and the IP address. In this way, DNS servers learn domain names and IP addresses. Domain names and associated IP addresses typically also "age out" over time, so that domain names that are not accessed for some time are removed from a DNS server. This way, infrequently visited domains and domains that have been removed from the Internet are forgotten, and the finite memory of a DNS server can be used to store more frequently accessed domain names.

The above discussion describes a basic outbound DNS request, that is, a request for the IP address of a domain that is outside of a user's own domain. An inbound request occurs when a domain name resolution request is received by a DNS server that may know the IP address for the requested domain name, or is able to provide it. This may occur, for example, when a user outside of a customer network has requested access to a domain hosted by the customer network. The customer network may include a DNS server that is configured with the domain names and associated IP addresses used by the customer network. This DNS server may provide the IP address for the requested domain name. Alternative or additionally, the customer network's ISP may have a DNS server that is configured with the domain names and associated IP addresses of the customer network.

The ubiquitous and essential nature of DNS means that DNS can be used to perpetrate harm to a network. DNS requests and replies are one of the few types of network traffic that can pass through an enterprise firewall or other network security infrastructure with minimal scrutiny. Malicious programs, data, and/or protocols can be attached to DNS traffic, and thus bypass an enterprise network's security perimeter. Once inside, the perimeter, the malicious programs, data, and/or protocols can cause harm to the network.

In various implementations, a DNS threat detection engine is provided that can monitor a network for threats perpetrated through the DNS protocol. In various implementations, the DNS threat detection engine can monitor, analyze and control DNS traffic into and out of an enterprise network. Alternatively or additionally, in some implementations, the DNS threat detection engine can also monitor DNS traffic that is internal to the network. In various implementations, the DNS threat detection engine can also monitor any traffic that uses network port 53, which is designated in both the Transmission Control Protocol (TCP) and User Datagram Protocol (UDP) for DNS traffic.

When a potential threat is detected among DNS network traffic, in various implementations, the questionable traffic can analyzed further. For example, in various implementations, the questionable DNS traffic can be directed to a high-interaction network. A high-interaction network is a closely monitored, isolated network that is made to appear and act just like a customer site's network. Within the high-interaction network, the DNS traffic can be allowed to interact with DNS servers and other systems, to determine what harm, if any, the DNS traffic can cause. The behavior of the DNS traffic can be recorded, and indicators can be generated that can describe the behavior. These indicators can then be used to modify the security for the network. Alternatively or additionally, the indicators can be used to identify systems in the network that have already been compromised.

I. Deception-Based Security Systems

FIG. 1 illustrates an example of a network threat detection and analysis system 100, in which various implementations of a deception-based security system can be used. The network threat detection and analysis system 100, or, more briefly, network security system 100, provides security for a site network 104 using deceptive security mechanisms, a variety of which may be called "honeypots." The deceptive security mechanisms may be controlled by and inserted into the site network 104 using a deception center 108 and sensors 110, which may also be referred to as deception sensors, installed in the site network 104. In some implementations, the deception center 108 and the sensors 110 interact with a security services provider 106 located outside of the site network 104. The deception center 108 may also obtain or exchange data with sources located on the Internet 150.

Security mechanisms designed to deceive, sometimes referred to as "honeypots," may also be used as traps to divert and/or deflect unauthorized use of a network away from the real network assets. A deception-based security mechanism may be a computer attached to the network, a process running on one or more network systems, and/or some other device connected to the network. A security mechanism may be configured to offer services, real or emulated, to serve as bait for an attack on the network. Deception-based security mechanisms that take the form of data, which may be called "honey tokens," may be mixed in with real data in devices in the network. Alternatively or additionally, emulated data may also be provided by emulated systems or services.

Deceptive security mechanisms can also be used to detect an attack on the network. Deceptive security mechanisms are generally configured to appear as if they are legitimate parts of a network. These security mechanisms, however, are not, in fact, part of the normal operation of the network. Consequently, normal activity on the network is not likely to access the security mechanisms. Thus any access over the network to the security mechanism is automatically suspect.

The network security system 100 may deploy deceptive security mechanisms in a targeted and dynamic fashion. Using the deception center 108 the system 100 can scan the site network 104 and determine the topology of the site network 104. The deception center 108 may then determine devices to emulate with security mechanisms, including the type and behavior of the device. The security mechanisms may be selected and configured specifically to attract the attention of network attackers. The security mechanisms may also be selected and deployed based on suspicious activity in the network. Security mechanisms may be deployed, removed, modified, or replaced in response to activity in the network, to divert and isolate network activity related to an apparent attack, and to confirm that the network activity is, in fact, part of a real attack.

The site network 104 is a network that may be installed among the buildings of a large business, in the office of a small business, at a school campus, at a hospital, at a government facility, or in a private home. The site network 104 may be described as a local area network (LAN) or a group of LANS. The site network 104 may be one site belonging to an organization that has multiple site networks 104 in one or many geographical locations. In some implementations, the deception center 108 may provide network security to one site network 104, or to multiple site networks 104 belonging to the same entity.

The site network 104 is where the networking devices and users of the an organizations network may be found. The site network 104 may include network infrastructure devices, such as routers, switches hubs, repeaters, wireless base stations, and/or network controllers, among others. The site network 104 may also include computing systems, such as servers, desktop computers, laptop computers, tablet computers, personal digital assistants, and smart phones, among others. The site network 104 may also include other analog and digital electronics that have network interfaces, such as televisions, entertainment systems, thermostats, refrigerators, and so on.

The deception center 108 provides network security for the site network 104 (or multiple site networks for the same organization) by deploying security mechanisms into the site network 104, monitoring the site network 104 through the security mechanisms, detecting and redirecting apparent threats, and analyzing network activity resulting from the apparent threat. To provide security for the site network 104, in various implementations the deception center 108 may communicate with sensors 110 installed in the site network 104, using network tunnels 120. As described further below, the tunnels 120 may allow the deception center 108 to be located in a different sub-network ("subnet") than the site network 104, on a different network, or remote from the site network 104, with intermediate networks (possibly including the Internet 150) between the deception center 108 and the site network 104.

In some implementations, the network security system 100 includes a security services provider 106. In these implementations, the security services provider 106 may act as a central hub for providing security to multiple site networks, possibly including site networks controlled by different organizations. For example, the security services provider 106 may communicate with multiple deception centers 108 that each provide security for a different site network 104 for the same organization. In some implementations, the security services provider 106 is located outside the site network 104. In some implementations, the security services provider 106 is controlled by a different entity than the entity that controls the site network. For example, the security services provider 106 may be an outside vendor. In some implementations, the security services provider 106 is controlled by the same entity as that controls the site network 104.

In some implementations, when the network security system 100 includes a security services provider 106, the sensors 110 and the deception center 108 may communicate with the security services provider 106 in order to be connected to each other. For example, the sensors 110, which may also be referred to as deception sensors, may, upon powering on in the site network 104, send information over a network connection 112 to the security services provider 106, identifying themselves and the site network 104 in which they are located. The security services provider 106 may further identify a corresponding deception center 108 for the site network 104. The security services provider 106 may then provide the network location of the deception center 108 to the sensors 110, and may provide the deception center 108 with the network location of the sensors 110. A network location may take the form of, for example, an Internet Protocol (IP) address. With this information, the deception center 108 and the sensors 110 may be able to configure tunnels 120 to communicate with each other.

In some implementations, the network security system 100 does not include a security services provider 106. In these implementations, the sensors 110 and the deception center 108 may be configured to locate each other by, for example, sending packets that each can recognize as coming for the other. Using these packets, the sensors 110 and deception center 108 may be able to learn their respective locations on the network. Alternatively or additionally, a network administrator can configure the sensors 110 with the network location of the deception center 108, and vice versa.

In various implementations, the sensors 110 are a minimal combination of hardware and/or software, sufficient to form a network connection with the site network 104 and a tunnel 120 with the deception center 108. For example, a sensor 110 may be constructed using a low-power processor, a network interface, and a simple operating system. In various implementations, the sensors 110 provide the deception center 108 with visibility into the site network 104, such as for example being able to operate as a node in the site network 104, and/or being able to present or project deceptive security mechanisms into the site network 104, as described further below. Additionally, in various implementations, the sensors 110 may provide a portal through which a suspected attack on the site network 104 can be redirected to the deception center 108, as is also described below.

In various implementations, the deception center 108 may be configured to profile the site network 104, deploy deceptive security mechanisms for the site network 104, detect suspected threats to the site network 104, analyze the suspected threat, and analyze the site network 104 for exposure and/or vulnerability to the supposed threat.

To provide the site network 104, the deception center 108 may include a deception profiler 130. In various implementations, the deception profiler may 130 derive information 114 from the site network 104, and determine, for example, the topology of the site network 104, the network devices included in the site network 104, the software and/or hardware configuration of each network device, and/or how the network is used at any given time. Using this information, the deception profiler 130 may determine one or more deceptive security mechanisms to deploy into the site network 104.

In various implementations, the deception profiler may configure an emulated network 116 to emulate one or more computing systems. Using the tunnels 120 and sensors 110, the emulated computing systems may be projected into the site network 104, where they serve as deceptions. The emulated computing systems may include address deceptions, low-interaction deceptions, and/or high-interaction deceptions. In some implementations, the emulated computing systems may be configured to resemble a portion of the network. In these implementations, this network portion may then be projected into the site network 104.

In various implementations, a network threat detection engine 140 may monitor activity in the emulated network 116, and look for attacks on the site network 104. For example, the network threat detection engine 140 may look for unexpected access to the emulated computing systems in the emulated network 116. The network threat detection engine 140 may also use information 114 extracted from the site network 104 to adjust the emulated network 116, in order to make the deceptions more attractive to an attack, and/or in response to network activity that appears to be an attack. Should the network threat detection engine 140 determine that an attack may be taking place, the network threat detection engine 140 may cause network activity related to the attack to be redirected to and contained within the emulated network 116.

In various implementations, the emulated network 116 is a self-contained, isolated, and closely monitored network, in which suspect network activity may be allowed to freely interact with emulated computing systems. In various implementations, questionable emails, files, and/or links may be released into the emulated network 116 to confirm that they are malicious, and/or to see what effect they have. Outside actors can also be allowed to access emulated system, steal data and user credentials, download malware, and conduct any other malicious activity. In this way, the emulated network 116 not only isolated a suspected attack from the site network 104, but can also be used to capture information about an attack. Any activity caused by suspect network activity may be captured in, for example, a history of sent and received network packets, log files, and memory snapshots.

In various implementations, activity captured in the emulated network 116 may be analyzed using a targeted threat analysis engine 160. The threat analysis engine 160 may examine data collected in the emulated network 116 and reconstruct the course of an attack. For example, the threat analysis engine 160 may correlate various events seen during the course of an apparent attack, including both malicious and innocuous events, and determine how an attacker infiltrated and caused harm in the emulated network 116. In some cases, the threat analysis engine 160 may use threat intelligence 152 from the Internet 150 to identify and/or analyze an attack contained in the emulated network 116. The threat analysis engine 160 may also confirm that suspect network activity was not an attack. The threat analysis engine 160 may produce indicators that describe the suspect network activity, including indicating whether the suspect activity was or was not an actual threat. The threat analysis engine 160 may share these indicators with the security community 180, so that other networks can be defended from the attack. The threat analysis engine 160 may also send the indicators to the security services provider 106, so that the security services provider 106 can use the indicators to defend other site networks.

In various implementations, the threat analysis engine 160 may also send threat indicators, or similar data, to a behavioral analytics engine 170. The behavioral analytics engine 170 may be configured to use the indicators to probe 118 the site network 104, and see whether the site network 104 has been exposed to the attack, or is vulnerable to the attack. For example, the behavioral analytics engine 170 may search the site network 104 for computing systems that resemble emulated computing systems in the emulated network 116 that were affected by the attack. In some implementations, the behavioral analytics engine 170 can also repair systems affected by the attack, or identify these systems to a network administrator. In some implementations, the behavioral analytics engine 170 can also reconfigure the site network's 104 security infrastructure to defend against the attack.

The behavioral analytics engine 170 can work in conjunction with a Security Information and Event Management (STEM) 172 system. In various implementations, STEM includes software and/or services that can provide real-time analysis of security alerts generates by network hardware and applications. In various implementations, the deception center 108 can communicate with the STEM 172 system to obtain information about computing and/or networking systems in the site network 104.

Using deceptive security mechanisms, the network security system 100 may thus be able to distract and divert attacks on the site network 104. The network security system 100 may also be able to allow, using the emulated network 116, and attack to proceed, so that as much can be learned about the attack as possible. Information about the attack can then be used to find vulnerabilities in the site network 104. Information about the attack can also be provided to the security community 180, so that the attack can be thwarted elsewhere.

II. Customer Installations

Figure 2A:
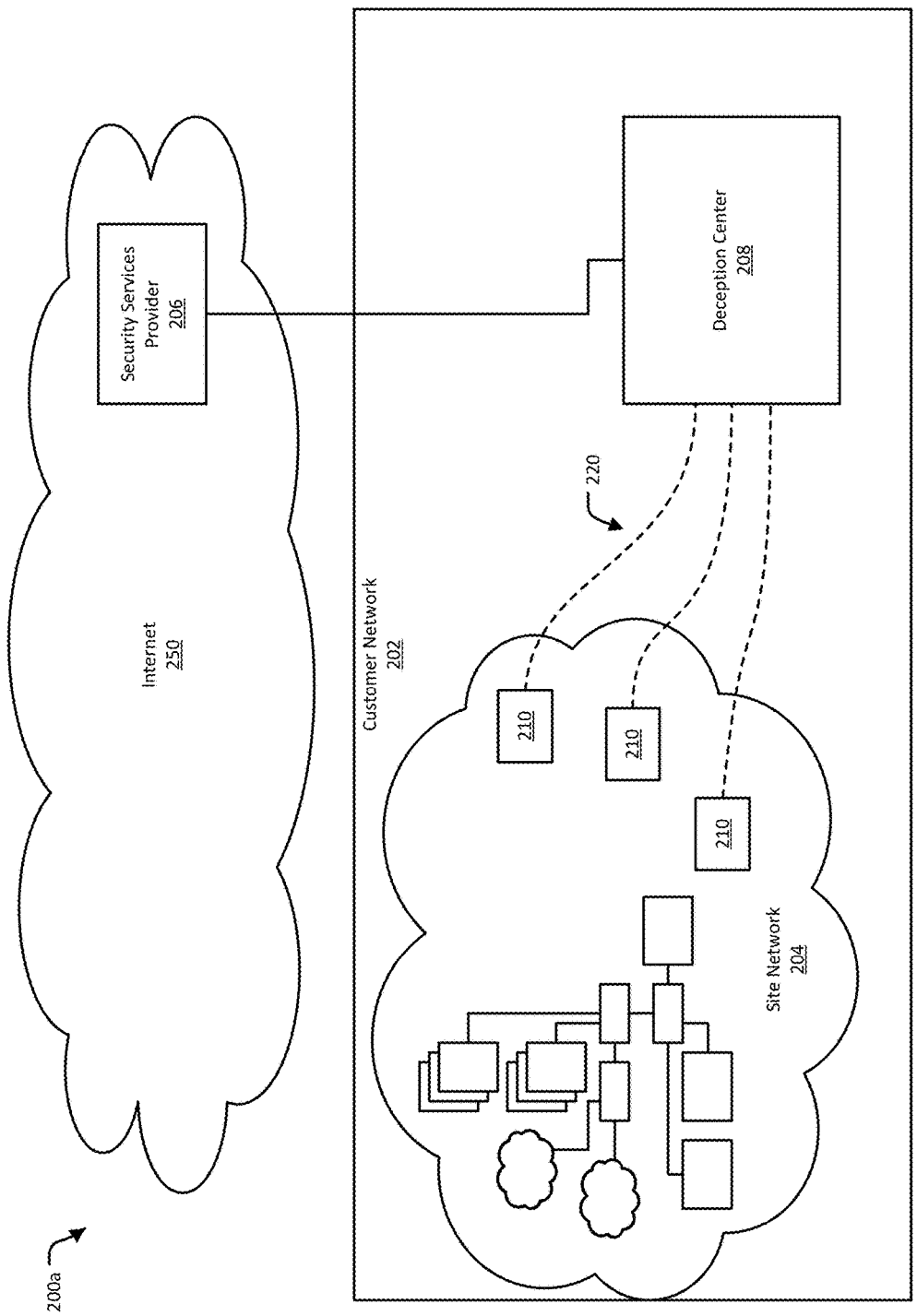
FIGS. 2A-2D provide examples of different installation configurations that can be used for different customer networks.
Figure 2B:
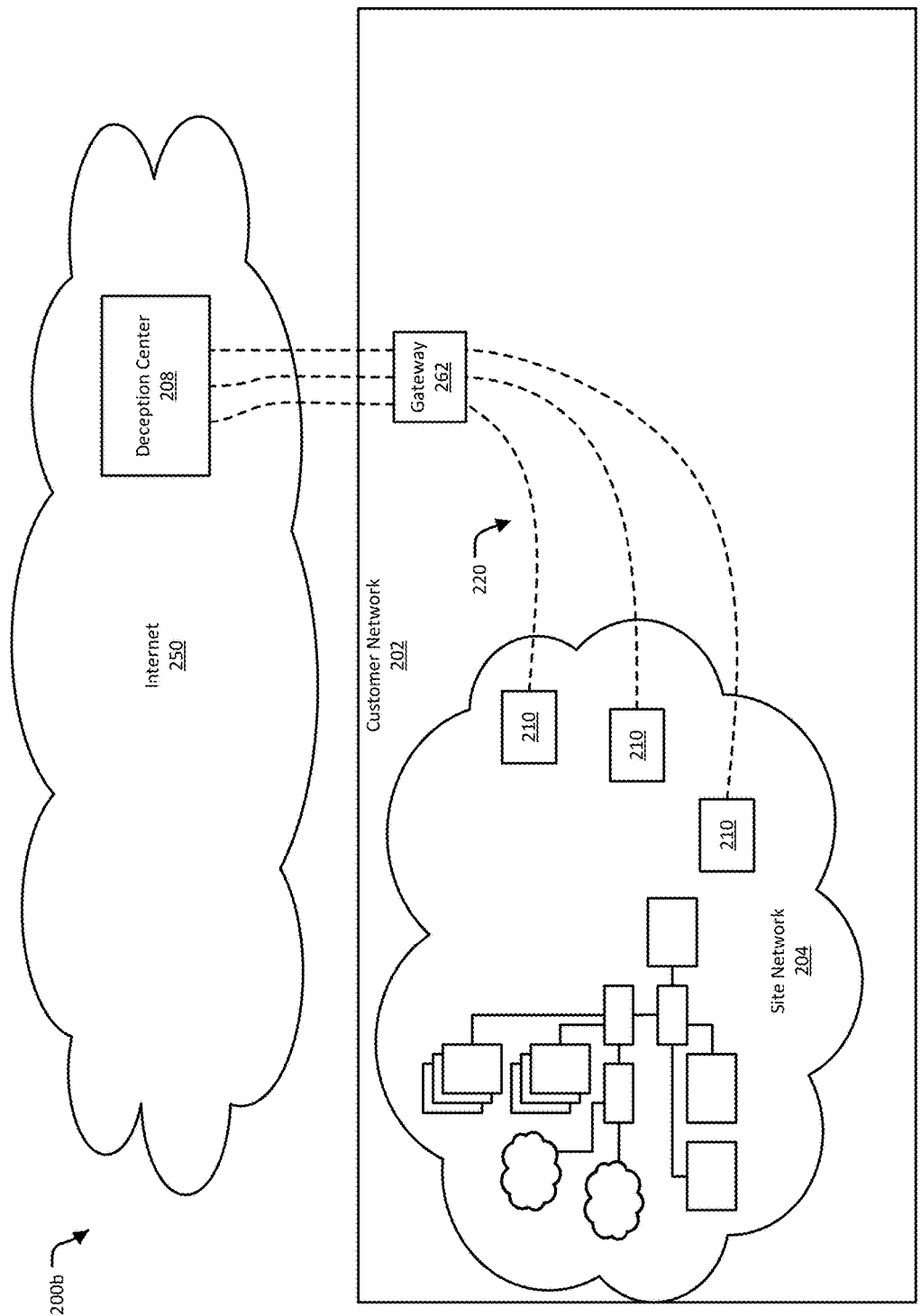
Figure 2C:
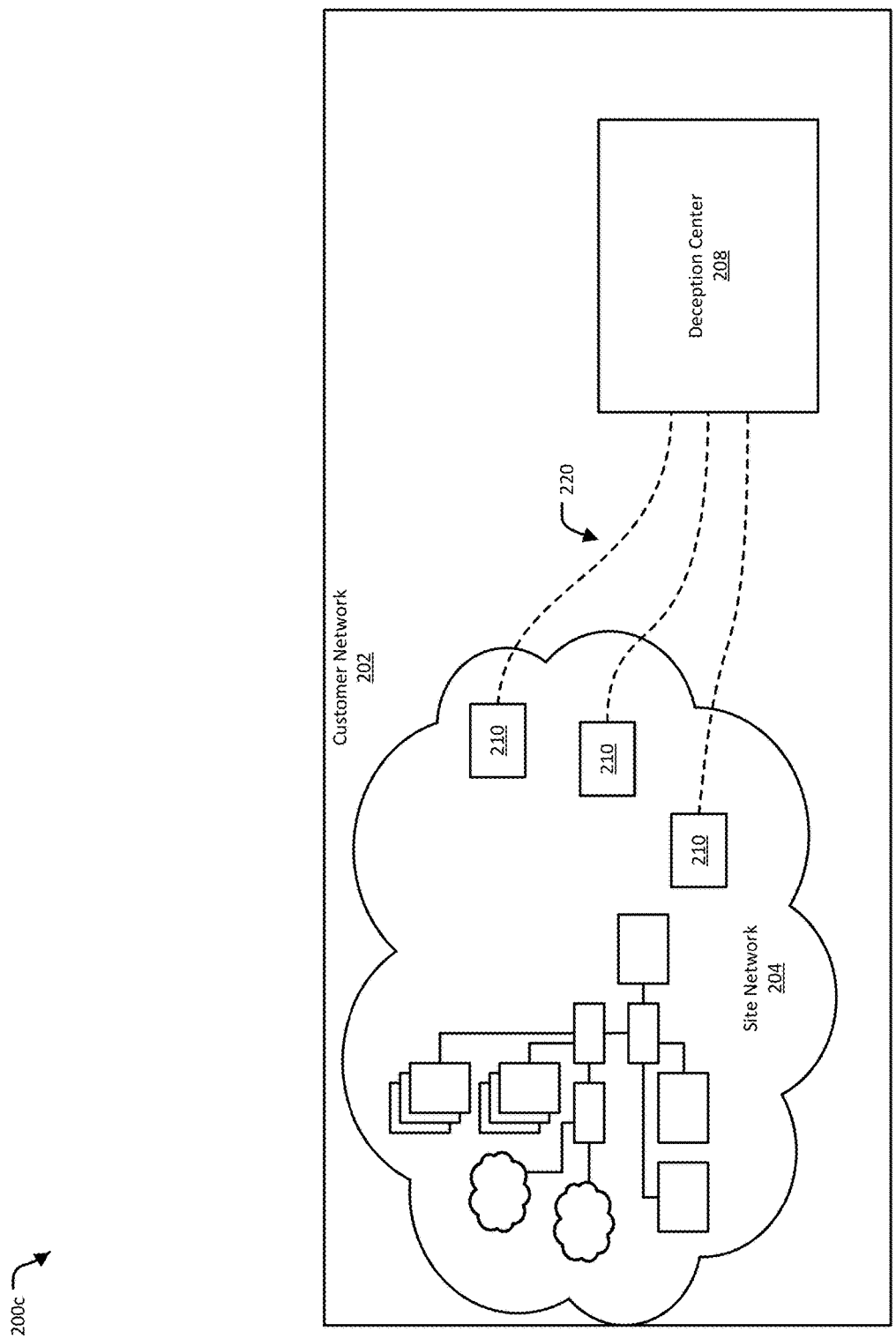

The network security system, such as the deception-based system described above, may be flexibly implemented to accommodate different customer networks. FIGS. 2A-2C provide examples of different installation configurations 200a-200c that can be used for different customer networks 202. A customer network 202 may generally be described as a network or group of networks that is controlled by a common entity, such as a business, a school, or a person. The customer network 202 may include one or more site networks 204. The customer network's 202 site networks 204 may be located in one geographic location, may be behind a common firewall, and/or may be multiple subnets within one network. Alternatively or additionally, a customer network's 202 site networks 204 may be located in different geographic locations, and be connected to each other over various private and public networks, including the Internet 250.

Different customer networks 202 may have different requirements regarding network security. For example, some customer networks 202 may have relatively open connections to outside networks such as the Internet 250, while other customer networks 202 have very restricted access to outside networks. The network security system described in FIG. 1 may be configurable to accommodate these variations.

FIG. 2A illustrates one example of an installation configuration 200a, where a deception center 208 is located within the customer network 202. In this example, being located within the customer network 202 means that the deception center 208 is connected to the customer network 202, and is able to function as a node in the customer network 202. In this example, the deception center 208 may be located in the same building or within the same campus as the site network 204. Alternatively or additionally, the deception center 208 may be located within the customer network 202 but at a different geographic location than the site network 204. The deception center 208 thus may be within the same subnet as the site network 204, or may be connected to a different subnet within the customer network.

In various implementations, the deception center 208 communicates with sensors 210, which may also be referred to as deception sensors, installed in the site network over network tunnels 220 In this example, the network tunnels 220 may cross one or more intermediate within the customer network 202.

In this example, the deception center 208 is able to communicate with a security services provider 206 that is located outside the customer network 202, such as on the Internet 250. The security services provider 206 may provide configuration and other information for the deception center 208. In some cases, the security services provider 206 may also assist in coordinating the security for the customer network 202 when the customer network 202 includes multiple site networks 204 located in various geographic areas.

FIG. 2B illustrates another example of an installation configuration 200b, where the deception center 208 is located outside the customer network 202. In this example, the deception center 208 may connected to the customer network 202 over the Internet 250. In some implementations, the deception center 208 may be co-located with a security services provider, and/or may be provided by the security services provider.

In this example, the tunnels 220 connect the deception center 208 to the sensors 210 through a gateway 262. A gateway is a point in a network that connects the network to another network. For example, in this example, the gateway 262 connects the customer network 202 to outside networks, such as the Internet 250. The gateway 262 may provide a firewall, which may provide some security for the customer network 202. The tunnels 220 may be able to pass through the firewall using a secure protocol, such as Secure Socket Shell (SSH) and similar protocols. Secure protocols typically require credentials, which may be provided by the operator of the customer network 202.

FIG. 2C illustrates another example of an installation configuration 200*c*, where the deception center 208 is located inside the customer network 202 but does not have access to outside networks. In some implementations, the customer network 202 may require a high level of network security. In these implementations, the customer network's 202 connections to the other networks may be very restricted. Thus, in this example, the deception center 208 is located within the customer network 202, and does not need to communicate with outside networks. The deception center 208 may use the customer networks 202 internal network to coordinate with and establish tunnels 220 to the sensors 210. Alternatively or additionally, a network administrator may configure the deception center 208 and sensors 210 to enable them to establish the tunnels 220.

Figure 2D:
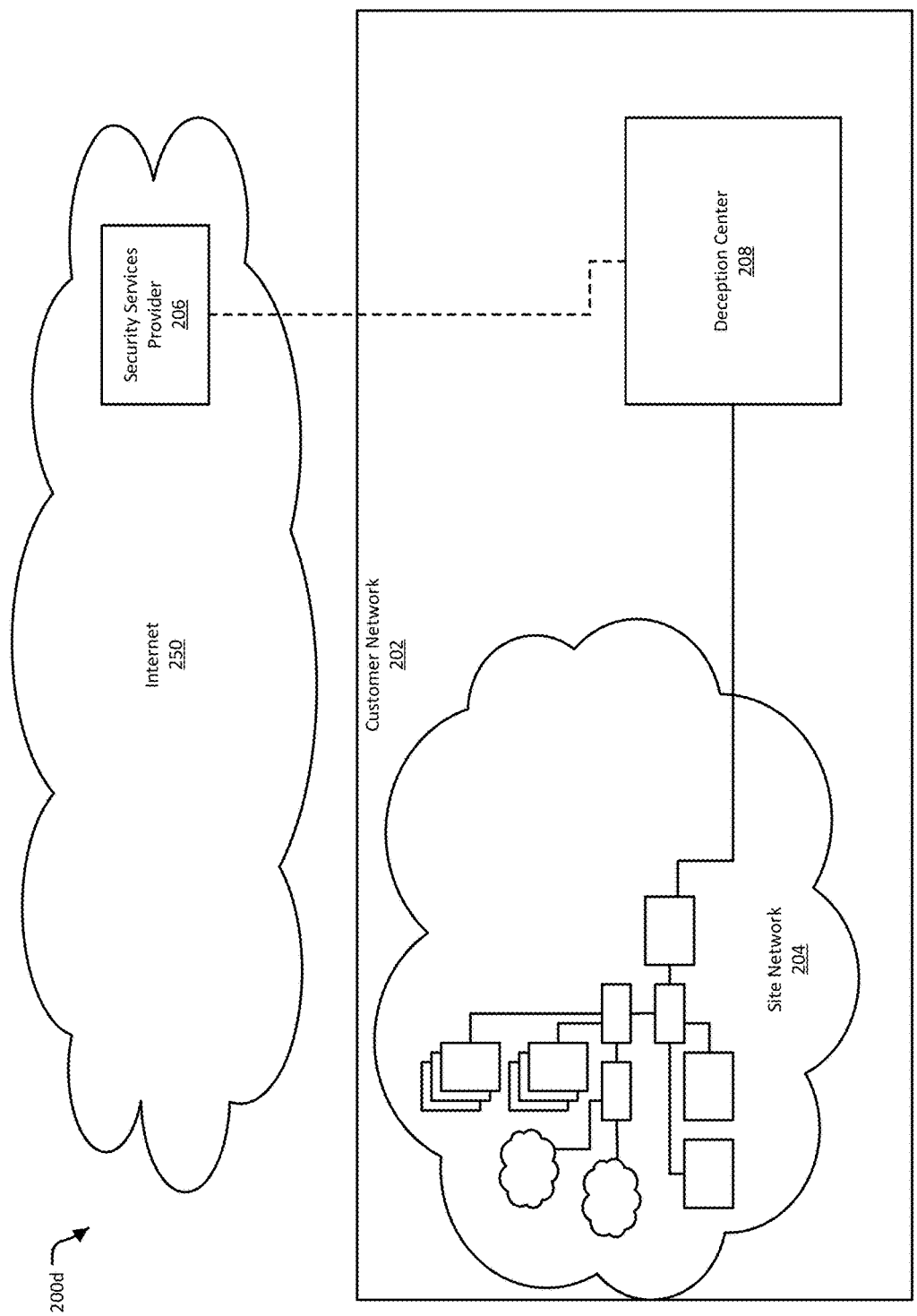

FIG. 2D illustrates another example of an installation configuration 200*d*. In this example, the deception center 208 is located inside the customer network 202, and further is directly connected to the site network 204. Directly connected, in this example, can mean that the deception center 208 is connected to a router, hub, switch, repeater, or other network infrastructure device that is part of the site network 204. Directly connected can alternatively or additionally mean that the deception center 208 is connected to the site network 204 using a Virtual Local Area Network (VLAN). For example, the deception center 208 can be connected to VLAN trunk port. In these examples, the deception center 208 can project deceptions into the site network 204 with or without the use of sensors, such as are illustrated in FIGS. 2A-2C.

In the example of FIG. 2D, the deception center 208 can also optionally be connected to an outside security services provider 206. The security services provider 206 can manage the deception center 208, including providing updated security data, sending firmware upgrades, and/or coordinating different deception centers 208 for different site networks 204 belonging to the same customer network 202. In some implementations, the deception center 208 can operate without the assistances of an outside security services provider 206.

III. Customer Networks

The network security system, such as the deception-based system discussed above, can be used for variety of customer networks. As noted above, customer networks can come in wide variety of configurations. For example, a customer network may have some of its network infrastructure "in the cloud." A customer network can also include a wide variety of devices, including what may be considered "traditional" network equipment, such as servers and routers, and non-traditional, "Internet-of-Things" devices, such as kitchen appliances. Other examples of customer networks include established industrial networks, or a mix of industrial networks and computer networks.

Figure 3A:
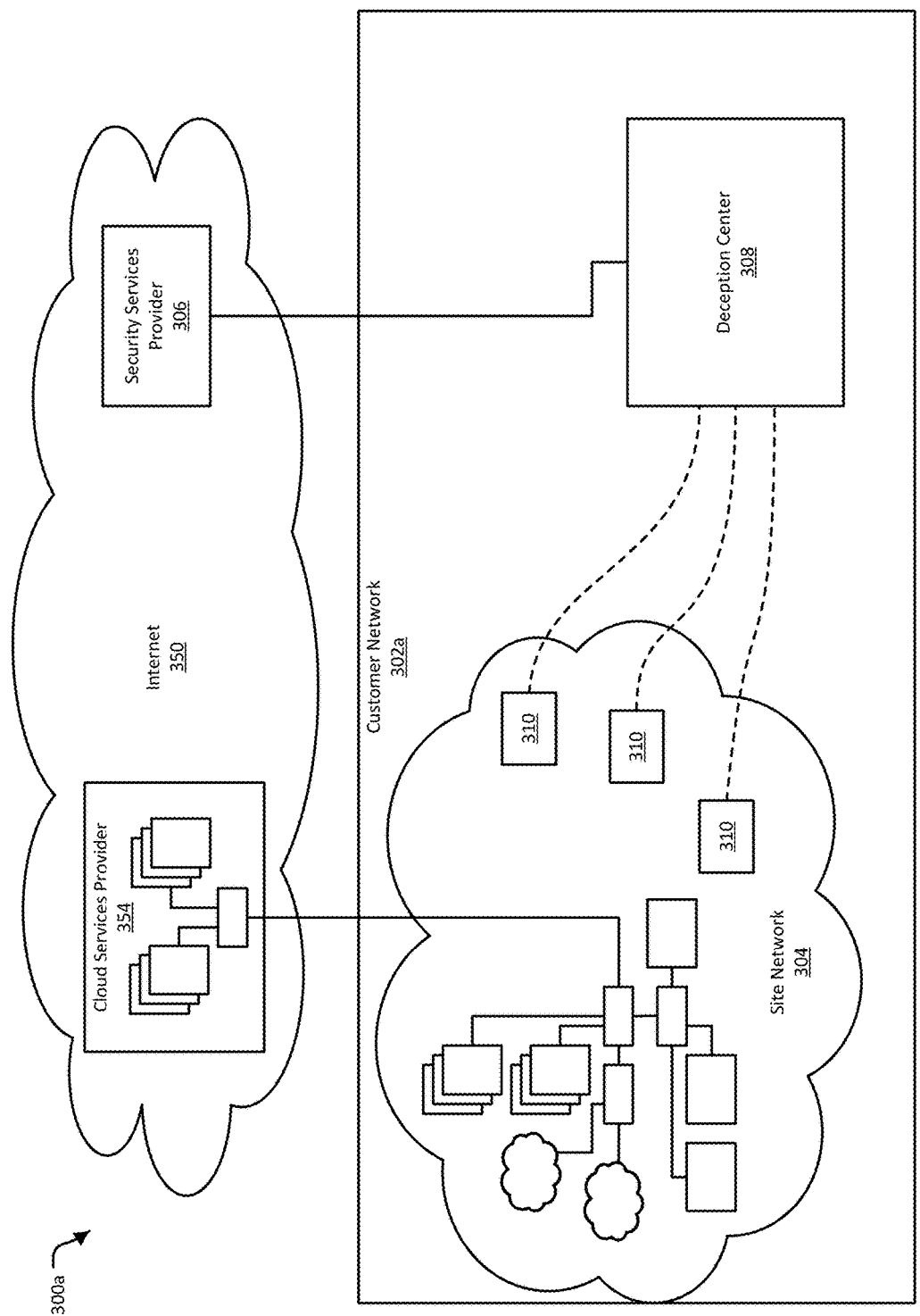
FIG. 3A-3B illustrate examples of customer networks where some of the customer networks' network infrastructure is "in the cloud," that is, is provided by a cloud services provider.
Figure 3B:
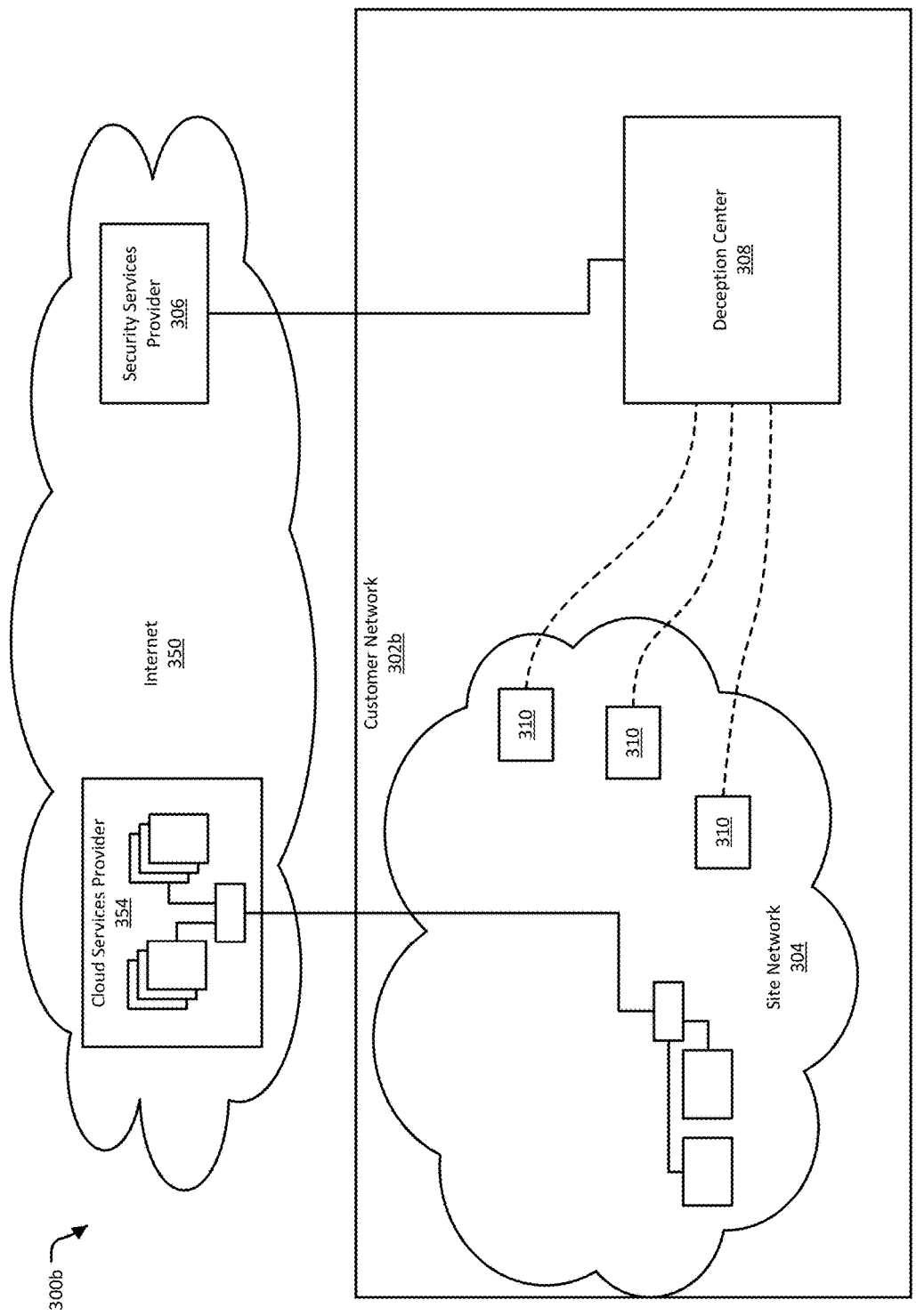

FIG. 3A-3B illustrate examples of customer networks 302*a*-302*b* where some of the customer networks' 302*a*-302*b* network infrastructure is "in the cloud," that is, is provided by a cloud services provider 354. These example customer networks 302*a*-302*b* may be defended by a network security system that includes a deception center 308 and sensors 310, which may also be referred to as deception sensors, and may also include an off-site security services provider 306.

A cloud services provider is a company that offers some component of cloud computer—such as Infrastructure as a Service (IaaS), Software as a Service (SaaS) or Platform as a Service (PaaS)—to other businesses and individuals. A cloud services provider may have a configurable pool of computing resources, including, for example, networks, servers, storage, applications, and services. These computing resources can be available on demand, and can be rapidly provisioned. While a cloud services provider's resources may be shared between the cloud service provider's customers, from the perspective of each customer, the individual customer may appear to have a private network within the cloud, including for example having dedicated subnets and IP addresses.

In the examples illustrated in FIGS. 3A-3B, the customer networks' 302*a*-302*b* network is partially in a site network 304, and partially provided by the cloud services provider 354. In some cases, the site network 304 is the part of the customer networks 302*a*-302*b* that is located at a physical site owned or controlled by the customer network 302*a*-302*b*. For example, the site network 304 may be a network located in the customer network's 302*a*-302*b* office or campus. Alternatively or additionally, the site network 304 may include network equipment owned and/or operated by the customer network 302 that may be located anywhere. For example, the customer networks' 302*a*-302*b* operations may consist of a few laptops owned by the customer networks 302*a*-302*b*, which are used from the private homes of the lap tops' users, from a co-working space, from a coffee shop, or from some other mobile location.

In various implementations, sensors 310 may be installed in the site network 304. The sensors 310 can be used by the network security system to project deceptions into the site network 304, monitor the site network 304 for attacks, and/or to divert suspect attacks into the deception center 308.

In some implementations, the sensors 310 may also be able to project deceptions into the part of the customer networks 302*a*-302*b* network that is provided by the cloud services provider 354. In most cases, it may not be possible to install sensors 310 inside the network of the cloud services provider 354, but in some implementations, this may not be necessary. For example, as discussed further below, the deception center 308 can acquire the subnet address of the network provided by the cloud services provider 354, and use that subnet address the create deceptions. Though these deceptions are projected form the sensors 310 installed in the site network 304, the deceptions may appear to be within the subnet provided by the cloud services provider 354.

In illustrated examples, the deception center 308 is installed inside the customer networks 302*a*-302*b*. Though not illustrated here, the deception center 308 can also be installed outside the customer networks 302*a*-302*b*, such as for example somewhere on the Internet 350. In some implementations, the deception center 308 may reside at the same location as the security service provider 306. When located outside the customer networks 302*a*-302*b*, the deception center 308 may connect to the sensors 310 in the site network 304 over various public and/or private networks.

FIG. 3A illustrates an example of a configuration 300*a* where the customer network's 302*a* network infrastructure is located in the cloud and the customer network 302*a* also has a substantial site network 304. In this example, the customer may have an office where the site network 304 is located, and where the customer's employees access and use the customer network 302*a*. For example, developers, sales and marketing personnel, human resources and finance employees, may access the customer network 302*a* from the site network 304. In the illustrated example, the customer may obtain applications and services from the cloud services provider 354. Alternatively or additionally, the cloud services provider 354 may provide data center services for the customer. For example, the cloud services provider 354 may host the customer's repository of data (e.g., music provided by a streaming music service, or video provided by a streaming video provider). In this example, the customer's own customers may be provided data directly from the cloud services provider 354, rather than from the customer network 302a.

FIG. 3B illustrates and example of a configuration 300b where the customer network's 302b network is primarily or sometimes entirely in the cloud. In this example, the customer network's 302b site network 304 may include a few laptops, or one or two desktop servers. These computing devices may be used by the customer's employees to conduct the customer's business, while the cloud services provider 354 provides the majority of the network infrastructure needed by the customer. For example, a very small company may have no office space and no dedicated location, and have as computing resources only the laptops used by its employees. This small company may use the cloud services provider 354 to provide its fixed network infrastructure. The small company may access this network infrastructure by connecting a laptop to any available network connection (e.g, in a co-working space, library, or coffee shop). When no laptops are connected to the cloud services provider 354, the customer network 302b may be existing entirely within the cloud.

In the example provided above, the site network 304 can be found wherever the customer's employees connect to a network and can access the cloud services provider 354. Similarly, the sensors 310 can be co-located with the employees' laptops. For example, whenever an employee connects to a network, she can enable a sensor 310, which can then project deceptions into the network around her. Alternatively or additionally, sensors 310 can be installed in a fixed location (such as the home of an employee of the customer) from which they can access the cloud services provider 354 and project deceptions into the network provided by the cloud services provider 354.

Figure 4:
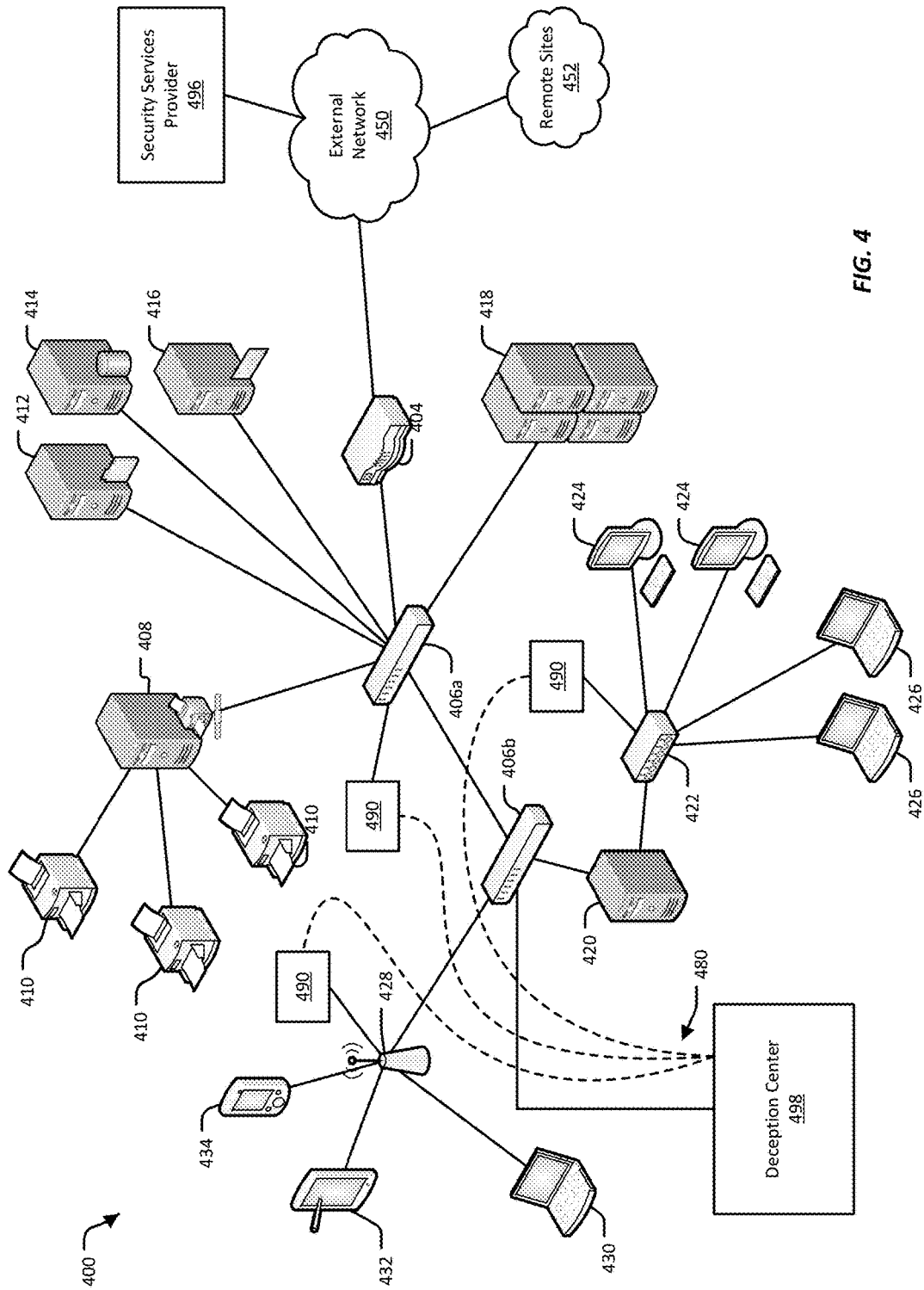
FIG. 4 illustrates an example of an enterprise network.

The network security system, such as the deception-based system discussed above, can provide network security for a variety of customer networks, which may include a diverse array of devices. FIG. 4 illustrates an example of an enterprise network 400, which is one such network that can be defended by a network security system. The example enterprise network 400 illustrates examples of various network devices and network clients that may be included in an enterprise network. The enterprise network 400 may include more or fewer network devices and/or network clients, and/or may include network devices, additional networks including remote sites 452, and/or systems not illustrated here. Enterprise networks may include networks installed at a large site, such as a corporate office, a university campus, a hospital, a government office, or a similar entity. An enterprise network may include multiple physical sites. Access to an enterprise networks is typically restricted, and may require authorized users to enter a password or otherwise authenticate before using the network. A network such as illustrated by the example enterprise network 400 may also be found at small sites, such as in a small business.

The enterprise network 400 may be connected to an external network 450. The external network 450 may be a public network, such as the Internet. A public network is a network that has been made accessible to any device that can connect to it. A public network may have unrestricted access, meaning that, for example, no password or other authentication is required to connect to it. The external network 450 may include third-party telecommunication lines, such as phone lines, broadcast coaxial cable, fiber optic cables, satellite communications, cellular communications, and the like. The external network 450 may include any number of intermediate network devices, such as switches, routers, gateways, servers, and/or controllers that are not directly part of the enterprise network 400 but that facilitate communication between the network 400 and other network-connected entities, such as a remote site 452.

Remote sites 452 are networks and/or individual computers that are generally located outside the enterprise network 400, and which may be connected to the enterprise network 400 through intermediate networks, but that function as if within the enterprise network 400 and connected directly to it. For example, an employee may connect to the enterprise network 400 while at home, using various secure protocols, and/or by connecting to a Virtual Private Network (VPN) provided by the enterprise network 400. While the employee's computer is connected, the employee's home is a remote site 452. Alternatively or additionally, the enterprise network's 400 owner may have a satellite office with a small internal network. This satellite office's network may have a fixed connection to the enterprise network 400 over various intermediate networks. This satellite office can also be considered a remote site.

The enterprise network 400 may be connected to the external network 450 using a gateway device 404. The gateway device 404 may include a firewall or similar system for preventing unauthorized access while allowing authorized access to the enterprise network 400. Examples of gateway devices include routers, modems (e.g. cable, fiber optic, dial-up, etc.), and the like.

The gateway device 404 may be connected to a switch 406a. The switch 406a provides connectivity between various devices in the enterprise network 400. In this example, the switch 406a connects together the gateway device 404, various servers 408, 412, 414, 416, 418, an another switch 406b. A switch typically has multiple ports, and functions to direct packets received on one port to another port. In some implementations, the gateway device 404 and the switch 406a may be combined into a single device.

Various servers may be connected to the switch 406a. For example, a print server 408 may be connected to the switch 406a. The print server 408 may provide network access to a number of printers 410. Client devices connected to the enterprise network 400 may be able to access one of the printers 410 through the printer server 408.

Other examples of servers connected to the switch 406a include a file server 412, database server 414, and email server 416. The file server 412 may provide storage for and access to data. This data may be accessible to client devices connected to the enterprise network 400. The database server 414 may store one or more databases, and provide services for accessing the databases. The email server 416 may host an email program or service, and may also store email for users on the enterprise network 400.

As yet another example, a server rack 418 may be connected to the switch 406a. The server rack 418 may house one or more rack-mounted servers. The server rack 418 may have one connection to the switch 406a, or may have multiple connections to the switch 406a. The servers in the server rack 418 may have various purposes, including providing computing resources, file storage, database storage and access, and email, among others.

An additional switch 406b may also be connected to the first switch 406a. The additional switch 406b may be provided to expand the capacity of the network. A switch typically has a limited number of ports (e.g., 8, 16, 32, 64 or more ports). In most cases, however, a switch can direct traffic to and from another switch, so that by connecting the additional switch 406b to the first switch 406a, the number of available ports can be expanded.

In this example, a server 420 is connected to the additional switch 406b. The server 420 may manage network access for a number of network devices or client devices. For example, the server 420 may provide network authentication, arbitration, prioritization, load balancing, and other management services as needed to manage multiple network devices accessing the enterprise network 400. The server 420 may be connected to a hub 422. The hub 422 may include multiple ports, each of which may provide a wired connection for a network or client device. A hub is typically a simpler device than a switch, and may be used when connecting a small number of network devices together. In some cases, a switch can be substituted for the hub 422. In this example, the hub 422 connects desktop computers 424 and laptop computers 426 to the enterprise network 400. In this example, each of the desktop computers 424 and laptop computers 426 are connected to the hub 422 using a physical cable.

In this example, the additional switch 406b is also connected to a wireless access point 428. The wireless access point 428 provides wireless access to the enterprise network 400 for wireless-enabled network or client devices. Examples of wireless-enabled network and client devices include laptops 430, tablet computers 432, and smart phones 434, among others. In some implementations, the wireless access point 428 may also provide switching and/or routing functionality.

The example enterprise network 400 of FIG. 4 is defended from network threats by a network threat detection and analysis system, which uses deception security mechanisms to attract and divert attacks on the network. The deceptive security mechanisms may be controlled by and inserted into the enterprise network 400 using a deception center 498 and sensors 490, which may also be referred to as deception sensors, installed in various places in the enterprise network 400. In some implementations, the deception center 498 and the sensors 490 interact with a security services provider 496 located outside of the enterprise network 400. The deception center 498 may also obtain or exchange data with sources located on external networks 450, such as the Internet.

In various implementations, the sensors 490 are a minimal combination of hardware and/or software, sufficient to form a network connection with the enterprise network 400 and a network tunnel 480 with the deception center 498. For example, a sensor 490 may be constructed using a low-power processor, a network interface, and a simple operating system.

In some implementations, any of the devices in the enterprise network (e.g., the servers 408, 412, 416, 418 the printers 410, the computing devices 424, 426, 430, 432, 434, or the network infrastructure devices 404, 406a, 406b, 428) can be configured to act as a sensor.

In various implementations, one or more sensors 490 can be installed anywhere in the enterprise network 400, include being attached switches 406a, hubs 422, wireless access points 428, and so on. The sensors 490 can further be configured to be part of one or more VLANs. The sensors 490 provide the deception center 498 with visibility into the enterprise network 400, such as for example being able to operate as a node in the enterprise network 400, and/or being able to present or project deceptive security mechanisms into the enterprise network 400. Additionally, in various implementations, the sensors 490 may provide a portal through which a suspected attack on the enterprise network 400 can be redirected to the deception center 498.

The deception center 498 provides network security for the enterprise network 400 by deploying security mechanisms into the enterprise network 400, monitoring the enterprise network 400 through the security mechanisms, detecting and redirecting apparent threats, and analyzing network activity resulting from the apparent threat. To provide security for the enterprise network 400, in various implementations the deception center 498 may communicate with sensors 490 installed in the enterprise network 400, using, for example, network tunnels 480. The tunnels 480 may allow the deception center 498 to be located in a different sub-network ("subnet") than the enterprise network 400, on a different network, or remote from the enterprise network 400, with intermediate networks between the deception center 498 and the enterprise network 400. In some implementations, the enterprise network 400 can include more than one deception center 498. In some implementations, the deception center may be located off-site, such as in an external network 450.

In some implementations, the security services provider 496 may act as a central hub for providing security to multiple site networks, possibly including site networks controlled by different organizations. For example, the security services provider 496 may communicate with multiple deception centers 498 that each provide security for a different enterprise network 400 for the same organization. As another example, the security services provider 496 may coordinate the activities of the deception center 498 and the sensors 490, such as enabling the deception center 498 and the sensors 490 to connect to each other. In some implementations, the security services provider 496 is located outside the enterprise network 400. In some implementations, the security services provider 496 is controlled by a different entity than the entity that controls the site network. For example, the security services provider 496 may be an outside vendor. In some implementations, the security services provider 496 is controlled by the same entity as that controls the enterprise network 400. In some implementations, the network security system does not include a security services provider 496.

FIG. 4 illustrates one example of what can be considered a "traditional" network, that is, a network that is based on the interconnection of computers. In various implementations, a network security system, such as the deception-based system discussed above, can also be used to defend "non-traditional" networks that include devices other than traditional computers, such as for example mechanical, electrical, or electromechanical devices, sensors, actuators, and control systems. Such "non-traditional" networks may be referred to as the Internet of Things (IoT). The Internet of Things encompasses newly-developed, every-day devices designed to be networked (e.g., drones, self-driving automobiles, etc.) as well as common and long-established machinery that has augmented to be connected to a network (e.g., home appliances, traffic signals, etc.).

Figure 5:
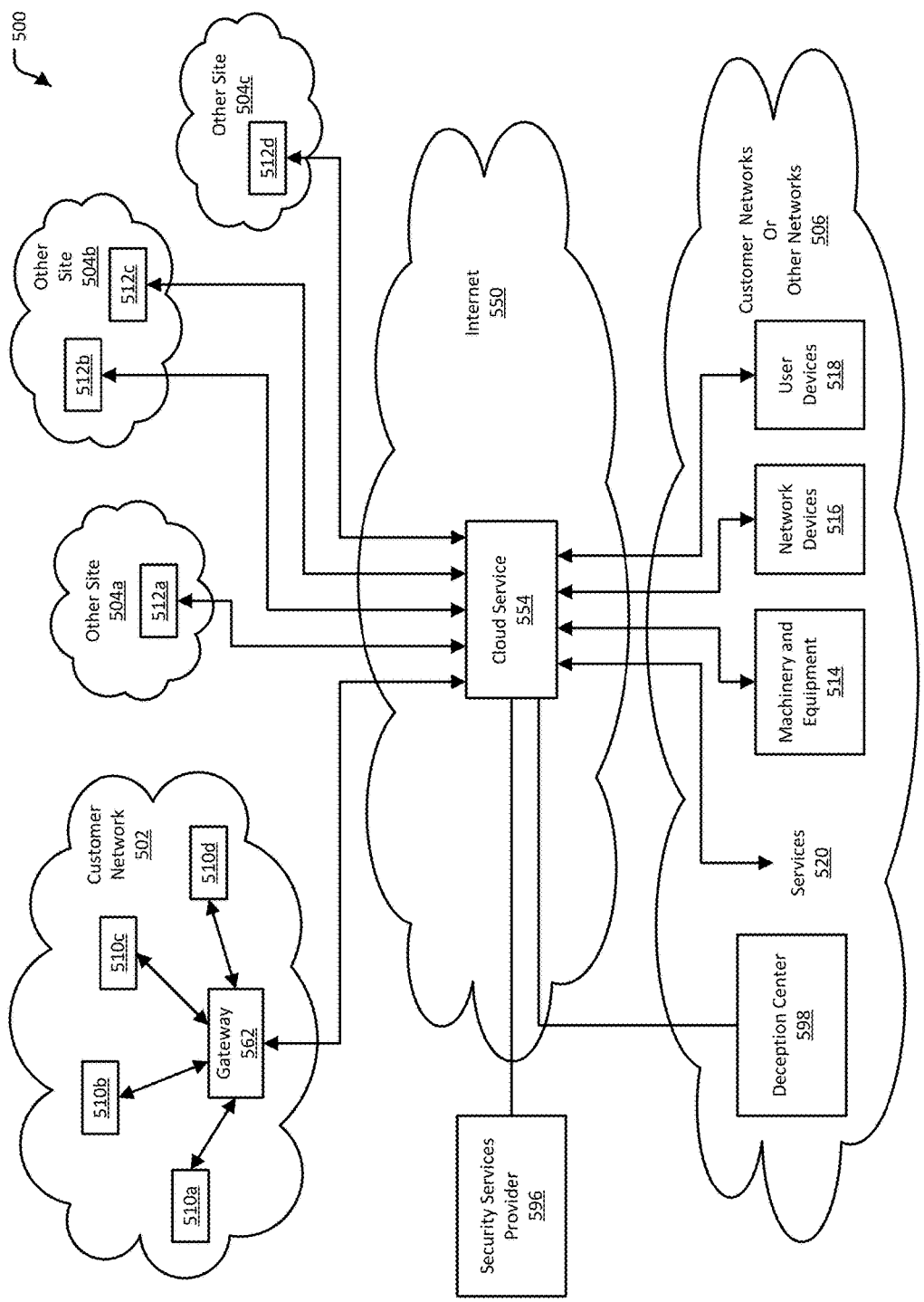
FIG. 5 illustrates a general example of an Internet-of-Things network.

FIG. 5 illustrates a general example of an IoT network 500. The example IoT network 500 can be implemented wherever sensors, actuators, and control systems can be found. For example, the example IoT network 500 can be implemented for buildings, roads and bridges, agriculture, transportation and logistics, utilities, air traffic control, factories, and private homes, among others. In various implementations, the IoT network 500 includes cloud service 554 that collects data from various sensors 510a-510d, 512a-

512*d*, located in various locations. Using the collected data, the cloud service 554 can provide services 520, control of machinery and equipment 514, exchange of data with traditional network devices 516, and/or exchange of data with user devices 518. In some implementations, the cloud service 554 can work with a deception center 598 and/or a security service provider 596 to provide security for the network 500.

A cloud service, such as the illustrated cloud service 554, is a resource provided over the Internet 550. Sometimes synonymous with "cloud computing," the resource provided by the cloud services is in the "cloud" in that the resource is provided by hardware and/or software at some location remote from the place where the resource is used. Often, the hardware and software of the cloud service is distributed across multiple physical locations. Generally, the resource provided by the cloud service is not directly associated with specific hardware or software resources, such that use of the resource can continue when the hardware or software is changed. The resource provided by the cloud service can often also be shared between multiple users of the cloud service, without affecting each user's use. The resource can often also be provided as needed or on-demand. Often, the resource provided by the cloud service 554 is automated, or otherwise capable of operating with little or no assistance from human operators.

Examples of cloud services include software as a service (SaaS), infrastructure as a service (IaaS), platform as a service (PaaS), desktop as a service (DaaS), managed software as a service (MSaaS), mobile backend as a service (MBaaS), and information technology management as a service (ITMaas). Specific examples of cloud services include data centers, such as those operated by Amazon Web Services and Google Web Services, among others, that provide general networking and software services. Other examples of cloud services include those associated with smartphone applications, or "apps," such as for example apps that track fitness and health, apps that allow a user to remotely manage her home security system or thermostat, and networked gaming apps, among others. In each of these examples, the company that provides the app may also provide cloud-based storage of application data, cloud-based software and computing resources, and/or networking services. In some cases, the company manages the cloud services provided by the company, including managing physical hardware resources. In other cases, the company leases networking time from a data center provider.

In some cases, the cloud service 554 is part of one integrated system, run by one entity. For example, the cloud service 554 can be part of a traffic control system. In this example, sensors 510*a*-510*d*, 512*a*-512*d* can be used to monitor traffic and road conditions. In this example, the cloud service 554 can attempt to optimize the flow of traffic and also provide traffic safety. For example, the sensors 510*a*-510*d*, 512*a*-512*d* can include a sensor 512*a* on a bridge that monitors ice formation. When the sensor 512*a* detects that ice has formed on the bridge, the sensor 512*a* can alert the cloud service 554. The cloud service 554, can respond by interacting with machinery and equipment 514 that manages traffic in the area of the bridge. For example, the cloud service 554 can turn on warning signs, indicating to drivers that the bridge is icy. Generally, the interaction between the sensor 512*a*, the cloud service 554, and the machinery and equipment 514 is automated, requiring little or no management by human operators.

In various implementations, the cloud service 554 collects or receives data from sensors 510*a*-510*d*, 512*a*-512*d*, distributed across one or more networks. The sensors 510*a*-510*d*, 512*a*-512*d* include devices capable of "sensing" information, such as air or water temperature, air pressure, weight, motion, humidity, fluid levels, noise levels, and so on. The sensors 510*a*-510*d*, 512*a*-512*d* can alternatively or additionally include devices capable of receiving input, such as cameras, microphones, touch pads, keyboards, key pads, and so on. In some cases, a group of sensors 510*a*-510*d* may be common to one customer network 502. For example, the sensors 510*a*-510*d* may be motion sensors, traffic cameras, temperature sensors, and other sensors for monitoring traffic in a city's metro area. In this example, the sensors 510*a*-510*d* can be located in one area of the city, or be distribute across the city, and be connected to a common network. In these cases, the sensors 510*a*-510*d* can communicate with a gateway device 562, such as a network gateway. The gateway device 562 can further communicate with the cloud service 554.

In some cases, in addition to receiving data from sensors 510*a*-510*d* in one customer network 502, the cloud service 554 can also receive data from sensors 512*a*-512*d* in other sites 504*a*-504*c*. These other sites 504*a*-504*c* can be part of the same customer network 502 or can be unrelated to the customer network 502. For example, the other sites 504*a*-504*c* can each be the metro area of a different city, and the sensors 512*a*-512*d* can be monitoring traffic for each individual city.

Generally, communication between the cloud service 554 and the sensors 510*a*-510*d*, 512*a*-512*d* is bidirectional. For example, the sensors 510*a*-510*d*, 512*a*-512*d* can send information to the cloud service 554. The cloud service 554 can further provide configuration and control information to the sensors 510*a*-510*d*, 512*a*-512*d*. For example, the cloud service 554 can enable or disable a sensor 510*a*-510*d*, 512*a*-512*d* or modify the operation of a sensor 510*a*-510*d*, 512*a*-512*d*, such as changing the format of the data provided by a sensor 510*a*-510*d*, 512*a*-512*d* or upgrading the firmware of a sensor 510*a*-510*d*, 512*a*-512*d*.

In various implementations, the cloud service 554 can operate on the data received from the sensors 510*a*-510*d*, 512*a*-512*d*, and use this data to interact with services 520 provided by the cloud service 554, or to interact with machinery and equipment 514, network devices 516, and/or user devices 518 available to the cloud service 554. Services 520 can include software-based services, such as cloud-based applications, website services, or data management services. Services 520 can alternatively or additionally include media, such as streaming video or music or other entertainment services. Services 520 can also include delivery and/or coordination of physical assets, such as for example package delivery, direction of vehicles for passenger pick-up and drop-off, or automate re-ordering and re-stocking of supplies. In various implementations, services 520 may be delivered to and used by the machinery and equipment 514, the network devices 516, and/or the user devices 518.

In various implementations, the machinery and equipment 514 can include physical systems that can be controlled by the cloud service 554. Examples of machinery and equipment 514 include factory equipment, trains, electrical street cars, self-driving cars, traffic lights, gate and door locks, and so on. In various implementations, the cloud service 554 can provide configuration and control of the machinery and equipment 514 in an automated fashion.

The network devices 516 can include traditional networking equipment, such as server computers, data storage devices, routers, switches, gateways, and so on. In various implementations, the cloud service 554 can provide control and management of the network devices 516, such as for example automated upgrading of software, security monitoring, or asset tracking. Alternatively or additionally, in various implementations the cloud service 554 can exchange data with the network devices 516, such as for example providing websites, providing stock trading data, or providing online shopping resources, among others. Alternatively or additionally, the network devices 516 can include computing systems used by the cloud service provider to manage the cloud service 554.

The user devices 518 can include individual personal computers, smart phones, tablet devices, smart watches, fitness trackers, medical devices, and so on that can be associated with an individual user. The cloud service 554 can exchange data with the user devices 518, such as for example provide support for applications installed on the user devices 518, providing websites, providing streaming media, providing directional navigation services, and so on. Alternatively or additionally, the cloud service 554 may enable a user to use a user device 518 to access and/or view other devices, such as the sensors 510a-510d, 512a-512d, the machinery and equipment 514, or the network devices 516.

In various implementations, the services 520, machinery and equipment 514, network devices 516, and user devices 518 may be part of one customer network 506. In some cases, this customer network 506 is the same as the customer network 502 that includes the sensors 510a-510d. In some cases, the services 520, machinery and equipment 514, network devices 516, and user devices 518 are part of the same network, and may instead be part of various other networks 506.

In various implementations, customer networks can include a deception center 598. The deception center 598 provides network security for the IoT network 500 by deploying security mechanisms into the IoT network 500, monitoring the IoT network 500 through the security mechanisms, detecting and redirecting apparent threats, and analyzing network activity resulting from the apparent threat. To provide security for the IoT network 500, in various implementations the deception center 598 may communicate with the sensors 510a-5106d, 512a-5012 installed in the IoT network 500, for example through the cloud service 554. In some implementations, the IoT network 500 can include more than one deception center 598. For example, each of customer network 502 and customer networks or other networks 506 can include a deception center 598.

In some implementations, the deception center 598 and the sensors 510a-510d, 512a-512d interact with a security services provider 596. In some implementations, the security services provider 596 may act as a central hub for providing security to multiple site networks, possibly including site networks controlled by different organizations. For example, the security services provider 596 may communicate with multiple deception centers 598 that each provide security for a different IoT network 500 for the same organization. As another example, the security services provider 596 may coordinate the activities of the deception center 598 and the sensors 510a-510d, 512a-512d, such as enabling the deception center 598 and the sensors 510a-510d, 512a-512d to connect to each other. In some implementations, the security services provider 596 is integrated into the cloud service 554. In some implementations, the security services provider 596 is controlled by a different entity than the entity that controls the site network. For example, the security services provider 596 may be an outside vendor. In some implementations, the security services provider 596 is controlled by the same entity as that controls the IoT network 500. In some implementations, the network security system does not include a security services provider 596.

Figure 6:
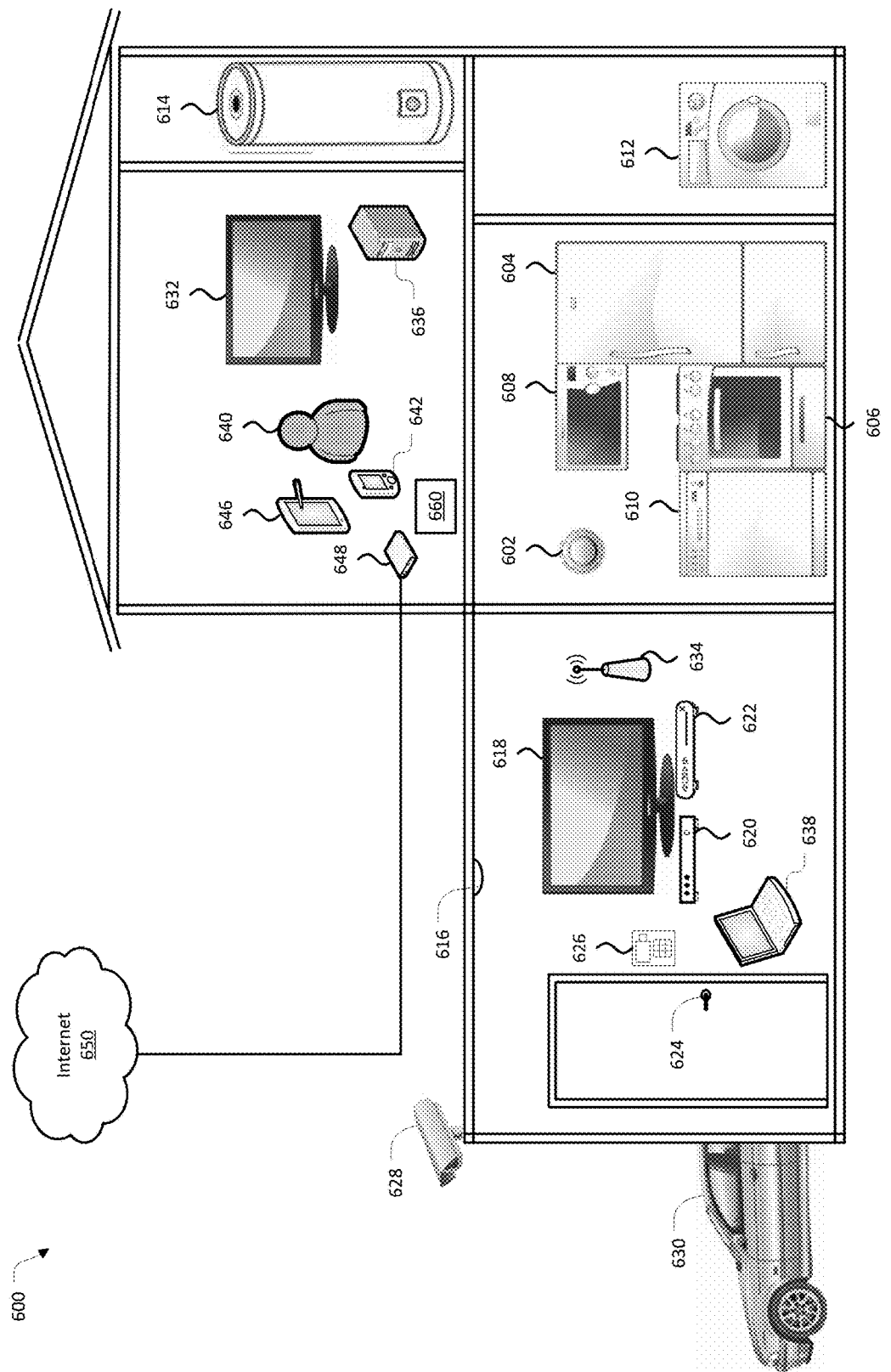
FIG. 6 illustrates an example of an Internet-of-Things network, here implemented in a private home.

IoT networks can also include small networks of non-traditional devices. FIG. 6 illustrates an example of a customer network that is a small network 600, here implemented in a private home. A network for a home is an example of small network that may have both traditional and non-traditional network devices connected to the network 600, in keeping with an Internet of Things approach. Home networks are also an example of networks that are often implemented with minimal security. The average homeowner is not likely to be a sophisticated network security expert, and may rely on his modem or router to provide at least some basic security. The homeowner, however, is likely able to at least set up a basic home network. A deception-based network security device may be as simple to set up as a home router or base station, yet provide sophisticated security for the network 600.

The example network 600 of FIG. 6 may be a single network, or may include multiple sub-networks. These sub-networks may or may not communicate with each other. For example, the network 600 may include a sub-network that uses the electrical wiring in the house as a communication channel. Devices configured to communicate in this way may connect to the network using electrical outlets, which also provide the devices with power. The sub-network may include a central controller device, which may coordinate the activities of devices connected to the electrical network, including turning devices on and off at particular times. One example of a protocol that uses the electrical wiring as a communication network is X10.

The network 600 may also include wireless and wired networks, built into the home or added to the home solely for providing a communication medium for devices in the house. Examples of wireless, radio-based networks include networks using protocols such as Z-Wave™, Zigbee™ (also known as Institute of Electrical and Electronics Engineers (IEEE) 802.15.4), Bluetooth™, and Wi-Fi (also known as IEEE 802.11), among others. Wireless networks can be set up by installing a wireless base station in the house. Alternatively or additionally, a wireless network can be established by having at least two devices in the house that are able to communicate with each other using the same protocol.

Examples of wired networks include Ethernet (also known as IEEE 802.3), token ring (also known as IEEE 802.5), Fiber Distributed Data Interface (FDDI), and Attached Resource Computer Network (ARCNET), among others. A wired network can be added to the house by running cabling through the walls, ceilings, and/or floors, and placing jacks in various rooms that devices can connect to with additional cables. The wired network can be extended using routers, switches, and/or hubs. In many cases, wired networks may be interconnected with wireless networks, with the interconnected networks operating as one seamless network. For example, an Ethernet network may include a wireless base station that provides a Wi-Fi signal for devices in the house.

As noted above, a small network 600 implemented in a home is one that may include both traditional network devices and non-traditional, everyday electronics and appliances that have also been connected to the network 600. Examples of rooms where one may find non-traditional devices connected to the network are the kitchen and laundry rooms. For example, in the kitchen a refrigerator 604, oven 606, microwave 608, and dishwasher 610 may be connected to the network 600, and in the laundry room a washing machine 612 may be connected to the network 600. By attaching these appliances to the network 600, the homeowner can monitor the activity of each device (e.g., whether the dishes are clean, the current state of a turkey in the oven, or the washing machine cycle) or change the operation of each device without needing to be in the same room or even be at home. The appliances can also be configured to resupply themselves. For example, the refrigerator 604 may detect that a certain product is running low, and may place an order with a grocery delivery service for the product to be restocked.

The network 600 may also include environmental appliances, such as a thermostat 602 and a water heater 614. By having these devices connected to the network 600, the homeowner can monitor the current environment of the house (e.g., the air temperature or the hot water temperature), and adjust the settings of these appliances while at home or away. Furthermore, software on the network 600 or on the Internet 650 may track energy usage for the heating and cooling units and the water heater 614. This software may also track energy usage for the other devices, such as the kitchen and laundry room appliances. The energy usage of each appliance may be available to the homeowner over the network 600.

In the living room, various home electronics may be on the network 600. These electronics may have once been fully analog or may have been standalone devices, but now include a network connection for exchanging data with other devices in the network 600 or with the Internet 650. The home electronics in this example include a television 618, a gaming system 620, and a media device 622 (e.g., a video and/or audio player). Each of these devices may play media hosted, for example, on network attached storage 636 located elsewhere in the network 600, or media hosted on the Internet 650.

The network 600 may also include home safety and security devices, such as a smoke detector 616, an electronic door lock 624, and a home security system 626. Having these devices on the network may allow the homeowner to track the information monitored and/or sensed by these devices, both when the homeowner is at home and away from the house. For example, the homeowner may be able to view a video feed from a security camera 628. When the safety and security devices detect a problem, they may also inform the homeowner. For example, the smoke detector 616 may send an alert to the homeowner's smartphone when it detects smoke, or the electronic door lock 624 may alert the homeowner when there has been a forced entry. Furthermore, the homeowner may be able to remotely control these devices. For example, the homeowner may be able to remotely open the electronic door lock 624 for a family member who has been locked out. The safety and security devices may also use their connection to the network to call the fire department or police if necessary.

Another non-traditional device that may be found in the network 600 is the family car 630. The car 630 is one of many devices, such as laptop computers 638, tablet computers 646, and smartphones 642, that connect to the network 600 when at home, and when not at home, may be able to connect to the network 600 over the Internet 650. Connecting to the network 600 over the Internet 650 may provide the homeowner with remote access to his network. The network 600 may be able to provide information to the car 630 and receive information from the car 630 while the car is away. For example, the network 600 may be able to track the location of the car 630 while the car 630 is away.

In the home office and elsewhere around the house, this example network 600 includes some traditional devices connected to the network 600. For example, the home office may include a desktop computer 632 and network attached storage 636. Elsewhere around the house, this example includes a laptop computer 638 and handheld devices such as a tablet computer 646 and a smartphone 642. In this example, a person 640 is also connected to the network 600. The person 640 may be connected to the network 600 wirelessly through personal devices worn by the person 640, such as a smart watch, fitness tracker, or heart rate monitor. The person 640 may alternatively or additionally be connected to the network 600 through a network-enabled medical device, such as a pacemaker, heart monitor, or drug delivery system, which may be worn or implanted.

The desktop computer 632, laptop computer 638, tablet computer 646, and/or smartphone 642 may provide an interface that allows the homeowner to monitor and control the various devices connected to the network. Some of these devices, such as the laptop computer 638, the tablet computer 646, and the smartphone 642 may also leave the house, and provide remote access to the network 600 over the Internet 650. In many cases, however, each device on the network may have its own software for monitoring and controlling only that one device. For example, the thermostat 602 may use one application while the media device 622 uses another, and the wireless network provides yet another. Furthermore, it may be the case that the various sub-networks in the house do not communicate with each other, and/or are viewed and controlled using software that is unique to each sub-network. In many cases, the homeowner may not have one unified and easily understood view of his entire home network 600.

The small network 600 in this example may also include network infrastructure devices, such as a router or switch (not shown) and a wireless base station 634. The wireless base station 634 may provide a wireless network for the house. The router or switch may provide a wired network for the house. The wireless base station 634 may be connected to the router or switch to provide a wireless network that is an extension of the wired network. The router or switch may be connected to a gateway device 648 that connects the network 600 to other networks, including the Internet 650. In some cases, a router or switch may be integrated into the gateway device 648. The gateway device 648 is a cable modem, digital subscriber line (DSL) modem, optical modem, analog modem, or some other device that connects the network 600 to an ISP. The ISP may provide access to the Internet 650. Typically, a home network only has one gateway device 648. In some cases, the network 600 may not be connected to any networks outside of the house. In these cases, information about the network 600 and control of devices in the network 600 may not be available when the homeowner is not connected to the network 600; that is, the homeowner may not have access to his network 600 over the Internet 650.

Typically, the gateway device 648 includes a hardware and/or software firewall. A firewall monitors incoming and outgoing network traffic and, by applying security rules to the network traffic, attempts to keep harmful network traffic out of the network 600. In many cases, a firewall is the only security system protecting the network 600. While a firewall may work for some types of intrusion attempts originating outside the network 600, the firewall may not block all intrusion mechanisms, particularly intrusions mechanisms hidden in legitimate network traffic. Furthermore, while a firewall may block intrusions originating on the Internet 650, the firewall may not detect intrusions originating from within the network 600. For example, an infiltrator may get into the network 600 by connecting to signal from the Wi-Fi base station 634. Alternatively, the infiltrator may connect to the network 600 by physically connecting, for example, to the washing machine 612. The washing machine 612 may have a port that a service technician can connect to service the machine. Alternatively or additionally, the washing machine 612 may have a simple Universal Serial Bus (USB) port. Once an intruder has gained access to the washing machine 612, the intruder may have access to the rest of the network 600.

To provide more security for the network 600, a deception-based network security device 660 can be added to the network 600. In some implementations, the security device 660 is a standalone device that can be added to the network 600 by connecting it to a router or switch. In some implementations, the security device 660 can alternatively or additionally be connected to the network's 600 wireless sub-network by powering on the security device 660 and providing it with Wi-Fi credentials. The security device 660 may have a touchscreen, or a screen and a keypad, for inputting Wi-Fi credentials. Alternatively or additionally, the homeowner may be able to enter network information into the security device by logging into the security device 660 over a Bluetooth™ or Wi-Fi signal using software on a smartphone, tablet, or laptop, or using a web browser. In some implementations, the security device 660 can be connected to a sub-network running over the home's electrical wiring by connecting the security device 660 to a power outlet. In some implementations, the security device 660 may have ports, interfaces, and/or radio antennas for connecting to the various sub-networks that can be included in the network 600. This may be useful, for example, when the sub-networks do not communicate with each other, or do not communicate with each other seamlessly. Once powered on and connected, the security device 660 may self-configure and monitor the security of each sub-network in the network 600 that it is connected to.

In some implementations, the security device 660 may be configured to connect between the gateway device 648 and the network's 600 primary router, and/or between the gateway device 648 and the gateway device's 648 connection to the wall. Connected in one or both of these locations, the security device 660 may be able to control the network's 600 connection with outside networks. For example, the security device can disconnect the network 600 from the Internet 650.

In some implementations, the security device 660, instead of being implemented as a standalone device, may be integrated into one or more of the appliances, home electronics, or computing devices (in this example network 600), or in some other device not illustrated here. For example, the security device 660—or the functionality of the security device 660—may be incorporated into the gateway device 648 or a desktop computer 632 or a laptop computer 638. As another example, the security device 660 can be integrated into a kitchen appliance (e.g., the refrigerator 604 or microwave 608), a home media device (e.g., the television 618 or gaming system 620), or the home security system 626. In some implementations, the security device 660 may be a printed circuit board that can be added to another device without requiring significant changes to the other device. In some implementations, the security device 660 may be implemented using an Application Specific Integrated Circuit (ASIC) or Field Programmable Gate Array (FPGA) that can be added to the electronics of a device. In some implementations, the security device 660 may be implemented as a software module or modules that can run concurrently with the operating system or firmware of a networked device. In some implementations, the security device 660 may have a physical or virtual security barrier that prevents access to it by the device that it is integrated into. In some implementations, the security device's 660 presence in another device may be hidden from the device into which the security device 660 is integrated.

In various implementations, the security device 660 may scan the network 600 to determine which devices are present in the network 600. Alternatively or additionally, the security device 660 may communicate with a central controller in the network 600 (or multiple central controllers, when there are sub-networks, each with their own central controller) to learn which devices are connected to the network 600. In some implementations, the security device 660 may undergo a learning period, during which the security device 660 learns the normal activity of the network 600, such as what time of day appliances and electronics are used, what they are used for, and/or what data is transferred to and from these devices. During the learning period, the security device 660 may alert the homeowner to any unusual or suspicious activity. The homeowner may indicate that this activity is acceptable, or may indicate that the activity is an intrusion. As described below, the security device 660 may subsequently take preventive action against the intrusion.

Once the security device 660 has learned the topology and/or activity of the network 600, the security device 660 may be able to provide deception-based security for the network 600. In some implementations, the security device 660 may deploy security mechanisms that are configured to emulate devices that could be found in the network 600. In some implementations, the security device 660 may monitor activity on the network 600, including watching the data sent between the various devices on the network 600, and between the devices and the Internet 650. The security device 660 may be looking for activity that is unusual, unexpected, or readily identifiable as suspect. Upon detecting suspicious activity in the network 600, the security device 660 may deploy deceptive security mechanisms.

In some implementations, the deceptive security mechanisms are software processes running on the security device 660 that emulate devices that may be found in the network 600. In some implementations, the security device 660 may be assisted in emulating the security devices by another device on the network 600, such as the desktop computer 632. From the perspective of devices connected to the network 600, the security mechanisms appear just like any other device on the network, including, for example, having an Internet Protocol (IP) address, a Media Access Control (MAC) address, and/or some other identification information, having an identifiable device type, and responding to or transmitting data just as would the device being emulated. The security mechanisms may be emulated by the security device 660 itself; thus, while, from the point of view of the network 600, the network 600 appears to have additional devices, no physical equivalent (other than the security device 660) can be found in the house.

The devices and data emulated by a security mechanism are selected such that the security mechanism is an attractive target for intrusion attempts. Thus, the security mechanism may emulate valuable data, and/or devices that are easily hacked into, and/or devices that provide easy access to the reset of the network 600. Furthermore, the security mechanisms emulate devices that are likely to be found in the network 600, such as a second television, a second thermostat, or another laptop computer. In some implementations, the security device 660 may contact a service on the Internet 650 for assistance in selecting devices to emulate and/or for how to configure emulated devices. The security devices 660 may select and configure security mechanisms to be attractive to intrusions attempts, and to deflect attention away from more valuable or vulnerable network assets. Additionally, the security mechanisms can assist in confirming that an intrusion into the network 600 has actually taken place.

In some implementations, the security device 660 may deploy deceptive security mechanisms in advance of detecting any suspicious activity. For example, having scanned the network, the security device 660 may determine that the network 600 includes only one television 618 and one smoke detector 616. The security device 660 may therefore choose to deploy security mechanisms that emulate a second television and a second smoke detector. With security mechanisms preemptively added to the network, when there is an intrusion attempt, the intruder may target the security mechanisms instead of valuable or vulnerable network devices. The security mechanisms thus may serve as decoys and may deflect an intruder away from the network's 600 real devices.

In some implementations, the security mechanisms deployed by the security device 660 may take into account specific requirements of the network 600 and/or the type of devices that can be emulated. For example, in some cases, the network 600 (or a sub-network) may assign identifiers to each device connected to the network 600, and/or each device may be required to adopt a unique identifier. In these cases, the security device 660 may assign an identifier to deployed security mechanisms that do not interfere with identifiers used by actual devices in the network 600. As another example, in some cases, devices on the network 600 may register themselves with a central controller and/or with a central service on the Internet 650. For example, the thermostat 602 may register with a service on the Internet 650 that monitors energy use for the home. In these cases, the security mechanisms that emulate these types of devices may also register with the central controller or the central service. Doing so may improve the apparent authenticity of the security mechanism, and may avoid conflicts with the central controller or central service. Alternatively or additionally, the security device 660 may determine to deploy security mechanisms that emulate other devices, and avoid registering with the central controller or central service.

In some implementations, the security device 660 may dynamically adjust the security mechanisms that it has deployed. For example, when the homeowner adds devices to the network 600, the security device 660 may remove security mechanisms that conflict with the new devices, or change a security mechanism so that the security mechanism's configuration is not incongruous with the new devices (e.g., the security mechanisms should not have the same MAC address as a new device). As another example, when the network owner removes a device from the network 600, the security device 660 may add a security mechanism that mimics the device that was removed. As another example, the security device may change the activity of a security mechanism, for example, to reflect changes in the normal activity of the home, changes in the weather, the time of year, the occurrence of special events, and so on.

The security device 660 may also dynamically adjust the security mechanisms it has deployed in response to suspicious activity it has detected on the network 600. For example, upon detecting suspicious activity, the security device 660 may change the behavior of a security mechanism or may deploy additional security mechanisms. The changes to the security mechanisms may be directed by the suspicious activity, meaning that if, for example, the suspicious activity appears to be probing for a wireless base station 634, the security device 660 may deploy a decoy wireless base station.

Changes to the security mechanisms are meant not only to attract a possible intrusion, but also to confirm that an intrusion has, in fact occurred. Since the security mechanisms are not part of the normal operation of the network 600, normal occupants of the home are not expected to access the security mechanisms. Thus, in most cases, any access of a security mechanism is suspect. Once the security device 660 has detected an access to a security mechanism, the security device 660 may next attempt to confirm that an intrusion into the network 600 has taken place. An intrusion can be confirmed, for example, by monitoring activity at the security mechanism. For example, login attempts, probing of data emulated by the security mechanism, copying of data from the security mechanism, and attempts to log into another part of the network 600 from the security mechanism indicate a high likelihood that an intrusion has occurred.

Once the security device 660 is able to confirm an intrusion into the network 600, the security device 660 may alert the homeowner. For example, the security device 660 may sound an audible alarm, send an email or text message to the homeowner or some other designated persons, and/or send an alert to an application running on a smartphone or tablet. As another example, the security device 660 may access other network devices and, for example, flash lights, trigger the security system's 626 alarm, and/or display messages on devices that include display screens, such as the television 618 or refrigerator 604. In some implementations, depending on the nature of the intrusion, the security device 660 may alert authorities such as the police or fire department.

In some implementations, the security device 660 may also take preventive actions. For example, when an intrusion appears to have originated outside the network 600, the security device 660 may block the network's 600 access to the Internet 650, thus possibly cutting off the intrusion. As another example, when the intrusion appears to have originated from within the network 600, the security device 660 may isolate any apparently compromised devices, for example by disconnecting them from the network 600. When only its own security mechanisms are compromised, the security device 660 may isolate itself from the rest of the network 600. As another example, when the security device 660 is able to determine that the intrusion very likely included physical intrusion into the house, the security device 660 may alert the authorities. The security device 660 may further lock down the house by, for example, locking any electronic door locks 624.

In some implementations, the security device 660 may be able to enable a homeowner to monitor the network 600 when a suspicious activity has been detected, or at any other time. For example, the homeowner may be provided with a software application that can be installed on a smartphone, tablet, desktop, and/or laptop computer. The software application may receive information from the security device 660 over a wired or wireless connection. Alternatively or additionally, the homeowner may be able to access information about his network through a web browser, where the security device 660 formats webpages for displaying the information. Alternatively or additionally, the security device 660 may itself have a touchscreen or a screen and key pad that provide information about the network 600 to the homeowner.

The information provided to the homeowner may include, for example, a list and/or graphic display of the devices connected to the network 600. The information may further provide a real-time status of each device, such as whether the device is on or off, the current activity of the device, data being transferred to or from the device, and/or the current user of the device, among other things. The list or graphic display may update as devices connect and disconnect from the network 600, such as for example laptops and smartphones connecting to or disconnecting from a wireless sub-network in the network 600. The security device 660 may further alert the homeowner when a device has unexpectedly been disconnected from the network 600. The security device 660 may further alert the homeowner when an unknown device connects to the network 600, such as for example when a device that is not known to the homeowner connects to the Wi-Fi signal.

The security device 660 may also maintain historic information. For example, the security device 660 may provide snapshots of the network 600 taken once a day, once a week, or once a month. The security device 660 may further provide a list of devices that have, for example, connected to the wireless signal in the last hour or day, at what times, and for how long. The security device 660 may also be able to provide identification information for these devices, such as MAC addresses or usernames. As another example, the security device 660 may also maintain usage statistics for each device in the network 600, such as for example the times at which each device was in use, what the device was used for, how much energy the device used, and so on.

The software application or web browser or display interface that provides the homeowner with information about his network 600 may also enable the homeowner to make changes to the network 600 or to devices in the network 600. For example, through the security device 660, the homeowner may be able to turn devices on or off, change the configuration of a device, change a password for a device or for the network, and so on.

In some implementations, the security device 660 may also display currently deployed security mechanisms and their configuration. In some implementations, the security device 660 may also display activity seen at the security mechanisms, such as for example a suspicious access to a security mechanism. In some implementations, the security device 660 may also allow the homeowner to customize the security mechanisms. For example, the homeowner may be able to add or remove security mechanisms, modify data emulated by the security mechanisms, modify the configuration of security mechanism, and/or modify the activity of a security mechanism.

A deception-based network security device 660 thus can provide sophisticated security for a small network. The security device 660 may be simple to add to a network, yet provide comprehensive protection against both external and internal intrusions. Moreover, the security device 660 may be able to monitor multiple sub-networks that are each using different protocols. The security device 660, using deceptive security mechanisms, may be able to detect and confirm intrusions into the network 600. The security device 660 may be able to take preventive actions when an intrusion occurs. The security device 660 may also be able to provide the homeowner with information about his network, and possibly also control over devices in the network.

Figure 7:
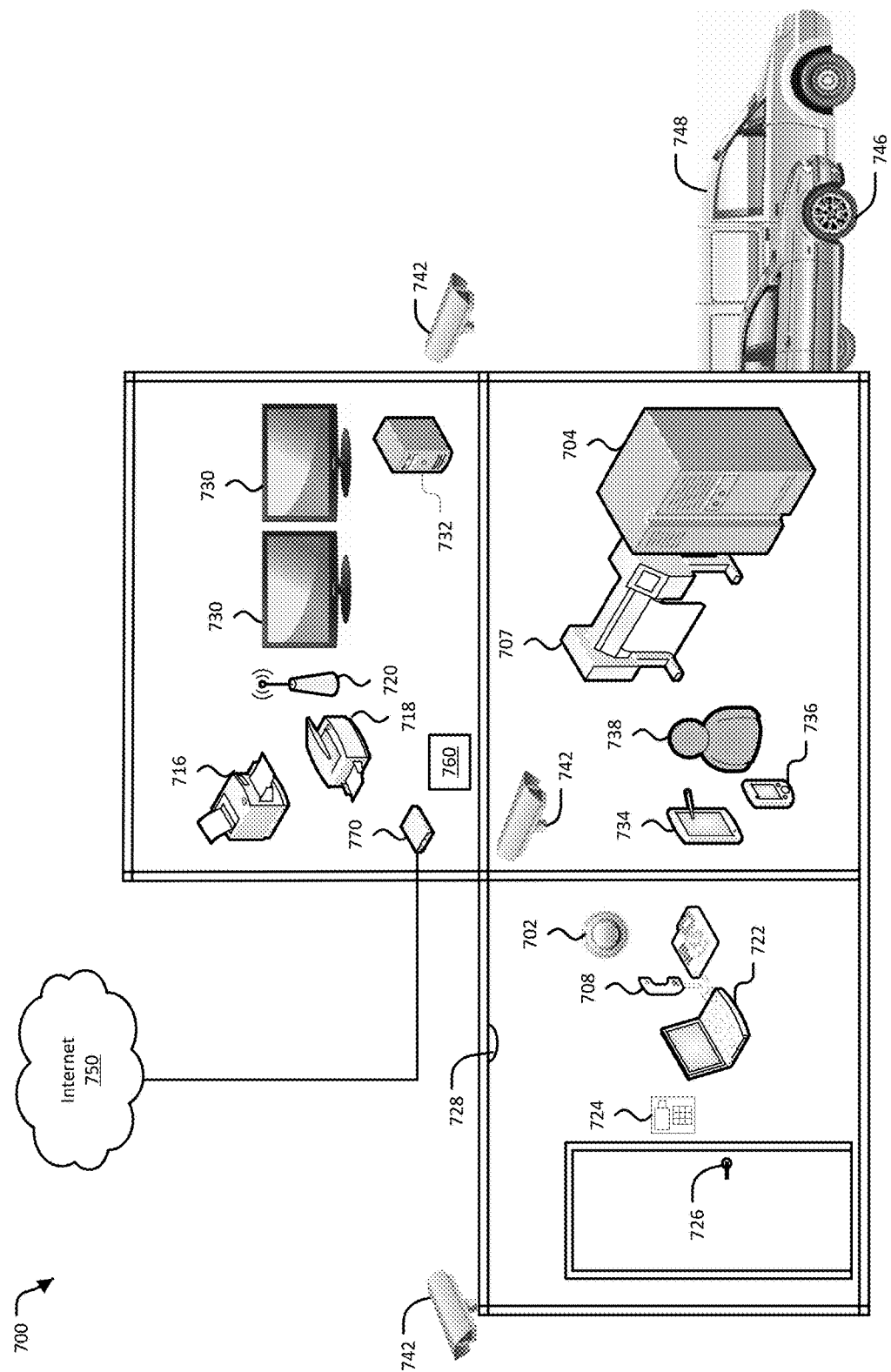
FIG. 7 illustrates of an Internet-of-Things network, here implemented in a small business.

FIG. 7 illustrates another example of a small network 700, here implemented in a small business. A network in a small business may have both traditional and non-traditional devices connected to the network 700. Small business networks are also examples of networks that are often implemented with minimal security. A small business owner may not have the financial or technical resources, time, or expertise to configure a sophisticated security infrastructure for her network 700. The business owner, however, is likely able to at least set up a network 700 for the operation of the business. A deception-based network security device that is at least as simple to set up as the network 700 itself may provide inexpensive and simple yet sophisticated security for the network 700.

The example network 700 may be one, single network, or may include multiple sub-networks. For example, the network 700 may include a wired sub-network, such as an Ethernet network, and a wireless sub-network, such as an 802.11 Wi-Fi network. The wired sub-network may be implemented using cables that have been run through the walls and/or ceilings to the various rooms in the business. The cables may be connected to jacks in the walls that devices can connect to in order to connect to the network 700. The wireless network may be implemented using a wireless base station 720, or several wireless base stations, which provide a wireless signal throughout the business. The network 700 may include other wireless sub-networks, such as a short-distance Bluetooth™ network. In some cases, the sub-networks communicate with one another. For example, the Wi-Fi sub-network may be connected to the wired Ethernet sub-network. In some cases, the various sub-networks in the network 700 may not be configured to or able to communicate with each other.

As noted above, the small business network 700 may include both computers, network infrastructure devices, and other devices not traditionally found in a network. The network 700 may also include electronics, machinery, and systems that have been connected to the network 700 according to an Internet-of-Things approach. Workshop machinery that was once purely analog may now have computer controls. Digital workshop equipment may be network-enabled. By connecting shop equipment and machinery to the network 700, automation and efficiency of the business can be improved and orders, materials, and inventory can be tracked. Having more devices on the network 700, however, may increase the number of vulnerabilities in the network 700. Devices that have only recently become network-enabled may be particularly vulnerable because their security systems have not yet been hardened through use and attack. A deception-based network security device may provide simple-to-install and sophisticated security for a network that may otherwise have only minimal security.

The example small business of FIG. 7 includes a front office. In the front office, the network may include devices for administrative tasks. These devices may include, for example, a laptop computer 722 and a telephone 708. These devices may be attached to the network 700 in order to, for example, access records related to the business, which may be stored on a server 732 located elsewhere in the building. In the front office, security devices for the building may also be found, including, for example, security system controls 724 and an electronic door lock 726. Having the security devices on the network 700 may enable the business owner to remotely control access to the building. The business owner may also be able to remotely monitor the security of building, such as for example being able to view video streams from security cameras 742. The front office may also be where environmental controls, such as a thermostat 702, are located. Having the thermostat 702 on the network 700 may allow the business owner to remotely control the temperature settings. A network-enabled thermostat 702 may also track energy usage for the heating and cooling systems. The front office may also include safety devices, such as a network-connected smoke alarm 728. A network-connected smoke alarm may be able to inform the business owner that there is a problem in the building be connecting to the business owner's smartphone or computer.

Another workspace in this example small business is a workshop. In the workshop, the network 700 may include production equipment for producing the goods sold by the business. The production equipment may include, for example, manufacturing machines 704 (e.g. a milling machine, a Computer Numerical Control (CNC) machine, a 3D printer, or some other machine tool) and a plotter 707. The production equipment may be controlled by a computer on the network 700, and/or may receive product designs over the network 700 and independently execute the designs. In the workshop, one may also find other devices related to the manufacturing of products, such as radiofrequency identification (RFID) scanners, barcode or Quick Response (QR) code generators, and other devices for tracking inventory, as well as electronic tools, hand tools, and so on.

In the workshop and elsewhere in the building, mobile computing devices and people 738 may also be connected to the network 700. Mobile computing devices include, for example, tablet computers 734 and smartphones 736. These devices may be used to control production equipment, track supplies and inventory, receive and track orders, and/or for other operations of the business. People 738 may be connected to the network through network-connected devices worn or implanted in the people 738, such as for example smart watches, fitness trackers, heart rate monitors, drug delivery systems, pacemakers, and so on.

At a loading dock, the example small business may have a delivery van 748 and a company car 746. When these vehicles are away from the business, they may be connected to the network 700 remotely, for example over the Internet 750. By being able to communicate with the network 700, the vehicles may be able to receive information such as product delivery information (e.g., orders, addresses, and/or delivery times), supply pickup instructions, and so on. The business owner may also be able to track the location of these vehicles from the business location, or over the Internet 750 when away from the business, and/or track who is using the vehicles.

The business may also have a back office. In the back office, the network 700 may include traditional network devices, such as computers 730, a multi-function printer 716, a scanner 718, and a server 732. In this example, the computers 730 may be used to design products for manufacturing in the workshop, as well as for management of the business, including tracking orders, supplies, inventory, and/or human resources records. The multi-function printer 716 and scanner 718 may support the design work and the running of the business. The server 732 may store product designs, orders, supply records, and inventory records, as well as administrative data, such as accounting and human resources data.

The back office may also be where a gateway device 770 is located. The gateway device 770 connects the small business to other networks, including the Internet 750. Typically, the gateway device 770 connects to an ISP, and the ISP provides access to the Internet 750. In some cases, a router may be integrated into the gateway device 770. In some cases, gateway device 770 may be connected to an external router, switch, or hub, not illustrated here. In some cases, the network 700 is not connected to any networks outside of the business's own network 700. In these cases, the network 700 may not have a gateway device 770.

The back office is also where the network 700 may have a deception-based network security device 760. The security device 760 may be a standalone device that may be enabled as soon as it is connected to the network 700. Alternatively or additionally, the security device 760 may be integrated into another device connected to the network 700, such as the gateway device 770, a router, a desktop computer 730, a laptop computer 722, the multi-function printer 716, or the thermostat 702, among others. When integrated into another device, the security device 760 may use the network connection of the other device, or may have its own network connection for connecting to the network 700. The security device 760 may connect to the network 700 using a wired connection or a wireless connection.

Once connected to the network 700, the security device 760 may begin monitoring the network 700 for suspect activity. In some implementations, the security device 760 may scan the network 700 to learn which devices are connected to the network 700. In some cases, the security device 760 may learn the normal activity of the network 700, such as what time the various devices are used, for how long, by whom, for what purpose, and what data is transferred to and from each device, among other things.

In some implementations, having learned the configuration and/or activity of the network 700, the security device 760 may deploy deceptive security mechanisms. These security mechanisms may emulate devices that may be found on the network 700, including having an identifiable device type and/or network identifiers (such as a MAC address and/or IP address), and being able to send and receive network traffic that a device of a certain time would send and receive. For example, for the example small business, the security device 760 may configure a security mechanism to emulate a 3D printer, a wide-body scanner, or an additional security camera. The security device 760 may further avoid configuring a security mechanism to emulate a device that is not likely to be found in the small business, such as a washing machine. The security device 760 may use the deployed security mechanisms to monitor activity on the network 700.

In various implementations, when the security device 760 detects suspect activity, the security device 760 may deploy additional security mechanisms. These additional security mechanisms may be selected based on the nature of suspect activity. For example, when the suspect activity appears to be attempting to break into the shop equipment, the security device 760 may deploy a security mechanism that looks like shop equipment that is easy to hack. In some implementations, the security device 760 may deploy security mechanisms only after detecting suspect activity on the network 700.

The security device 760 selects devices to emulate that are particularly attractive for an infiltration, either because the emulated device appears to have valuable data or because the emulated device appears to be easy to infiltrate, or for some other reason. In some implementations, the security device 760 connects to a service on the Internet 750 for assistance in determining which devices to emulate and/or how to configure the emulated device. Once deployed, the security mechanisms serve as decoys to attract the attention of a possible infiltrator away from valuable network assets. In some implementations, the security device 760 emulates the security mechanisms using software processes. In some implementations, the security device 760 may be assisted in emulating security mechanisms by a computer 730 on the network.

In some implementations, the security device 760 may deploy security mechanisms prior to detecting suspicious activity on the network 700. In these implementations, the security mechanisms may present more attractive targets for a possible, future infiltration, so that if an infiltration occurs, the infiltrator will go after the security mechanisms instead of the actual devices on the network 700.

In various implementations, the security device 760 may also change the security mechanisms that it has deployed. For example, the security device 760 may add or remove security mechanisms as the operation of the business changes, as the activity on the network 700 changes, as devices are added or removed from the network 700, as the time of year changes, and so on.

Besides deflecting a possible network infiltration away from valuable or vulnerable network devices, the security device 760 may use the security mechanisms to confirm that the network 700 has been infiltrated. Because the security mechanisms are not part of actual devices in use by the business, any access to them over the network is suspect. Thus, once the security device 760 detects an access to one of its security mechanisms, the security device 760 may attempt to confirm that this access is, in fact, an unauthorized infiltration of the network 700.

To confirm that a security mechanism has been infiltrated, the security device 760 may monitor activity seen at the security mechanism. The security device 760 may further deploy additional security mechanisms, to see if, for example, it can present an even more attractive target to the possible infiltrator. The security device 760 may further look for certain activity, such as log in attempts to other devices in the network, attempts to examine data on the security mechanism, attempts to move data from the security mechanism to the Internet 750, scanning of the network 700, password breaking attempts, and so on.

Once the security device 760 has confirmed that the network 700 has been infiltrated, the security device 760 may alert the business owner. For example, the security device 760 may sound an audible alarm, email or send text messages to the computers 730 and/or handheld devices 734, 736, send a message to the business's cars 746, 748, flash lights, or trigger the security system's 724 alarm. In some implementations, the security device 760 may also take preventive measures. For example, the security device 760 may disconnect the network 700 from the Internet 750, may disconnect specific devices from the network 700 (e.g., the server 732 or the manufacturing machines 704), may turn some network-connected devices off, and/or may lock the building.

In various implementations, the security device 760 may allow the business owner to monitor her network 700, either when an infiltration is taking place or at any other time. For example, the security device 760 may provide a display of the devices currently connected to the network 700, including flagging any devices connected to the wireless network that do not appear to be part of the business. The security device 760 may further display what each device is currently doing, who is using them, how much energy each device is presently using, and/or how much network bandwidth each device is using. The security device 760 may also be able to store this information and provide historic configuration and/or usage of the network 700.

The security device 760 may have a display it can use to show information to the business owner. Alternatively or additionally, the security device 760 may provide this information to a software application that can run on a desktop or laptop computer, a tablet, or a smartphone. Alternatively or additionally, the security device 760 may format this information for display through a web browser. The business owner may further be able to control devices on the network 700 through an interface provided by the security device 760, including, for example, turning devices on or off, adjusting settings on devices, configuring user accounts, and so on. The business owner may also be able to view any security mechanisms presently deployed, and may be able to re-configure the security mechanisms, turn them off, or turn them on.

IoT networks can also include industrial control systems. Industrial control system is a general term that encompasses several types of control systems, including supervisory control and data acquisition (SCADA) systems, distributed control systems (DCS) and other control system configurations, such as Programmable Logic Controllers (PLCs), often found in the industrial sectors and infrastructures. Industrial control systems are often found in industries such as electrical, water and wastewater, oil and natural gas, chemical, transportation, pharmaceutical, pulp and paper, food and beverage, and discrete manufacturing (e.g., automotive, aerospace, and durable goods). While a large percentage of industrial control systems may be privately owned and operated, federal agencies also operate many industrial processes, such as air traffic control systems and materials handling (e.g., Postal Service mail handling).

Figure 8:
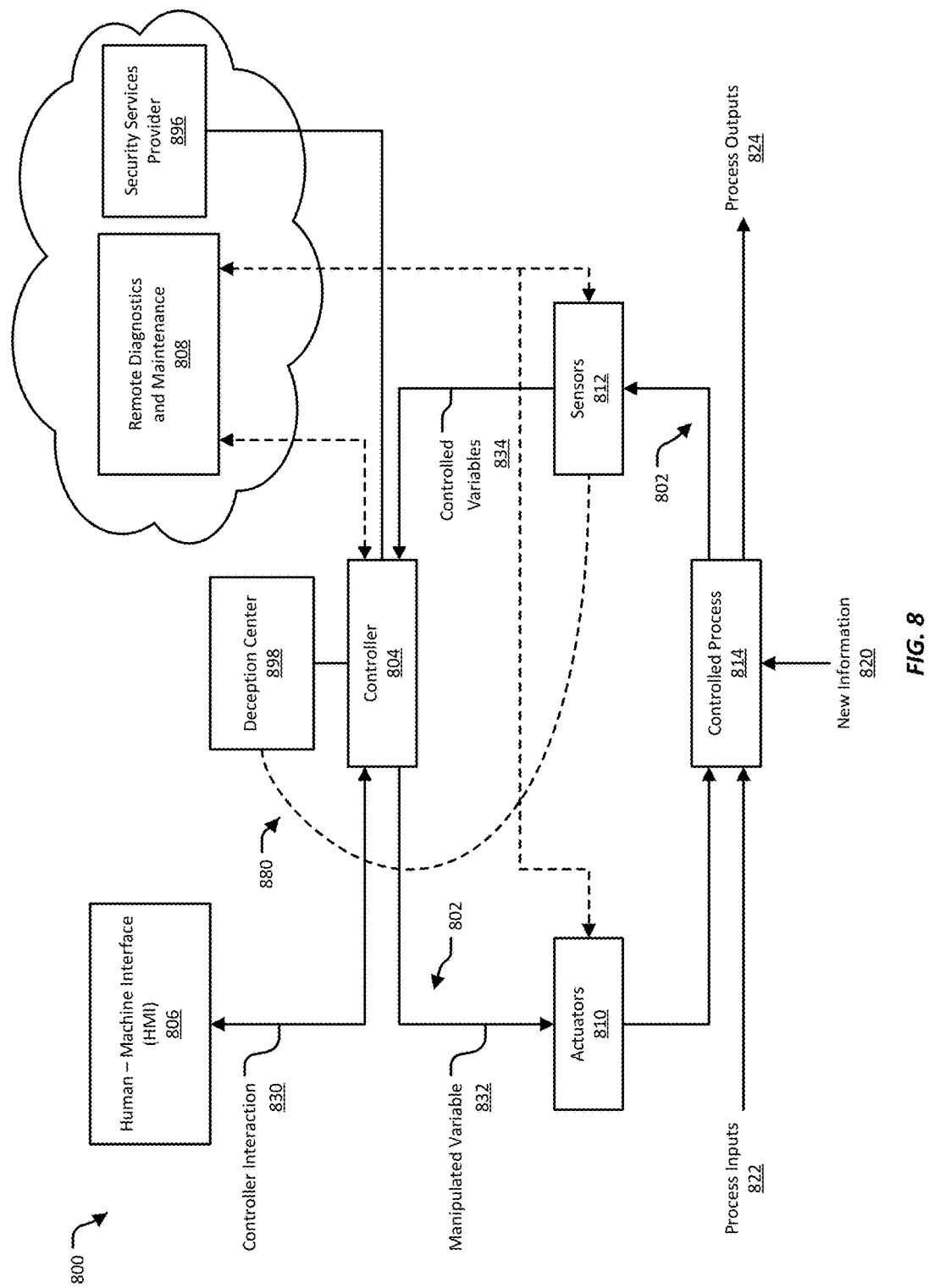
FIG. 8 illustrates an example of the basic operation of an industrial control system.

FIG. 8 illustrates an example of the basic operation of an industrial control system 800. Generally, an industrial control system 800 may include a control loop 802, a human-machine interface 806, and remote diagnostics and maintenance 808. In some implementations, the example industrial control system can be defended by a network threat detection and analysis system, which can include a deception center 898 and a security services provider 896.

A control loop 802 may consist of sensors 812, controller 804 hardware such as PLCs, actuators 810, and the communication of variables 832, 834. The sensors 812 may be used for measuring variables in the system, while the actuators 810 may include, for example, control valves breakers, switches, and motors. Some of the sensors 812 may be deceptions sensors. Controlled variables 834 may be transmitted to the controller 804 from the sensors 812. The controller 804 may interpret the controlled variables 834 and generates corresponding manipulated variables 832, based on set points provided by controller interaction 830. The controller 804 may then transmit the manipulated variables 832 to the actuators 810. The actuators 810 may drive a controlled process 814 (e.g., a machine on an assembly line). The controlled process 814 may accept process inputs 822 (e.g., raw materials) and produce process outputs 824 (e.g., finished products). New information 820 provided to the controlled process 814 may result in new sensor 812 signals, which identify the state of the controlled process 814 and which may also transmitted to the controller 804.

In some implementations, at least some of the sensors 812 can also provide the deception center 898 with visibility into the industrial control system 800, such as for example being able to present or project deceptive security mechanisms into the industrial control system. Additionally, in various implementations, the sensors 812 may provide a portal through which a suspected attack on the industrial control system can be redirected to the deception center 898. The deception center 898 and the sensors 810 may be able to communicate using network tunnels 880.

The deception center 898 provides network security for the industrial control system 800 by deploying security mechanisms into the industrial control system 800, monitoring the industrial control system through the security mechanisms, detecting and redirecting apparent threats, and analyzing network activity resulting from the apparent threat. In some implementations, the industrial control system 800 can include more than one deception center 898. In some implementations, the deception center may be located off-site, such as on the Internet.

In some implementations, the deception center 898 may interact with a security services provider 896 located outside the industrial control system 800. The security services provider 896 may act as a central hub for providing security to multiple sites that are part of the industrial control system 800, and/or for multiple separate, possibly unrelated, industrial control systems. For example, the security services provider 896 may communicate with multiple deception centers 898 that each provide security for a different industrial control system 800 for the same organization. As another example, the security services provider 896 may coordinate the activities of the deception center 898 and the sensors 812, such as enabling the deception center 898 and the sensors 812 to connect to each other. In some implementations, the security services provider 896 is located outside the industrial control system 800. In some implementations, the security services provider 896 is controlled by a different entity than the entity that controls the site network. For example, the security services provider 896 may be an outside vendor. In some implementations, the security services provider 896 is controlled by the same entity as that controls the industrial control system. In some implementations, the network security system does not include a security services provider 896.

The human-machine interface 806 provides operators and engineers with an interface for controller interaction 830. Controller interaction 830 may include monitoring and configuring set points and control algorithms, and adjusting and establishing parameters in the controller 804. The human-machine interface 806 typically also receives information from the controller 804 that allows the human-machine interface 806 to display process status information and historical information about the operation of the control loop 802.

The remote diagnostics and maintenance 808 utilities are typically used to prevent, identify, and recover from abnormal operation or failures. For diagnostics, the remote diagnostics and maintenance 808 utilities may monitor the operation of each of the controller 804, sensors 812, and actuators 810. To recover after a problem, the remote diagnostics and maintenance 808 utilities may provide recovery information and instructions to one or more of the controller 804, sensors 812, and/or actuators 810.

A typical industrial control system contains many control loops, human-machine interfaces, and remote diagnostics and maintenance tools, built using an array of network protocols on layered network architectures. In some cases, multiple control loops are nested and/or cascading, with the set point for one control loop being based on process variables determined by another control loop. Supervisory-level control loops and lower-level control loops typically operate continuously over the duration of a process, with cycle times ranging from milliseconds to minutes.

One type of industrial control system that may include many control loops, human-machine interfaces, and remote diagnostics and maintenance tools is a supervisory control and data acquisition (SCADA) system. SCADA systems are used to control dispersed assets, where centralized data acquisition is typically as important as control of the system. SCADA systems are used in distribution systems such as, for example, water distribution and wastewater collection systems, oil and natural gas pipelines, electrical utility transmission and distribution systems, and rail and other public transportation systems, among others. SCADA systems typically integrate data acquisition systems with data transmission systems and human-machine interface software to provide a centralized monitoring and control system for numerous process inputs and outputs. SCADA systems are typically designed to collect field information, transfer this information to a central computer facility, and to display the information to an operator in a graphic and/or textual manner. Using this displayed information, the operator may, in real time, monitor and control an entire system from a central location. In various implementations, control of any individual sub-system, operation, or task can be automatic, or can be performed by manual commands.

Figure 9:
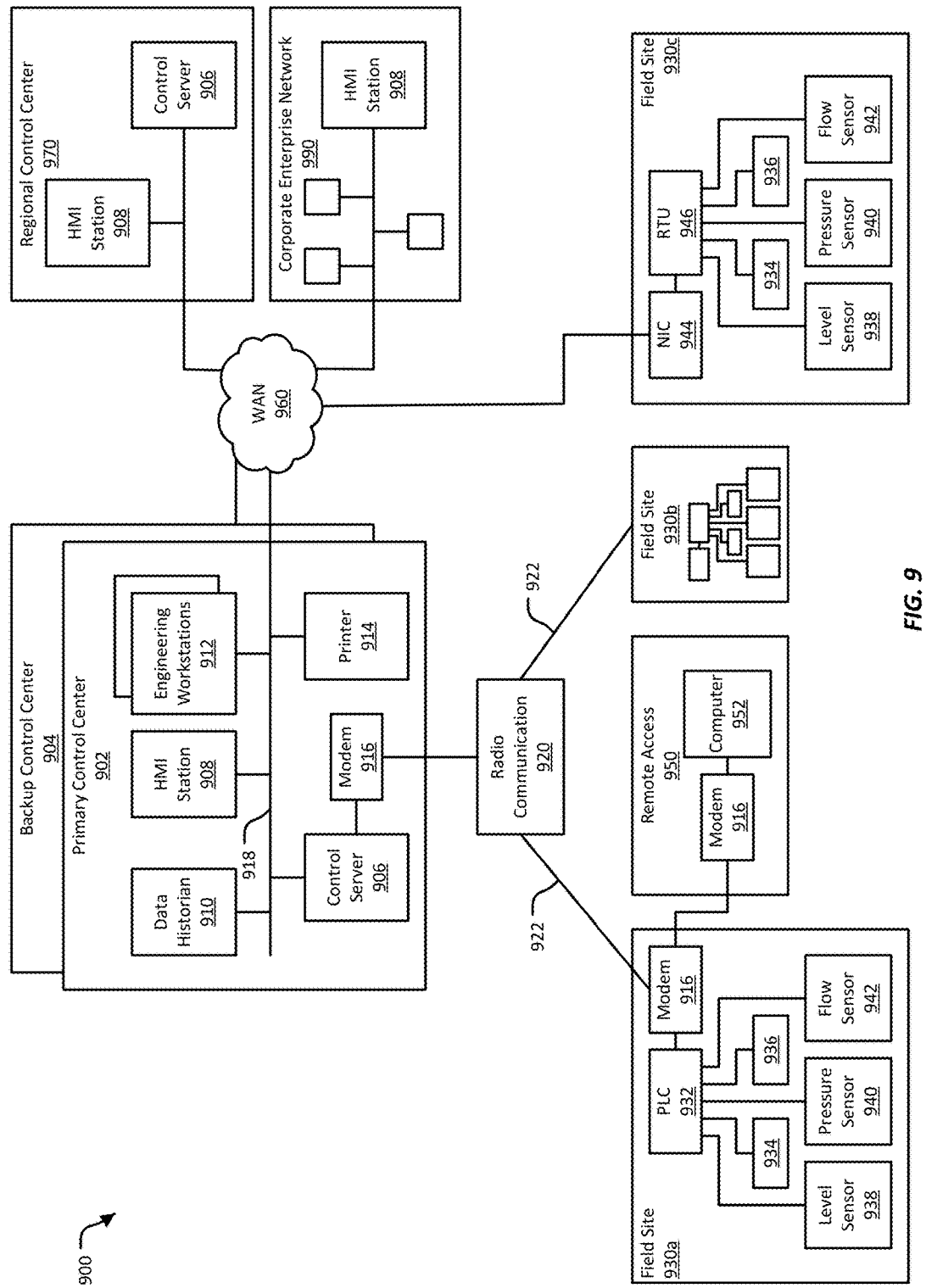
FIG. 9 illustrates an example of a SCADA system, here used for distributed monitoring and control.

FIG. 9 illustrates an example of a SCADA system 900, here used for distributed monitoring and control. This example SCADA system 900 includes a primary control center 902 and three field sites 930*a*-930*c*. A backup control center 904 provides redundancy in case of there is a malfunction at the primary control center 902. The primary control center 902 in this example includes a control server 906—which may also be called a SCADA server or a Master Terminal Unit (MTU)—and a local area network (LAN) 908. The primary control center 902 may also include a human-machine interface station 908, a data historian 910, engineering workstations 912, and various network equipment such as printers 914, each connected to the LAN 918.

The control server 906 typically acts as the master of the SCADA system 900. The control server 906 typically includes supervisory control software that controls lower-level control devices, such as Remote Terminal Units (RTUs) and PLCs, located at the field sites 930*a*-930*c*. The software may tell the system 900 what and when to monitor, what parameter ranges are acceptable, and/or what response to initiate when parameters are outside of acceptable values.

The control server 906 of this example may access Remote Terminal Units and/or PLCs at the field sites 930*a*-930*c* using a communications infrastructure, which may include radio-based communication devices, telephone lines, cables, and/or satellites. In the illustrated example, the control server 906 is connected to a modem 916, which provides communication with serial-based radio communication 920, such as a radio antenna. Using the radio communication 920, the control server 906 can communicate with field sites 930*a*-930*b* using radiofrequency signals 922. Some field sites 930*a*-930*b* may have radio transceivers for communicating back to the control server 906.

A human-machine interface station 908 is typically a combination of hardware and software that allows human operators to monitor the state of processes in the SCADA system 900. The human-machine interface station 908 may further allow operators to modify control settings to change a control objective, and/or manually override automatic control operations, such as in the event of an emergency. The human-machine interface station 908 may also allow a control engineer or operator to configure set points or control algorithms and parameters in a controller, such as a Remote Terminal Unit or a PLC. The human-machine interface station 908 may also display process status information, historical information, reports, and other information to operators, administrators, mangers, business partners, and other authorized users. The location, platform, and interface of a human-machine interface station 908 may vary. For example, the human-machine interface station 908 may be a custom, dedicated platform in the primary control center 902, a laptop on a wireless LAN, or a browser on a system connected to the Internet.

The data historian 910 in this example is a database for logging all process information within the SCADA system 900. Information stored in this database can be accessed to support analysis of the system 900, for example for statistical process control or enterprise level planning.

The backup control center 904 may include all or most of the same components that are found in the primary control center 902. In some cases, the backup control center 904 may temporarily take over for components at the primary control center 902 that have failed or have been taken offline for maintenance. In some cases, the backup control center 904 is configured to take over all operations of the primary control center 902, such as when the primary control center 902 experiences a complete failure (e.g., is destroyed in a natural disaster).

The primary control center 902 may collect and log information gathered by the field sites 930a-930c and display this information using the human-machine interface station 908. The primary control center 902 may also generate actions based on detected events. The primary control center 902 may, for example, poll field devices at the field sites 930a-930c for data at defined intervals (e.g., 5 or 60 seconds), and can send new set points to a field device as required. In addition to polling and issuing high-level commands, the primary control center 902 may also watch for priority interrupts coming from the alarm systems at the field sites 930a-930c.

In this example, the primary control center 902 uses point-to-point connections to communication with three field sites 930a-930c, using radio telemetry for two communications with two of the field sites 930a-930b. In this example, the primary control center 902 uses a wide area network (WAN) 960 to communicate with the third field site 930c. In other implementations, the primary control center 902 may use other communication topologies to communicate with field sites. Other communication topologies include rings, stars, meshes, trees, lines or series, and busses or multi-drops, among others. Standard and proprietary communication protocols may be used to transport information between the primary control center 902 and field sites 930a-930c. These protocols may use telemetry techniques such as provided by telephone lines, cables, fiber optics, and/or radiofrequency transmissions such as broadcast, microwave, and/or satellite communications.

The field sites 930a-930c in this example perform local control of actuators and monitor local sensors. For example, a first field site 930a may include a PLC 932. A PLC is a small industrial computer originally designed to perform the logic functions formerly executed by electrical hardware (such as relays, switches, and/or mechanical timers and counters). PLCs have evolved into controllers capable of controlling complex processes, and are used extensively in both SCADA systems and distributed control systems. Other controllers used at the field level include process controllers and Remote Terminal Units, which may provide the same level of control as a PLC but may be designed for specific control applications. In SCADA environments, PLCs are often used as field devices because they are more economical, versatile, flexible, and configurable than special-purpose controllers.

The PLC 932 at a field site, such as the first field site 930a, may control local actuators 934, 936 and monitor local sensors 938, 940, 942. Examples of actuators include valves 934 and pumps 936, among others. Examples of sensors include level sensors 938, pressure sensors 940, and flow sensors 942, among others. Any of the actuators 934, 936 or sensors 938, 940, 942 may be "smart" actuators or sensors, more commonly called intelligent electronic devices (IEDs). Intelligent electronic devices may include intelligence for acquiring data, communicating with other devices, and performing local processing and control. An intelligent electronic device could combine an analog input sensor, analog output, low-level control capabilities, a communication system, and/or program memory in one device. The use of intelligent electronic devices in SCADA systems and distributed control systems may allow for automatic control at the local level. Intelligent electronic devices, such as protective relays, may communicate directly with the control server 906. Alternatively or additionally, a local Remote Terminal Unit may poll intelligent electronic devices to collect data, which it may then pass to the control server 906.

Field sites 930a-930c are often equipped with remote access capability that allows field operators to perform remote diagnostics and repairs. For example, the first remote 930a may include a modem 916 connected to the PLC 932. A remote access 950 site may be able to, using a dial up connection, connect to the modem 916. The remote access 950 site may include its own modem 916 for dialing into to the field site 930a over a telephone line. At the remote access 950 site, an operator may use a computer 952 connected to the modem 916 to perform diagnostics and repairs on the first remote field site 930a.

The example SCADA system 900 includes a second field site 930b, which may be provisioned in substantially the same way as the first field site 930a, having at least a modem and a PLC or Remote Terminal that controls and monitors some number of actuators and sensors.

The example SCADA system 900 also includes a third field site 930c that includes a network interface card (NIC) 944 for communicating with the system's 900 WAN 960. In this example, the third field site 930c includes a Remote Terminal Unit 946 that is responsible for controlling local actuators 934, 936 and monitoring local sensors 938, 940, 942. A Remote Terminal Unit, also called a remote telemetry unit, is a special-purpose data acquisition and control unit typically designed to support SCADA remote stations. Remote Terminal Units may be field devices equipped with wireless radio interfaces to support remote situations where wire-based communications are unavailable. In some cases, PLCs are implemented as Remote Terminal Units.

The SCADA system 900 of this example also includes a regional control center 970 and a corporate enterprise network 990. The regional control center 970 may provide a higher level of supervisory control. The regional control center 970 may include at least a human-machine interface station 908 and a control server 906 that may have supervisory control over the control server 906 at the primary control center 902. The corporate enterprise network 990 typically has access, through the system's 900 WAN 960, to all the control centers 902, 904 and to the field sites 930a-930c. The corporate enterprise network 990 may include a human-machine interface station 908 so that operators can remotely maintain and troubleshoot operations.

Another type of industrial control system is the distributed control system (DCS). Distributed control systems are typically used to control production systems within the same geographic location for industries such as oil refineries, water and wastewater management, electric power generation plants, chemical manufacturing plants, and pharmaceutical processing facilities, among others. These systems are usually process control or discrete part control systems. Process control systems may be processes that run continuously, such as manufacturing processes for fuel or steam flow in a power plant, for petroleum production in a refinery, or for distillation in a chemical plant. Discrete part control systems have processes that have distinct processing steps, typically with a distinct start and end to each step, such as found in food manufacturing, electrical and mechanical parts assembly, and parts machining. Discrete-based manufacturing industries typically conduct a series of steps on a single item to create an end product.

A distributed control system typically uses a centralized supervisory control loop to mediate a group of localized controllers that share the overall tasks of carrying out an entire production process. By modularizing the production system, a distributed control system may reduce the impact of a single fault on the overall system. A distributed control system is typically interfaced with a corporate network to give business operations a view of the production process.

Figure 10:
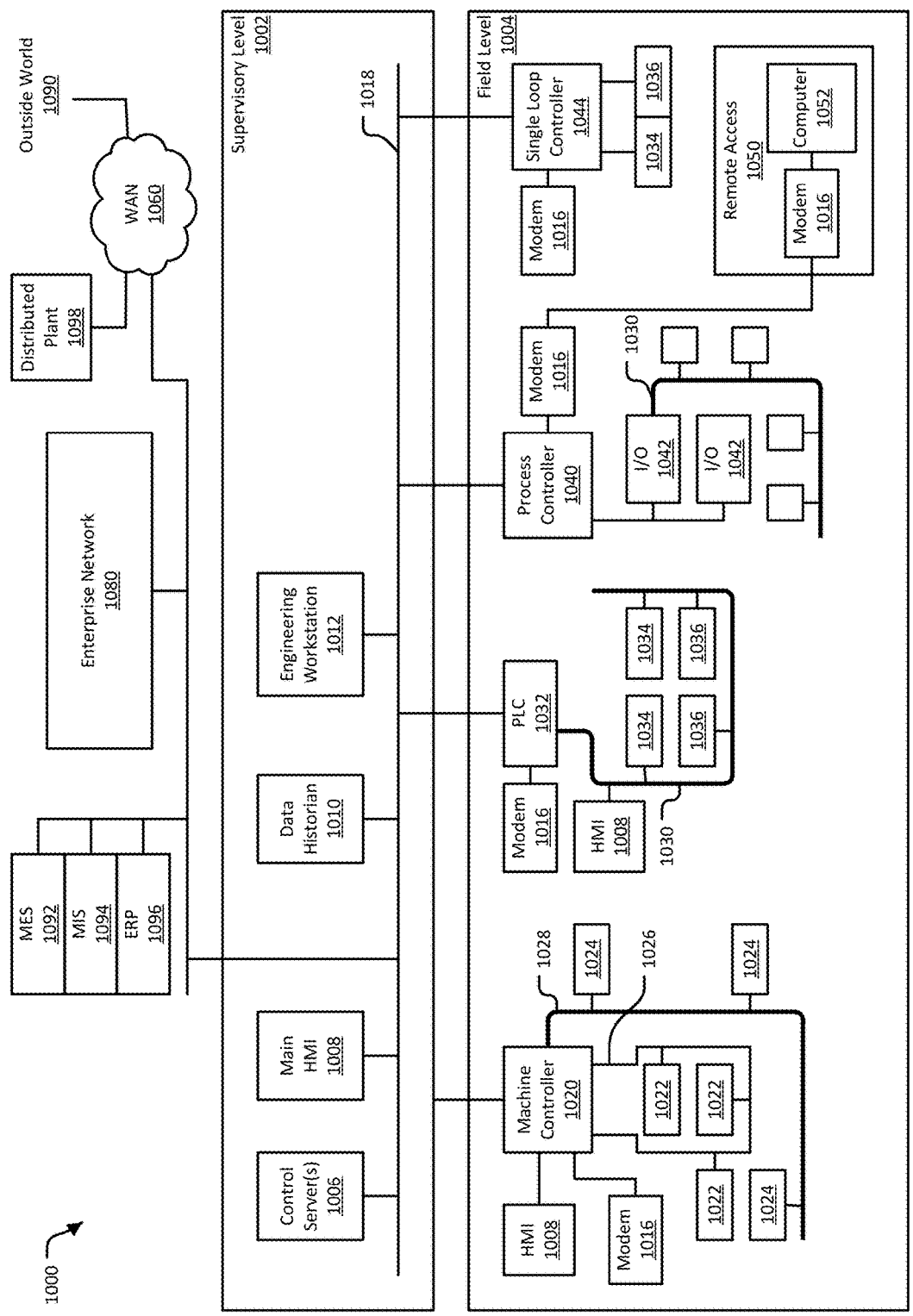
FIG. 10 illustrates an example of a distributed control.

FIG. 10 illustrates an example of a distributed control system 1000. This example distributed control system 1000 encompasses a production facility, including bottom-level production processes at a field level 1004, supervisory control systems at a supervisory level 1002, and a corporate or enterprise layer.

At the supervisory level 1002, a control server 1006, operating as a supervisory controller, may communicate with subordinate systems via a control network 1018. The control server 1006 may send set points to distributed field controllers, and may request data from the distributed field controllers. The supervisory level 1002 may include multiple control servers 1006, with one acting as the primary control server and the rest acting as redundant, back-up control servers. The supervisory level 1002 may also include a main human-machine interface 1008 for use by operators and engineers, a data historian 1010 for logging process information from the system 1000, and engineering workstations 1012.

At the field level 1004, the system 1000 may include various distributed field controllers. In the illustrated example, the distributed control system 1000 includes a machine controller 1020, a PLC 1032, a process controller 1040, and a single loop controller 1044. The distributed field controllers may each control local process actuators, based on control server 1006 commands and sensor feedback from local process sensors.

In this example, the machine controller 1020 drives a motion control network 1026. Using the motion control network 1026, the machine controller 1020 may control a number of servo drives 1022, which may each drive a motor. The machine controller 1020 may also drive a logic control bus 1028 to communicate with various devices 1024. For example, the machine controller 1020 may use the logic control bus 1028 to communicate with pressure sensors, pressure regulators, and/or solenoid valves, among other devices. One or more of the devices 1024 may be an intelligent electronic device. A human-machine interface 1008 may be attached to the machine controller 1020 to provide an operator with local status information about the processes under control of the machine controller 1020, and/or local control of the machine controller 1020. A modem 1016 may also be attached to the machine controller 1020 to provide remote access to the machine controller 1020.

The PLC 1032 in this example system 1000 uses a fieldbus 1030 to communicate with actuators 1034 and sensors 1036 under its control. These actuators 1034 and sensors 1036 may include, for example, direct current (DC) servo drives, alternating current (AC) servo drives, light towers, photo eyes, and/or proximity sensors, among others. A human-machine interface 1008 may also be attached to the fieldbus 1030 to provide operators with local status and control for the PLC 1032. A modem 1016 may also be attached to the PLC 1032 to provide remote access to the PLC 1032.

The process controller 1040 in this example system 1000 also uses a fieldbus 1030 to communicate with actuators and sensors under its control, one or more of which may be intelligent electronic devices. The process controller 1040 may communicate with its fieldbus 1030 through an input/output (I/O) server 1042. An I/O server is a control component typically responsible for collecting, buffering, and/or providing access to process information from control subcomponents. An I/O server may be used for interfacing with third-party control components. Actuators and sensors under control of the process controller 1040 may include, for example, pressure regulators, pressure sensors, temperature sensors, servo valves, and/or solenoid valves, among others. The process controller 1040 may be connected to a modem 1016 so that a remote access 1050 site may access the process controller 1040. The remote access 1050 site may include a computer 1052 for use by an operator to monitor and control the process controller 1040. The computer 1052 may be connected to a local modem 1016 for dialing in to the modem 1016 connected to the process controller 1040.

The illustrated example system 1000 also includes a single loop controller 1044. In this example, the single loop controller 1044 interfaces with actuators 1034 and sensors 1036 with point-to-point connections, instead of a fieldbus. Point-to-point connections require a dedicated connection for each actuator 1034 and each sensor 1036. Fieldbus networks, in contrast, do not need point-to-point connections between a controller and individual field sensors and actuators. In some implementations, a fieldbus allows greater functionality beyond control, including field device diagnostics. A fieldbus can accomplish control algorithms within the fieldbus, thereby avoiding signal routing back to a PLC for every control operation. Standard industrial communication protocols are often used on control networks and fieldbus networks.

The single loop controller 1044 in this example is also connected to a modem 1016, for remote access to the single loop controller.

In addition to the supervisory level 1002 and field level 1004 control loops, the distributed control system 1000 may also include intermediate levels of control. For example, in the case of a distributed control system controlling a discrete part manufacturing facility, there could be an intermediate level supervisor for each cell within the plant. This intermediate level supervisor could encompass a manufacturing cell containing a machine controller that processes a part, and a robot controller that handles raw stock and final products. Additionally, the distributed control system could include several of these cells that manage field-level controllers under the main distributed control system supervisory control loop.

In various implementations, the distributed control system may include a corporate or enterprise layer, where an enterprise network 1080 may connect to the example production facility. The enterprise network 1080 may be, for example, located at a corporate office co-located with the facility, and connected to the control network 1018 in the supervisory level 1002. The enterprise network 1080 may provide engineers and managers with control and visibility into the facility. The enterprise network 1080 may further include Manufacturing Execution Systems (MES) 1092, control systems for managing and monitoring work-in-process on a factory floor. An MES can track manufacturing information in real time, receiving up-to-the-minute data from robots, machine monitors and employees. The enterprise network 1080 may also include Management Information Systems (MIS) 1094, software and hardware applications that implement, for example, decision support systems, resource and people management applications, project management, and database retrieval applications, as well as basic business functions such as order entry and accounting. The enterprise network 1080 may further include Enterprise Resource Planning (ERP) systems 1096, business process management software that allows an organization to use a system of integrated applications to manage the business and automate many back office functions related to technology, services, and human resources.

The enterprise network 1080 may further be connected to a WAN 1060. Through the WAN 1060, the enterprise network 1080 may connect to a distributed plant 1098, which may include control loops and supervisory functions similar to the illustrated facility, but which may be at a different geographic location. The WAN 1060 may also connect the enterprise network to the outside world 1090, that is, to the Internet and/or various private and public networks. In some cases, the WAN 1060 may itself include the Internet, so that the enterprise network 1080 accesses the distributed plant 1098 over the Internet.

As described above, SCADA systems and distributed control systems use Programmable Logic Controllers (PLCs) as the control components of an overall hierarchical system. PLCs can provide local management of processes through feedback control, as described above. In a SCADA implementation, a PLC can provide the same functionality as a Remote Terminal Unit. When used in a distributed control system, PLCs can be implemented as local controllers within a supervisory scheme. PLCs can have user-programmable memory for storing instructions, where the instructions implement specific functions such as I/O control, logic, timing, counting, proportional-integral-derivative (PID) control, communication, arithmetic, and data and file processing.

Figure 11:
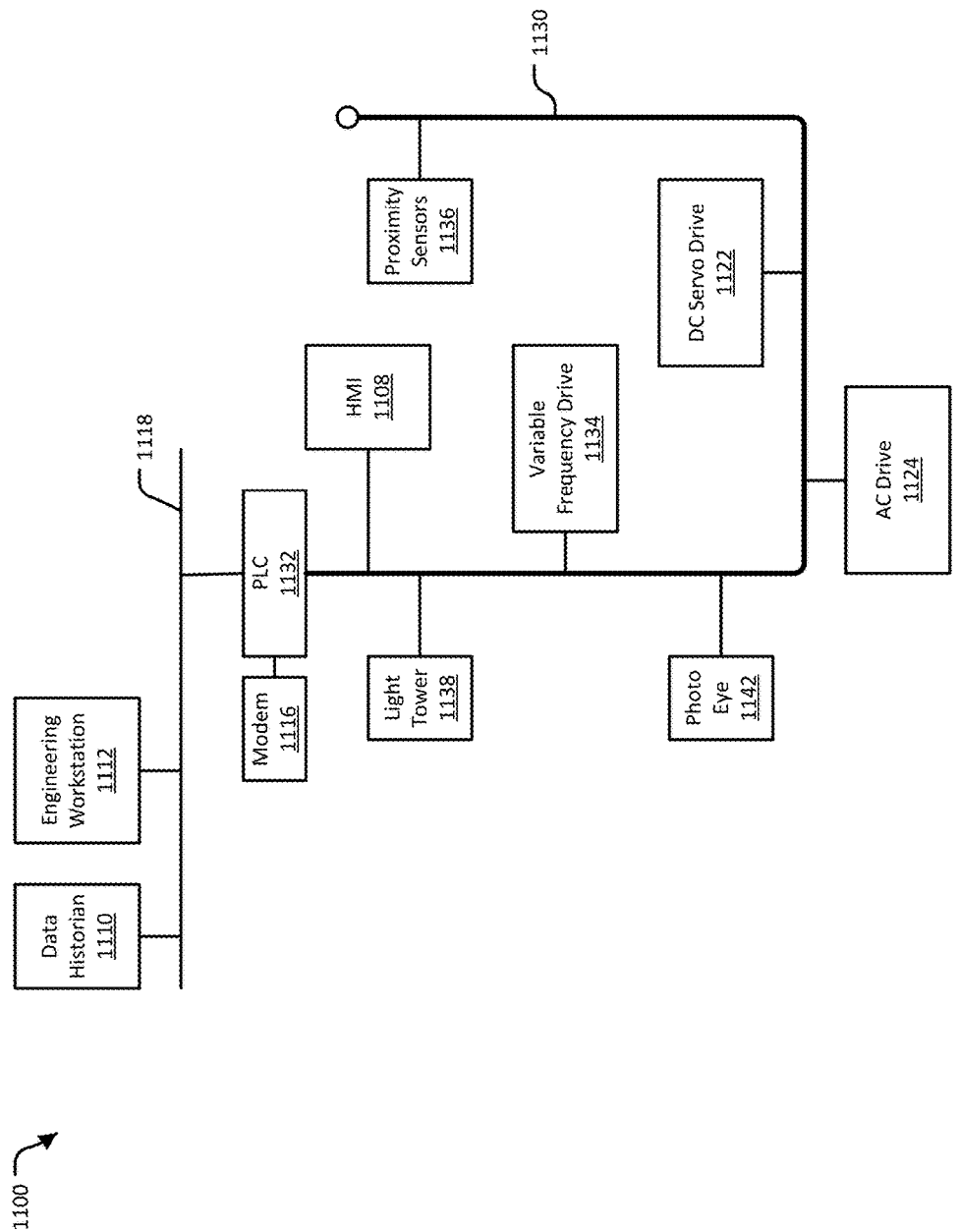
FIG. 11 illustrates an example of a PLC implemented in a manufacturing control process.

FIG. 11 illustrates an example of a PLC 1132 implemented in a manufacturing control process. The PLC 1132 in this example monitors and controls various devices over fieldbus network 1130. The PLC 1132 may be connected to a LAN 1118. An engineering workstation 1112 may also be connected to the LAN 1118, and may include a programming interface that provides access to the PLC 1132. A data historian 1110 on the LAN 1118 may store data produced by the PLC 1132.

The PLC 1132 in this example may control a number of devices attached to its fieldbus network 1130. These devices may include actuators, such as a DC servo drive 1122, an AC drive 1124, a variable frequency drive 1134, and/or a light tower 1138. The PLC 1132 may also monitor sensors connected to the fieldbus network 1130, such as proximity sensors 1136, and/or a photo eye 1142. A human-machine interface 1108 may also be connected to the fieldbus network 1130, and may provide local monitoring and control of the PLC 1132.

Most industrial control systems were developed years ago, long before public and private networks, desktop computing, or the Internet were a common part of business operations. These well-established industrial control systems were designed to meet performance, reliability, safety, and flexibility requirements. In most cases, they were physically isolated from outside networks and based on proprietary hardware, software, and communication protocols that included basic error detection and correction capabilities, but lacked secure communication capabilities. While there was concern for reliability, maintainability, and availability when addressing statistical performance and failure, the need for cyber security measures within these systems was not anticipated. At the time, security for industrial control systems mean physically securing access to the network and the consoles that controlled the systems.

Internet-based technologies have since become part of modern industrial control systems. Widely available, low-cost IP devices have replaced proprietary solutions, which increases the possibility of cyber security vulnerabilities and incidents. Industrial control systems have adopted Internet-based solutions to promote corporate connectivity and remote access capabilities, and are being designed and implemented using industry standard computers, operating systems (OS) and network protocols. As a result, these systems may to resemble computer networks. This integration supports new networking capabilities, but provides less isolation for industrial control systems from the outside world than predecessor systems. Networked industrial control systems may be exposed to similar threats as are seen in computer networks, and an increased likelihood that an industrial control system can be compromised.

Industrial control system vendors have begun to open up their proprietary protocols and publish their protocol specifications to enable third-party manufacturers to build compatible accessories. Organizations are also transitioning from proprietary systems to less expensive, standardized technologies such as Microsoft Windows and Unix-like operating systems as well as common networking protocols such as TCP/IP to reduce costs and improve performance. Another standard contributing to this evolution of open systems is Open Platform Communications (OPC), a protocol that enables interaction between control systems and PC-based application programs. The transition to using these open protocol standards provides economic and technical benefits, but also increases the susceptibility of industrial control systems to cyber incidents. These standardized protocols and technologies have commonly known vulnerabilities, which are susceptible to sophisticated and effective exploitation tools that are widely available and relatively easy to use.

Industrial control systems and corporate networking systems are often interconnected as a result of several changes in information management practices, operational, and business needs. The demand for remote access has encouraged many organizations to establish connections to the industrial control system that enable of industrial control systems engineers and support personnel to monitor and control the system from points outside the control network. Many organizations have also added connections between corporate networks and industrial control systems networks to allow the organization's decision makers to obtain access to critical data about the status of their operational systems and to send instructions for the manufacture or distribution of product.

In early implementations this might have been done with custom applications software or via an OPC server/gateway, but, in the past ten years this has been accomplished with TCP/IP networking and standardized IP applications like File Transfer Protocol (FTP) or Extensible Markup Language (XML) data exchanges. Often, these connections were implemented without a full understanding of the corresponding security risks. In addition, corporate networks are often connected to strategic partner networks and to the Internet. Control systems also make more use of WANs and the Internet to transmit data to their remote or local stations and individual devices. This integration of control system networks with public and corporate networks increases the accessibility of control system vulnerabilities. These vulnerabilities can expose all levels of the industrial control system network architecture to complexity-induced error, adversaries and a variety of cyber threats, including worms and other malware.

Many industrial control system vendors have delivered systems with dial-up modems that provide remote access to ease the burdens of maintenance for the technical field support personnel. Remote access can be accomplished, for example, using a telephone number, and sometimes an access control credential (e.g., valid ID, and/or a password). Remote access may provide support staff with administrative-level access to a system. Adversaries with war dialers—simple personal computer programs that dial consecutive phone numbers looking for modems—and password cracking software could gain access to systems through these remote access capabilities. Passwords used for remote access are often common to all implementations of a particular vendor's systems and may have not been changed by the end user. These types of connections can leave a system highly vulnerable because people entering systems through vendor-installed modems are may be granted high levels of system access.

Organizations often inadvertently leave access links such as dial-up modems open for remote diagnostics, maintenance, and monitoring. Also, control systems increasingly utilize wireless communications systems, which can be vulnerable. Access links not protected with authentication and/or encryption have the increased risk of adversaries using these unsecured connections to access remotely controlled systems. This could lead to an adversary compromising the integrity of the data in transit as well as the availability of the system, both of which can result in an impact to public and plant safety. Data encryption may be a solution, but may not be the appropriate solution in all cases.

Many of the interconnections between corporate networks and industrial control systems require the integration of systems with different communications standards. The result is often an infrastructure that is engineered to move data successfully between two unique systems. Because of the complexity of integrating disparate systems, control engineers often fail to address the added burden of accounting for security risks. Control engineers may have little training in security and often network security personnel are not involved in security design. As a result, access controls designed to protect control systems from unauthorized access through corporate networks may be minimal. Protocols, such as TCP/IP and others have characteristics that often go unchecked, and this may counter any security that can be done at the network or the application levels.

Public information regarding industrial control system design, maintenance, interconnection, and communication may be readily available over the Internet to support competition in product choices as well as to enable the use of open standards. Industrial control system vendors also sell toolkits to help develop software that implements the various standards used in industrial control system environments. There are also many former employees, vendors, contractors, and other end users of the same industrial control system equipment worldwide who have inside knowledge about the operation of control systems and processes.

Information and resources are available to potential adversaries and intruders of all calibers around the world. With the available information, it is quite possible for an individual with very little knowledge of control systems to gain unauthorized access to a control system with the use of automated attack and data mining tools and a factory-set default password. Many times, these default passwords are never changed.

IV. Deception Center

The various customer networks described above may have some network security systems, or may have little network security. Each may be better protected by a network security system, such as the deception-based system discussed above.

Figure 12:
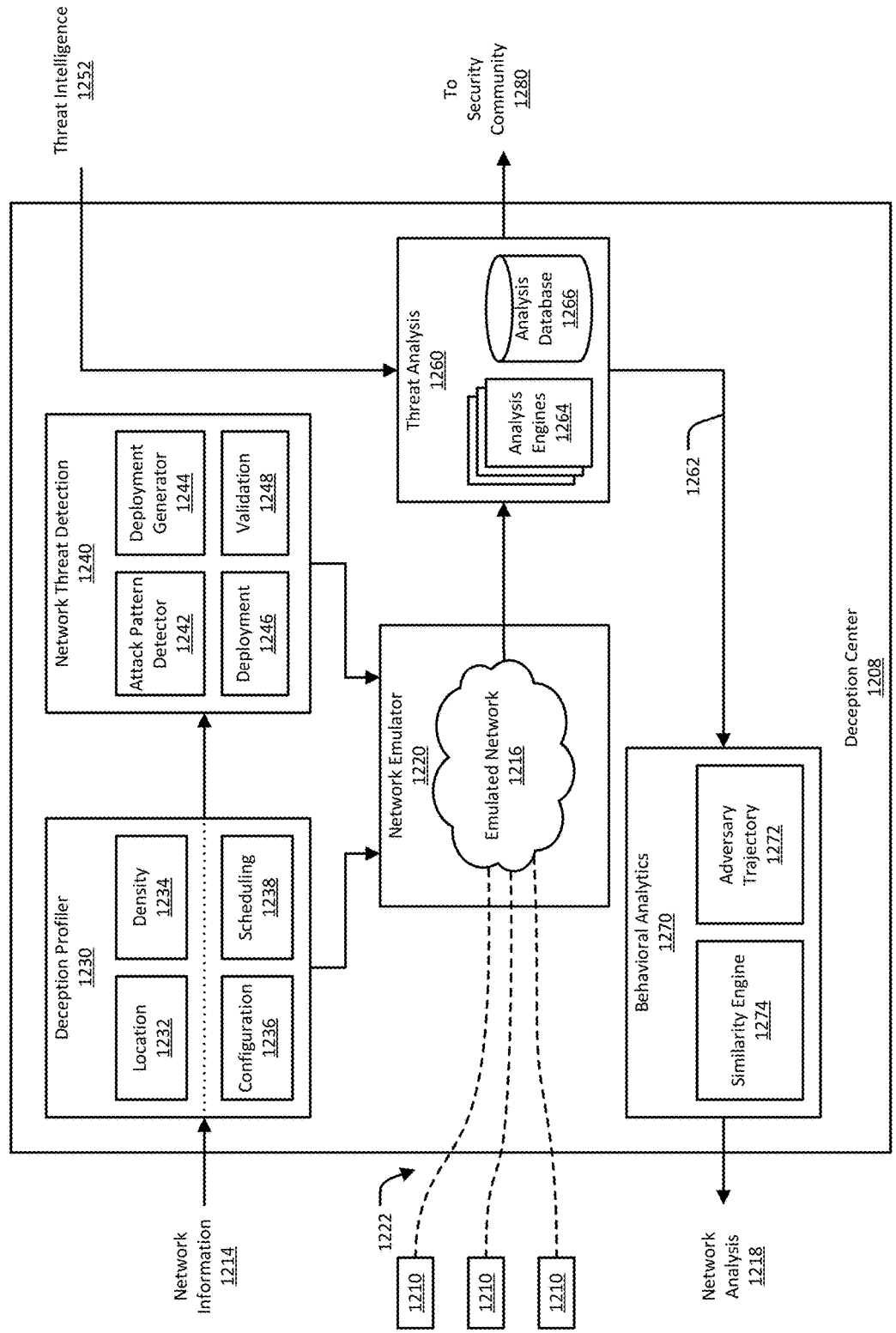
FIG. 12 illustrates an example of a deception center.

As discussed above, a network threat and analysis system may include a deception center that is configured to provide network threat detection, analysis of network threats, and defense against network threats. FIG. 12 illustrates an example of a deception center 1208. In this example, the deception center 1208 includes at least five major components: a network emulator 1220, a deception profiler 1230, a network threat detection engine 1240, a threat analysis engine 1260, and a behavioral analytics engine 1270. In various implementations, each of these components may be implemented using hardware, software, or a combination of hardware and software. In some implementations, one or more of the components may be combined. In some implementations, one or more of the components may be broken down into multiple components. In some implementations, the deception center 1208 may be implemented as a single appliance. In some implementations, the deception center 1208 may be implemented using a combination of computing systems. For example, one or more of the five example components may be implemented in a separate server. Alternatively or additionally, one or more of the components can be implemented as software processes. Alternatively or additionally, one or more of the components can be combined into one software process.

The network emulator 1220 may be a system configured to host an emulated network 1216. The emulated network 1216 may include one or more emulated network devices. An emulated network device is a hardware and/or software component configured to mimic some or all of the behavior of a network device that may be found in a site network. For example, an emulated network device may include at least a distinct MAC address and IP address. The emulated network devices in the emulated network 1216 may be used as deception mechanism in a site network. The emulated network devices may include, for example, address deception mechanisms, low-interaction deception mechanisms, and/or high-interaction deception mechanisms. In various implementations, the emulated network 1216 may be quickly reconfigured. For example, new emulated network devices can be launched or existing emulated network devices can be removed. Alternatively or additionally, emulated network devices can be reconfigured. For example, an address deception can be escalated to a low-interaction deception, and/or a low-interaction deception can be escalated to a high-interaction deception. In some implementations, the emulated network 1216 may be configured to act and respond as a fully functional network. In these implementations, the emulated network 1216 may be referred to as a high-interaction network.

The emulated network 1216 may be connected to one or more sensors 1210 installed in the site network over network tunnels 1222. The emulated network devices can be projected over the network tunnels 1222 and through the sensors 1210 into the site network, where they emulated network devices can function as deception mechanisms. The network emulator 1220 is described in further detail below.

The deception profiler 1230 may be configured to analyze the site network to determine which deception mechanisms to deploy into the site network, where to deploy them, and/or when to deploy them. The deception profiler 1230 may receive network information 1214 from the site network. This network information 1214 may include information such as subnet addresses, IP addresses in use, an identity and/or configuration of devices in the site network, and/or profiles of usage patterns of the devices in the site network. Using this information, the deception profiler 1230 may configure one or more deception mechanisms. For example, the deception profiler 1230 may instruct the network emulator 1220 to reconfigure the emulated network 1216.

The deception profiler 1230 in this example includes a location engine 1232, a density engine 1234, a configuration engine 1236, and a scheduling engine 1238. The location engine 1232 may determine where in the site network to deploy deception mechanisms. The density engine 1234 may determine how many deception mechanisms to deploy. The configuration engine 1236 may determine how each deception mechanism is to be configured, and may provide configurations to the network emulator 1220. The scheduling engine 1238 may determine when a deception mechanism should be deployed and/or activated. The components of the deception profiler 1230 are described in further detail below.

The network threat detection engine 1240 may be configured to monitor the site network and watch for possible attacks. For example, the network threat detection engine 1240 may detect an access to a deception mechanism. The network threat detection engine 1240 may further attempt to confirm that suspicious activity in the site network is an actual attack. To do so, in various implementations, the network threat detection engine 1240 may instruct the network emulator 1220 to reconfigure the emulated network 1216 to create deceptions that are more attractive to an attacker and/or to contain the possible attacker to the emulated network 1216.

In this example, the network threat detection engine 1240 includes an attack pattern detector 1242, a deployment generator 1244, a deployment engine 1246, and a validation engine 1248. The attack pattern detector 1242 may receive network information 1214 from various network devices in the site network, and analyze the network information 1214 to determine whether a network abnormality has occurred or is occurring. The deployment generator 1244 may analyzes suspected attack patterns from the attack pattern detector 1242 to determine what should be done to confirm that an attack has occurred or is in progress. The deployment engine 1246 may implement a deployment strategy generated by the deployment generator 1244. The deployment strategy may include instructing the network emulator 1220 to add, remove, and/or modify emulated network devices in the emulated network 1216, and/or to modify the deception mechanisms projected into the site network. The validation engine 1248 may analyze the deployment strategy and feedback data received from the site network and/or the emulated network 1216 to confirm whether an attack has occurred. The network threat detection engine 1240 is described in further detail below.

The threat analysis engine 1260 may receive data collected from the emulated network during the course of an incident that has been allowed to proceed within the emulated network 1216. Generally, when a suspected threat to the site network has been detected, the components of the deception center 1208 may redirect and contain suspect network traffic related to the attack to the emulated network 1216. Once contained to the emulated network 1216, the suspected attacked may be allowed to proceed. By allowing the suspected attack to proceed, information can be learned about the suspected attack, such as the manner of the attack, the motivation for the attack, network vulnerabilities that allow the attack to proceed, and so on. As the attack is allowed to proceed, information is collected by the emulated network 1216, such as log files, memory snapshots, packets, and any other information that may be generated by suspect network traffic and interacting with suspect network traffic.

In various implementations, the threat analysis engine 1260 may include one or more analysis engines 1264 for analyzing different types of data collected in the network emulator. To analyze the data, in some implementations the threat analysis engine 1260 may receive threat intelligence 1252 from, for example, the network security community. The threat intelligence 1252 may include, for example, descriptions of current (e.g. for a given day or hour or minute) known network threats. The threat analysis engine 1260 may also include an analysis database 1266 for storing data collected in the emulated network 1216 and/or analysis results from the analysis engines 1264.

In various implementations, the threat analysis engine 1260 may produce indicators 1262 that describe a particular incident that was analyzed using the emulated network 1216. These indicators 1262 may include, for example, digital signatures of malicious files, IP addresses of malicious sites, and/or descriptions of the course of events in the incident. In some implementations, the indicators may be provided to the network security community 1280. The indicators 1262 may also be provided to the behavioral analytics engine 1270. The threat analysis engine 1260 is described in further detail below.

The behavioral analytics engine 1270 includes two engines that may be used to analyze a site network for an attack or suspected attack: an adversary trajectory engine 1272 and a similarity engine 1274.

The adversary trajectory engine 1272 may analyze the various ways in which an attack may have occurred in a site network. Using this information, and possibly also the indicators 1262, the adversary trajectory engine 1272 may trace the possible path of a specific incident in the site network. This path may point to network devices in the site network that could have been affected by the incident. These network devices can be checked to determine whether they have, in fact, been affected.

The similarity engine 1274 may use the indicators 1262 to identify similar machines. For example, given emulated network devices in the emulated network 1216, the similarity engine 1274 may determine query items from, for example, the indicators 1262, and use the query items to identify similar network devices in the site network. Alternatively or additionally, the similarity engine 1274 may receive query items generated from network devices in the site network, and may use those query items to find similar network devices in the site network.

The adversary trajectory engine 1272 and the similarity engine 1274 are each described in further detail below.

Using the adversary trajectory engine 1272 and/or the similarity engine 1274, the behavioral analytics engine 1270 may produce a network analysis 1218. The network analysis 1218 may indicate, for example, whether the site network has been exposed to a particular attack, which (if any) network devices may have been affected by the attack, how the network devices were affected by the attack, and/or how the site network's security can be improved. The network analysis 1218 can be used to scrub the effects of an attack from the site network, and/or to increase the security of the site network.

V. Threat Analysis

In various implementations, a deception center may be provided with a targeted threat analysis engine to analyze suspect network traffic. When suspect network traffic is received by a emulated network in the deception center, the emulated network may record results from conducting static, dynamic, and/or network analysis of the suspect traffic. The emulated network may be configured to record data over the course of an incident. An "incident" is an attack or suspected attack on a network. The emulated network may be configured to record data for an incident from the time a suspected attack is detected until the suspected attack is terminated.

Figure 13:
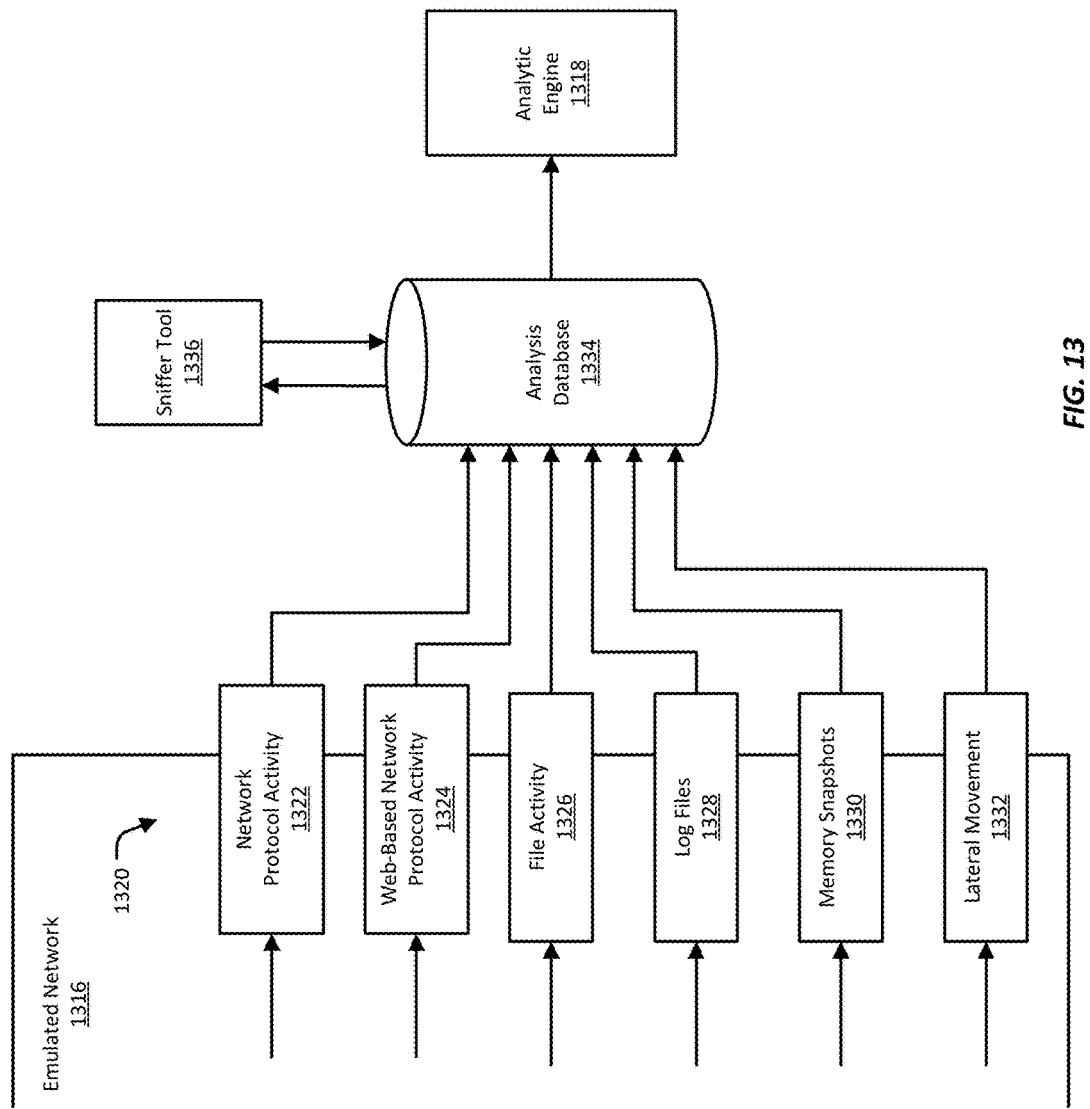
FIG. 13 illustrates examples of the data that may be collected over the course of an incident from processes and monitoring tools analyzing suspect network traffic in a emulated network.

FIG. 13 illustrates examples of the data 1320 that may be collected over the course of an incident from processes and monitoring tools analyzing suspect network traffic in a emulated network 1316. FIG. 13 further illustrates that, in some implementations, the threat intelligence engine may include an analysis database 1334 that serves as a repository for the data 1320 collected in the emulated network 1316. In some implementations, the threat intelligence engine may include a sniffer tool 1336, for prioritizing and filtering the data collected in the analysis database. The threat intelligence engine may provide data from the analysis database to the analytic engine 1318, where the data can be analyzed.

In various implementations, the data 1320 collected from the emulated network 1316 may include network protocol activity 1322, web-based network protocol activity 1324, file activity 1326, log files 1328, memory snapshots 1330, and captured lateral movement 1332. These types of data 1320 are provided as examples of the type of data that may be collected, and other types of data may be collected, based on what data is available and what data is desired.

Network protocol activity 1322 may include network traffic related to various networking protocols. Network traffic associated with network protocol activity 1322 may include network traffic coming into a customer network and/or network traffic going out of the customer network. This network traffic can include, for example, email, DNS requests for servers other than web servers, SMB traffic originating inside the customer network and accessing servers outside the customer network or originating outside the customer network and accessing servers inside the customer network, and/or FTP traffic that is unrelated to webpage content, among other things. Network protocol activity 1322 may be captured by, for example, network packet monitoring tools or in log files.

Web-based network protocol activity 1324 may include network traffic associated with accessing websites. The websites being accessed may be located on web servers located outside the customer network; that is, external web sites being accessed by a user inside the customer network. The websites being accessed may alternatively or additionally include websites hosted by the customer network itself, and being accessed by a user either inside or outside the customer network. Web-based network traffic may include, for example, DNS packets requesting the IP address of a website, Hyper-Text Transfer Protocol (HTTP) packets for transferring webpages, file transfer protocol (FTP) packets for transferring webpage content, such as image files, and/or packets exchanging user authentication information. Web-based network protocol activity 1324 may be captured by, for example, network packet monitoring tools or in log files.

In various implementations, web-based network protocol activity 1324 may be included within the network protocol activity 1322.

File activity 1326 may include information learned from static analysis of files found in the content of suspect network traffic. File activity 1326 can include, for example, the output of virus scans, a description of contents of files, components such as macros and scripts extracted from files, results from opening files, and/or results from deconstructing files (e.g., compiling or decompressing the file), among other things. File activity 1326 may be captured by processes executing the static analysis. File activity 1326 may also be captured by the testing device executing the static analysis, which may produce, for example, the output of virus scanners, de-compilers, emulators, and so on.

Log files 1328 include log files produced during dynamic analysis of the contents of suspect network traffic. These log files may be generated, for example, by the emulated system that is the release point for the contents of the suspect network traffic. These log files may include, for example, log files that are typically generated by an operating system. These log files capture information such as operating system kernel activity, user-level application programming interface activity, user log in attempts, and commands entered by a user, among many others. The log files 1328 may also include the output of processes specifically monitoring calls made from the release point to other devices in the emulated network 1316. These log files may capture information such as downloading of files from outside the customer network, uploading files from the customer network to an outside server, creating, deleting, copying, modifying, moving, decrypting, encrypting, decompressing, and/or compressing files, and network traffic to other devices, such as login attempts and port scanning. In various implementations, log files deemed interesting (which may include all log files generated by devices emulated in the emulated network 1316) are provided to the analysis database 1334.

Memory snapshots 1330 may be taken at various times over the course of an incident. For example, the emulated network 1316 may take before and after snapshots of emulated memory structures in the emulated network 1316. For example, real servers, workstations, routers, and other network devices typically include some memory. In some implementations, the emulated network 1316, when emulating these devices, may also emulate any memory that they include. The emulated network 1316 may further produce snapshots of each memory before suspect network traffic is analyzed, as well as after. A memory snapshot is a copy of the contents of a memory. In some implementations, the emulated network 1316 may alternatively or additionally produce memory snapshots of the test devices being used to create the emulated network 1316. As discussed above, the emulated network 1316 is built from physical equipment, such as a rack of servers, which has its own memory. This memory may be captured in snapshots at various intervals, particularly during the analysis of suspect network traffic. Alternatively or additionally, the emulated network 1316 may take memory snapshots 1330 during the course of dynamic analysis of files. For example, the emulated network may take a memory snapshot 1330 during the execution of a file. This memory snapshot may provide some insight into the contents of the file.

Lateral movement 1332 is, as described above, the movement of an attack from one network device to another. Lateral movement 1332 may be captured, for example, as a trace of activity among multiple devices emulated in the emulated network 1316. In some implementations, lateral movement 1332 may be extracted from network protocol activity 1322, web-based network protocol activity 1324, file activity 1326, and/or log files 1328. For example, file activity 1326 may show downloading of malware and log files 1328 may capture login attempts. Lateral movement 1332 data may put this information together and provide a cohesive description of an attack.

As noted above, the data 1320 extracted from the emulated network 1316 may be accumulated in an analysis database 1334. In some implementations, the threat intelligence engine may include a sniffer tool 1336. In these implementations, the sniffer tool 1336 may prioritize and filter the data stored in the analysis database 1334. For example, the sniffer tool 1336 may generate alerts upon finding particularly suspect information (e.g., by finding a digital signature for the information on a blacklist). As another example, the sniffer tool 1336 may identify data known to be safe (e.g., because a digital signature for the data or a domain extracted from the data can be found on a whitelist), and remove this data from the analysis database 1334. As another example, the sniffer tool 1336 may extract files out of network packets. As another example, the sniffer tool 1336 may generate digital signatures for files, packets, or other data in the analysis database 1334. As another example, the sniffer tool 1336 may trim routine information from log files, so that the log files record primarily suspect activity. As another example, the sniffer tool 1336 may organize related information together, such as for example putting together network traffic and log files related to lateral movement. In some implementations, the sniffer tool 1336 may thus serve to reduce the volume of data that may need to be analyzed. The sniffer tool 1336 may also be referred to as a network protocol parser. One example of a sniffer tool 1336 is the Bro Network Security Monitor.

Figure 14:
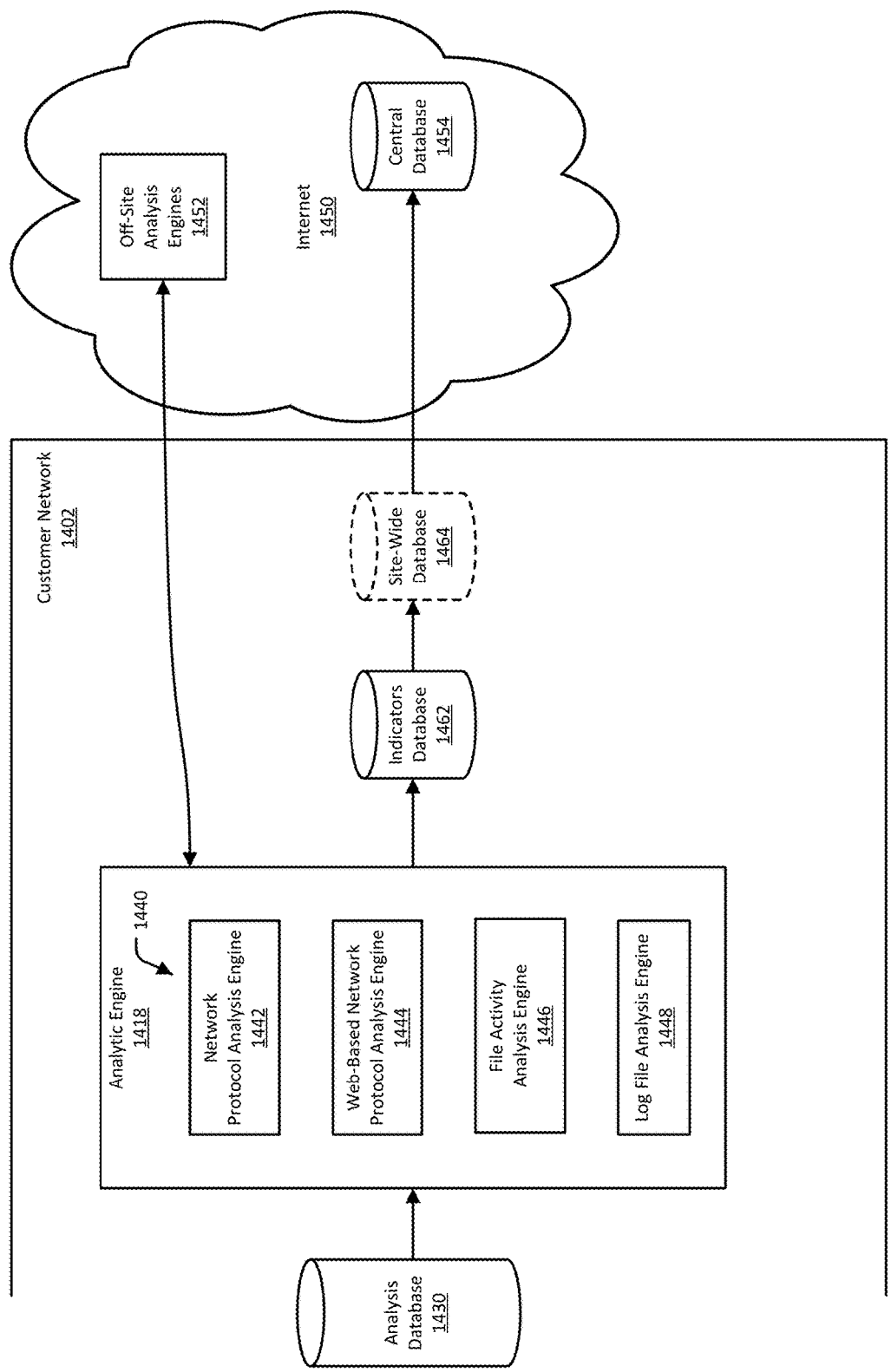
FIG. 14 illustrates an example of the operations of an analytic engine.

The contents of the analysis database 1334 may be provided to the analytic engine 1318 for detail analysis. FIG. 14 illustrates an example of the operations of an analytic engine 1418. In various implementations, the analytic engine 1418 may include multiple analysis engines 1440. Each analysis engine 1440 may analyze a different type of data stored in an analysis database 1430. Generally, each analysis engine 1440 may apply one or more of heuristic algorithms, probabilistic algorithms, machine learning algorithms, and/or pattern matching algorithms, in addition to emulators, to detect whether data (e.g., files, email, network packets, etc.) from the analysis database 1430 is malicious. Each analysis engine 1440 may further include sub-modules and plugins, which are also able to apply heuristic, probabilistic, machine learning, and/or pattern matching algorithms, as well as emulators, to determine whether some data is malicious. In various implementations, the analysis engines 1440 may be configured to operate in parallel, such that the analytic engine 1418 is able to analyze many types of data at the same time. In some implementations, the analytic engine 1418 may have additional analysis engines 1440 not illustrated here. In some implementations, the analytic engine 1418 may have fewer analysis engines 1440, depending on what is required for a particular implementation.

In this example, the analytic engine 1418 includes a network protocol analysis engine 1442, a web-based network protocol analysis engine 1444, a file activity analysis engine 1446, and a log file analysis engine 1448. As discussed in further detail below, each of these analysis engines 1440 processes a different type of data from the analysis database 1430. The network protocol analysis engine 1442 processes results from network and dynamic analysis of network traffic. The web-based network protocol analysis engine 1444 processes results from network analysis of network traffic related to access of websites. The file activity analysis engine 1446 processes data captured during static analysis of the content of suspect network traffic. The log file analysis engine 1448 processes log file data. In some implementations, the analysis engines 1440 may, also work together to analyze data from the analysis database 1430. For example, file activity analyzed by the file activity analysis engine 1446 may be correlated against network activity analyzed by the web-based network protocol analysis engine 1444 and the network protocol analysis engine 1442 to produce a network history of lateral movement of an attack. As further example, information provided by the network analysis may be searched for, by the log file analysis engine 1448, to provide an activity trace of lateral movement. In some implementations, the various analysis engines 1440 may be combined into fewer analysis engines, or may be divided into additional sub-engines. For example, in some implementations, the network protocol analysis engine 1442 may also analyze web-based network traffic.

In various implementations, analysis engines 1440 may each produce indicators that describe the data that each analyzes, which may be stored in an indicators database 1462. Indicators describe the suspect network associated with data analyzed by the analysis engines 1440. For example, the network protocol analysis engine 1442 may produce indicators that the describe the source and destination of HTTP-based packets, a description of the webpages associated with the packets, as well as any malicious content downloaded as a result of the HTTP packets. As another example, the network protocol analysis engine 1442 may produce indicators describing SMB packets that uploaded files that should not have left the customer network 1402. As another example, the file activity analysis engine 1446 may provide indicators describing files storing credentials that where modified. As another example, the log file analysis engine 1448 may produce indicators that describe repeated, and thus suspect, login attempts.

In various implementations, the analysis engines 1440 produce static, file, and network indicators that describe and/or identify an threat posed by suspect network traffic, or lack of a threat, if no threat is found. For example, in some implementations, a threat associated with specific suspect network traffic may be identifiable by a name, which is included in an indicator. The indicators may further include information such as timestamps, indicating a start and/or end of the attack, and/or a weight, indicating the severity of the attack, and/or contextual information about the attack, such as the type of network exchanges made during the attack. In some implementations, suspect network traffic that is harmless may also be provided with indicators. In these implementations, the indicators may include a weight value that indicates that the network traffic is harmless.

In some implementations, the analytic engine 1418 may also provide data from the analysis database 1430 to off-site analysis engines 1452, located outside the customer network 1402. Off-site analysis engines 1452 are additional analysis engines that are hosted by a central service located on the Internet 1450. The central service may have analysis engines that the analytic engine 1418 does not have, or does not yet have. For example, central server may have off-site analysis engines 1452 that are more up-to-date, and/or may have off-site analysis engines 1452 that are newer. In some cases, newer off-site analysis engines 1452 may be in a testing phase, prior to being provided to the customer network 1402. The off-site analysis engines 1452 may provide indicators back to the analytic engine 1418. The analytic engine 1418 may add these indicators to the indicators database 1462.

In some implementations, the indicators database 1462 may further provide indicators to a site-wide database 1464. As noted above, the customer network 1402 may include a site-wide database 1464 when the customer network 1402 includes more than one site network. Each site network may be provided with their own threat intelligence engine. Each threat intelligence engine may provide indicators for their analytic engines to the site-wide database 1464.

In some implementations, the indicators database 1462 may provide indicators to a central database 1454, located on the Internet 1450. In implementations that include a site-wide database 1464, the site-wide database 1464 may provide indicators for all of the customer network 1402 to the central database 1454. The central database 1454 is a central repository for indicators that describe suspect network traffic. The central database 1454 may collect indicators from multiple customer networks. The central database 1454 may also share indicators between customer networks. Sharing indictors between customer networks may make all of the customer networks more secure. For example, another customer network may have seen an attack that the illustrated customer network 1402 has not yet experienced. The customer network 1402 may use indicators from the other customer network to improve its network security infrastructure, and thereby possibly improving is defenses against the same attack.

Figure 15:
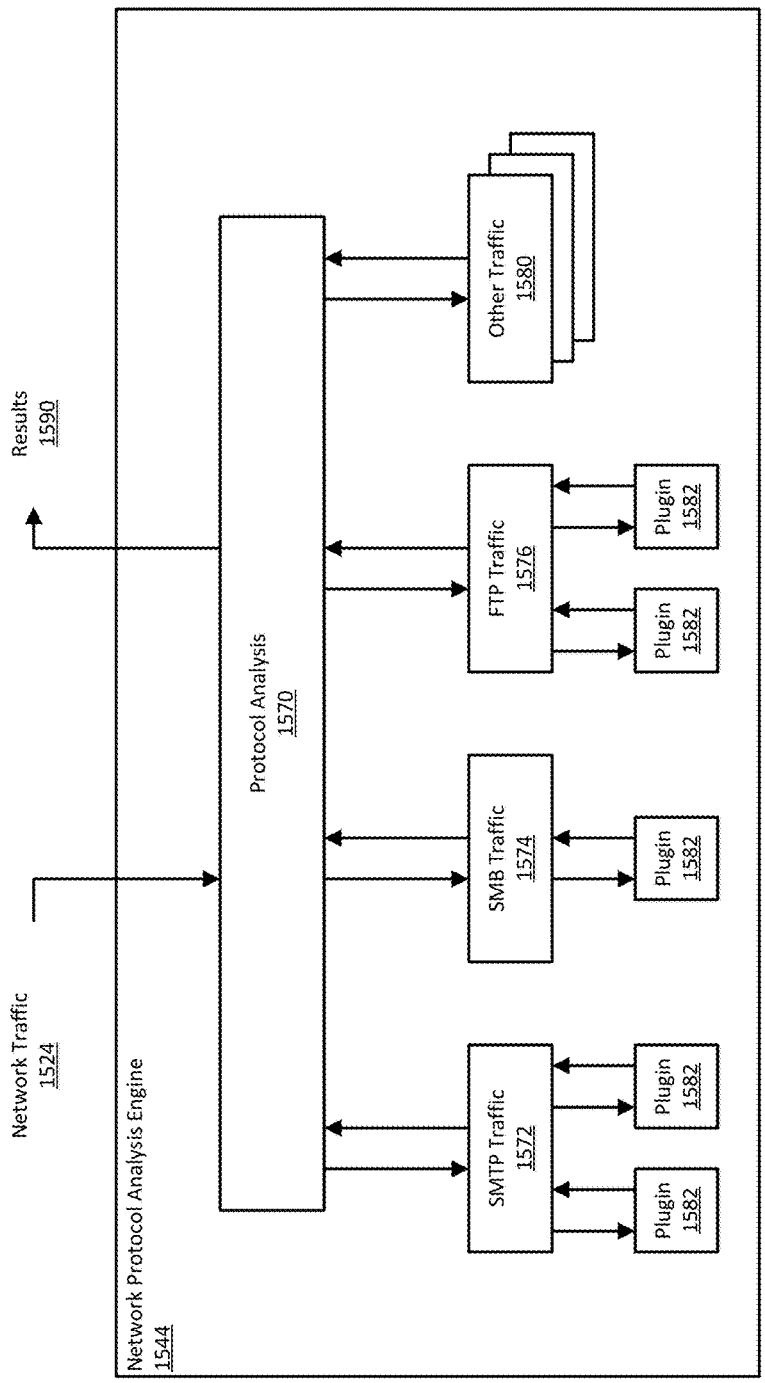
FIG. 15 illustrates an example of a network protocol analysis engine.
Figure 16:
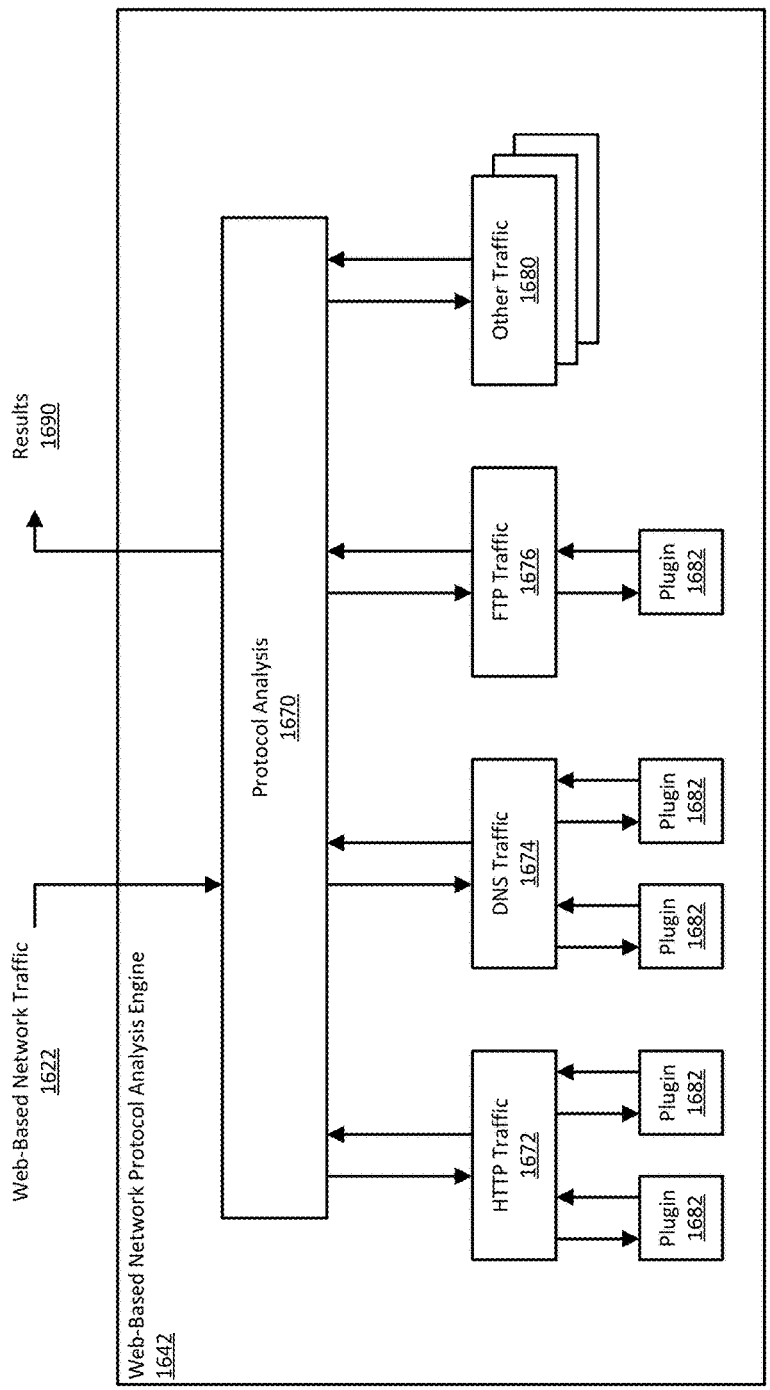
FIG. 16 illustrates an example of a web-based network protocol analysis engine.
Figure 17:
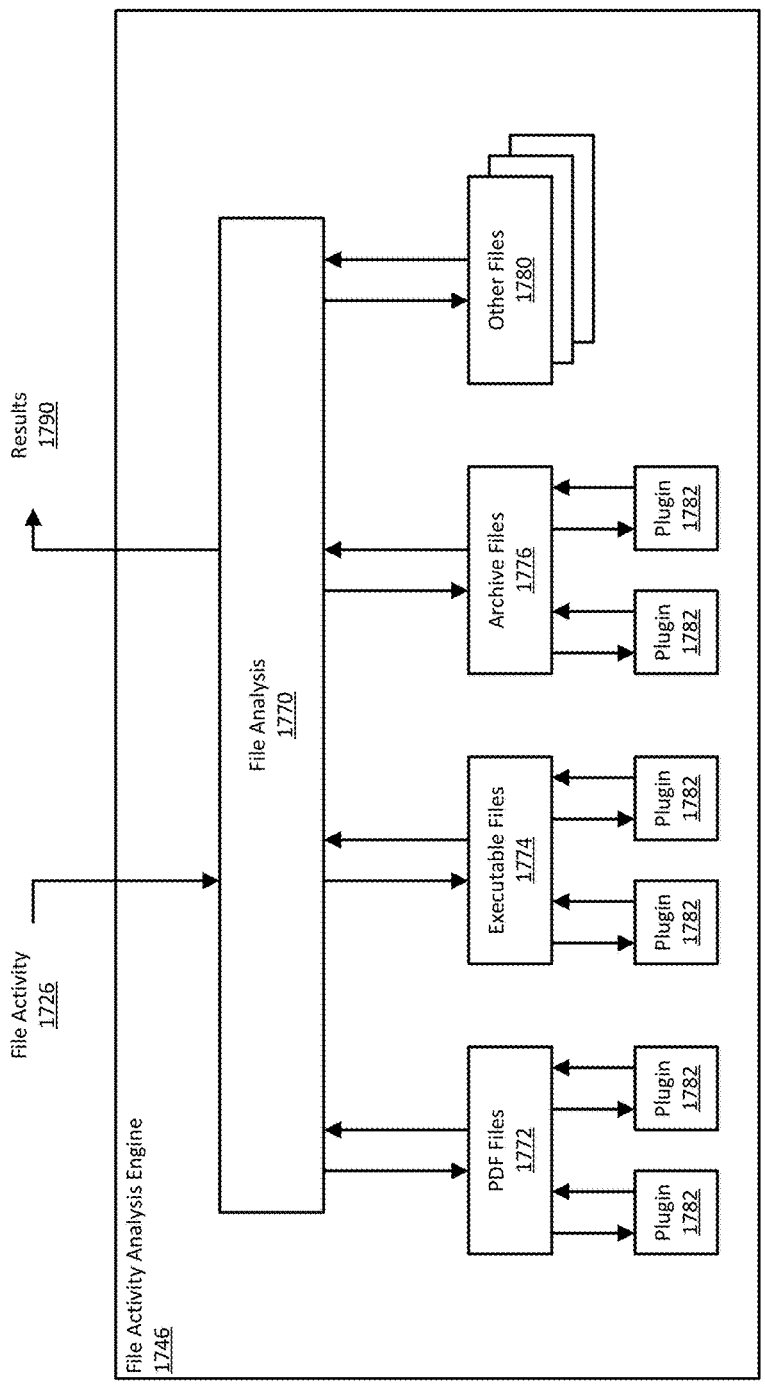
FIG. 17 illustrates an example of a file activity analysis engine.
Figure 18:
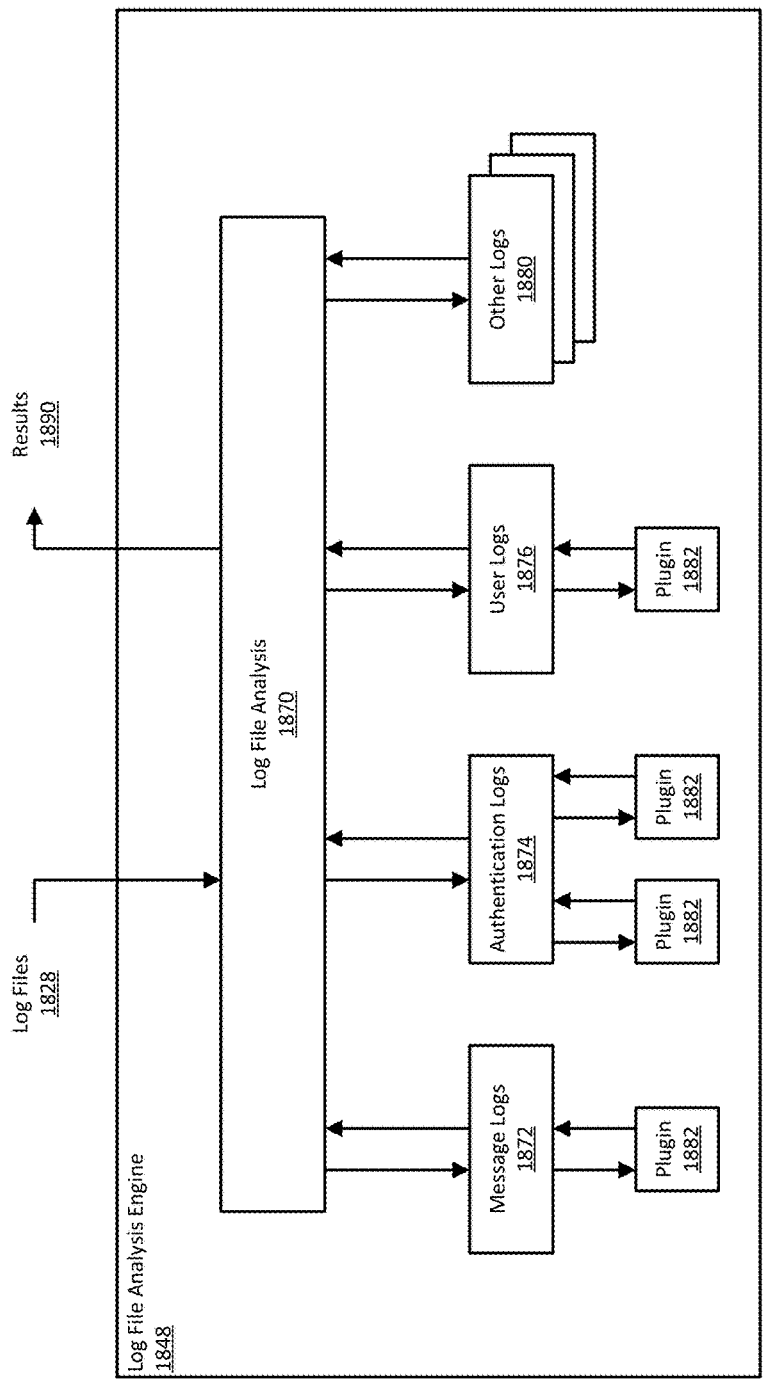
FIG. 18 illustrates an example of a log file analysis engine.

FIGS. 15-18 illustrate examples of the structure and processes of the analysis engines 1440 illustrated in the example of FIG. 14. FIG. 15 illustrates an example of a network protocol analysis engine 1544; FIG. 16 illustrates an example of a web-based network protocol analysis engine 1642; FIG. 17 illustrates an example of a file activity analysis engine 1746; and FIG. 18 illustrates an example of a log file analysis engine 1848.

FIG. 15 illustrates an example of a network protocol analysis engine 1544. The network protocol analysis engine 1544 may analyze network traffic associated with network protocols, in some cases including web-based network protocols. Analyzing non-web-based network traffic separately from web-based network traffic may be beneficial because non-web-based network traffic may use network protocols unrelated to web-based network traffic. Additionally, non-web-based network traffic may be received at different rates, may be used differently, and may harbor different kinds of threats. In various implementations, however, web-based network traffic is analyzed by the network protocol analysis engine 1544, along with non-web-based network traffic. In these implementations, the network protocol analysis engine 1544 can provide comprehensive analysis of the network traffic.

This example network protocol analysis engine 1544 is also arranged modularly and hierarchically. A protocol analysis 1570 receives other network traffic 1524, and may conduct a first stage analysis of the network traffic 1524. For example, the protocol analysis 1570 may identify a network protocol associated with a packet or stream of packets. The protocol analysis 1570 may then invoke a sub-module designed to analyze packets for the identified network protocol. In this example, the network protocol analysis engine 1544 includes sub-modules for Simple Mail Transfer Protocol (SMTP) traffic 1572 (e.g., email), Server Message Block (SMB) traffic 1574 (e.g. resource sharing packets), and FTP traffic 1576. The sub-modules may each be assisted by one or more plugins 1582. The network protocol analysis engine 1544 may also include sub-modules for other traffic 1580 (e.g. FTP, Trivial File Transfer Protocol (TFTP), Remote Desktop Protocol (RDP), Internet Message Access Protocol (IMAP), DNS, DHCP, Transparent Network Substrate (TNS), Lightweight Directory Access Protocol (LDAP), etc.). These other sub-modules may analyze traffic for other network protocols, including ones that are currently known and not illustrated here, and ones that will be developed in the future.

The SMTP traffic 1572 sub-module analyzes suspect email. The SMTP traffic 1572 sub-module may, for example, examining email headers to look for patterns known to be associated with malicious email. The SMTP traffic 1572 sub-module may also examine email content to look for malicious attachments and/or links. The SMTP traffic 1572 sub-module may provide a determination to the protocol analysis 1570 that indicates whether some email was malicious or not, or whether it could not make a determination. The determination from the SMTP traffic 1572 sub-module may be based on its own analysis, or on the analysis of one or more plugins 1582, or on a combined analysis.

The SMB traffic 1574 sub-module analyzes packets associated with shared access to files, printers, ports, and miscellaneous communications between devices in a network. SMB packets may also provide an authenticated inter-process communication mechanism. The SMB traffic 1574 sub-module may examine SMB packets and look for unauthorized accesses to shared resources or unauthorized communications. The SMB traffic 1574 sub-module may provide a determination to the protocol analysis 1570 as to whether some SMB traffic was malicious, not malicious, or possibly malicious. The SMB traffic 1574 sub-module's determination may be based on its own analysis, or on the analysis of one or more plugins 1582, or on a combined analysis.

The FTP traffic 1576 module analyzes network traffic associated with the transfer of data using FTP. Communications using FTP typically involve establishing a communication channel between a client machine and a server machine. The client machine can issue commands to the server machine, and upload files to the server machine or download files from the server machine. The FTP traffic 1576 sub-module may analyze FTP-related network traffic, and attempt to determine whether any of the traffic uploaded files that were not authorized to be uploaded or downloaded malicious files. The FTP traffic 1576 module also attempt to determine whether the FTP communication channel was validly established. Some FTP servers may allow users to connect anonymously, while others require a username and password to establish a connection. The FTP traffic 1576 sub-module may provide a determination to the protocol analysis 1570 that indicates whether some FTP traffic was malicious, was not malicious, was harmless, or that the traffic's maliciousness could not be determined. The FTP traffic 1576 sub-module's determination may be based on its own analysis, the analysis of one or more plugins 1582, or a combined analysis.

The protocol analysis 1570 may use the determinations made by the sub-modules and/or their attached plugins 1582 and generate indicators 1590 that describe the other network traffic 1524. These indicators 1590 may be referred to as network indicators. These indicators 1590 may describe the behavior of the other network traffic 1524, may identify network traffic associated with a particular behavior, and/or may indicate whether some network traffic is or is not a threat. For example, the indicators 1590 generated by the other network protocol analysis engine 1544 may include source and destination addresses for the other network traffic 1524, descriptions of any files found in the network traffic, and/or any usernames associated with the network traffic, among other things. In some implementations, the indicators 1590 may indicate that some other network traffic 1524 is or is not a threat. In some implementations, the indicators 1590 may include a weight value that indicates a probability that some other network traffic 1524 is a threat.

FIG. 16 illustrates an example of web-based network protocol analysis engine 1642 implemented in a modular fashion. A modular implementation may provide both flexibility and scalability. Flexibility is provided because the web-based network protocol analysis engine 1642 can be reconfigured based on the web-based network traffic 1622 that is received Scalability is provided because modules for new types of web-based network traffic can be added, in some cases without needing to rebuild the web-based network protocol analysis engine 1642.

In this example, the web-based network protocol analysis engine's 1642 modules are arranged hierarchically. The first level of analysis is protocol analysis 1670. The protocol analysis 1670 gets or receives web-based network traffic 1622. The protocol analysis 1670 may get data (a "push" data model) or fetch data (a "pull" data model). In some implementations, the web-based network traffic 1622 may already be organized into packet streams. A packet stream is a series of related packets that have the same source and destination. For example, the packets that form a video being streamed from a host to a viewer's device would be considered a packet stream.

The protocol analysis 1670 may make an initial examination of the web-based network traffic 1622. Among other things, the protocol analysis 1670 may determine the web-based network protocol that each packet or packet stream is associated with. The protocol analysis 1670 may then invoke the appropriate sub-module for the network protocol type, and direct packets associated with that protocol to the sub-module. In this example, the web-based network protocol analysis engine 1642 has at least three sub-modules: one for HTTP traffic 1672, one for DNS traffic 1674, and one for FTP traffic 1676. The web-based network protocol analysis engine 1642 may have additional sub-modules for other traffic 1680, where these sub-modules are focused on packets that use network protocols not explicitly illustrated here. The functionality of the web-based network protocol analysis engine 1642 can also be expanded by adding more sub-modules for yet more web-based network protocols.

Each of the sub-modules analyze packets associated with their protocol type and attempt to determine whether the packets can cause harm to a network. For example, the HTTP traffic 1672 sub-module may match website addresses against "black lists" and "white lists." Black lists include lists of websites and/or website content that is known to be malicious, compromised, or are otherwise associated with web content known to cause harm. Black lists may include website domain names, IP addresses, Uniform Resource Locators (URLs), and/or hashes of malicious files. The HTTP traffic 1672 sub-module may also match web site content (such as files and images) against black lists. White lists include lists of websites and/or website content that is known to be safe and uncompromised. Black lists and white lists may change dynamically, as when a previously safe website becomes compromised, or as a compromised website is recovered, or as websites are shut down and removed from the Internet. HTTP traffic associated with a website on a black list may be marked as malicious, while HTTP traffic associated with a white list may be marked as clean.

As another example, the DNS traffic 1674 sub-module may also match domain names against black lists and white lists. DNS traffic typically includes requests to translate domain names to IP addresses. A DNS request may be for a domain that is hosted by the customer network, or may be for a domain that is outside the customer network but that the customer network's DNS server knows about. A malicious DNS request may, for example, be attempting to obtain an IP address for an internal website that is not publicly available. The DNS traffic 1674 sub-module attempts to determine whether suspect DNS requests may be malicious or are acceptable.

As another example, the FTP traffic 1676 sub-module may examine packets that contain website content that were transferred using FTP. FTP provides one way to transfer images, files, and/or multi-media content associated with webpages. The FTP traffic 1676 sub-module may examine web-based FTP traffic and determine whether the traffic includes any malicious content, or whether the content is innocuous.

The functionality of the sub-modules may also be expanded with plugins 1682. A plugin is a module that can be added to or removed from a sub-module without having to re-build the sub-module and often while the sub-module is running. Here, plugins provide the ability to quickly add functionality to a sub-module. For example, in some implementations, the HTTP traffic 1672 sub-module may be unable to determine whether some packets are malicious or safe. In these implementations, the HTTP traffic 1672 module may invoke one or more plugins 1682, which may each operate on the packet in a different way. For example, one plugin 1682 may access black lists located on the Internet. These black lists may be public black lists, or may be black lists maintained along with off-site analysis engines. As another example, another plugin 1682 may access a public database of known bad websites, such as one hosted by Google®. The DNS traffic 1674 sub-module and FTP traffic 1676 sub-module may also have plugins to expand their functionality. Plugins also provide a way to add new or up-to-date functionality to the sub-modules. The sub-modules can also be updated by providing an updated web-based network protocol analysis engine 1642, which may require rebuilding the web-based network protocol analysis engine 1642. Plugins, however, may provide for faster, less intrusive, and/or intermediate updates between updates of the web-based network protocol analysis engine 1642 itself.

The plugins 1682 may each produce a determination of whether a packet or group of packets is malicious or clean. A plugin 1682 may also indicate that it was unable to make a determination. In this example, the sub-modules receive the results from their associated plugins 1682. The sub-modules provide a determination, either their own or one made by their plugins 1682, to the protocol analysis 1670. The protocol analysis 1670 may use the determination from a sub-module to produce indicators 1690. These indicators 1690 may be referred to as network indicators. As noted above, these indicators 1690 may describe and/or identify network traffic associated with a threat. For example, the indicators 1690 generated by the web-based network traffic may include the domain names, URLs, and/or IP addresses of web sites accessed, a description of the websites, a description of content downloaded from the websites, and/or the IP address of the computer that requested the website content, among other things. The indicators 1690 may indicate definitively that some network traffic is a threat or may indicate definitively that some network traffic is not a threat. Alternatively or additionally, the indicators 1690 may provide a weight value that indicates the probability that some network traffic is a threat. For example, a weight value of "100" may indicate a 100% probability that some network traffic is a threat, while a weight value of "0" may indicate that the network traffic is not a threat. Furthermore, any weight value between "0" and "100" may indicate the relatively probability that some network traffic is a threat.

FIG. 17 illustrates an example of a file activity analysis engine 1746. The file activity analysis engine 1746 analyzes the result of static analysis of the contents of suspect network activity. For example, the file activity analysis engine 1746 may examine results from opening the contents, applying virus scans to the content, and/or deconstructing the content, among other things. By examining these results, the file activity analysis engine attempts to determine whether the content can cause harm to a network.

This example file activity analysis engine 1746 is also arranged modularly and hierarchically. A file analysis 1770 receives file activity 1726, and may conduct a first stage analysis of the file activity 1726. For example, the file analysis 1770 may include black lists for files known to be malicious. In some implementations, the black lists may store digital signatures of malicious files. These digital signatures may be generated by, for example, the MD5 algorithm, Secure Hash Algorithm 1 (SHA-1), or SHA-2, among others. The file analysis 1770 may compare files found in suspect network traffic against signatures in the black lists. The file analysis 1770 may also check files against white lists. White lists may include files that are known to be safe. White lists may also store digital signatures of files. Files found in suspect network traffic that match signatures in white lists can be assumed to be safe.

The file analysis 1770 may also or alternatively determine the file type for a file extracted from suspect network traffic, and invoke a sub-module for analyzing files of that type. In this example, the file activity analysis engine 1746 includes sub-modules for analyzing portable document format (PDF) files 1772, executable files 1774, and archive files 1776. The sub-modules may each be assisted by one or more plugins 1782. The file activity analysis engine 1746 may include sub-modules for analyzing other files 1780 of types not illustrated here, and also for analyzing activity related to certain files, such as password files and sensitive data files.

The PDF files 1772 sub-module analyzes files formatted in PDF or that appear to be formatted in PDF. PDF is a popular format for transferring documents across networks. Thus sending PDF files in network traffic is fairly common. Hacking tools, however, can be embedded into seemingly innocent PDF files. The PDF files 1772 sub-module may attempt to determine whether a PDF file is malicious or harmless. For example, the PDF files 1772 sub-module may be able to detect malicious obfuscation in a PDF file, and/or whether a PDF file includes a shell script. The PDF files 1772 sub-module may provide its determination, or the determination made by a plugin 1782, or a combined determination, to the file analysis 1770.

The executable files 1774 sub-module analyzes executable files and files that appear to be executable. Executable files are programs that can be run on a computer. Viruses and other malware can be delivered into a network using executable files. Once launched, an executable file may have some privileges to make changes to a computer that it is launched on. Malware may take advantage of these privileges, and once launched, may exploit vulnerabilities in a computer's security infrastructure. The executable files 1774 sub-module may attempt to identify an executable file, and/or identify what an executable file does. Using this and other information, the executable files 1774 sub-module may attempt to determine whether the executable file is malicious. The executable files 1774 sub-module may provide its determination, or a determination of one of or more of its plugins, or a combined determination to the file analysis 1770.

The archive files 1776 sub-module analyzes archive files. Archive files are containers for other files, and provide a convenient way to transfer groups of files and/or large files. The files contained in an archive file may have been compressed and/or encrypted. The archive files 1776 sub-module may attempt to determine what is contained in an archive file, and whether the contents are malicious. The archive files 1776 sub-module may decompress and/or decrypt an archive file. In some cases, the archive files 1776 sub-module may pass the contents of an archive to the file analysis 1770, which may pass the contents to another sub-module. The archive files 1776 sub-module may provide its determination (or that of one or more of its sub-modules) to the file analysis 1770.

The file analysis 1770 may use the determinations made by the sub-modules and/or their attached plugins 1782 to generate indicators 1790 that describe the file activity 1726. These indicators 1790 may be referred to as file indicators. These indicators 1790 may describe and/or identify the analyzed files. For example, the indicators 1790 may include file types, components extracted from files, results from applying virus scanning and other tools to the files, results from opening or executing a file, results from deconstructing and analyzing the deconstructed contents of file, where a file came from and when, and/or a digital signature, which may be used to identify a file. The indicators 1790 may further indicate whether a file is malicious. In some implementations, the indicators 1790 may include a weight value that indicates the probability that a file is malicious.

FIG. 18 illustrates an example of a log file analysis engine 1848. The log file analysis engine 1848 analyzes log files generated by operating systems, applications, and devices in the emulated network. For example, the log file analysis engine 1848 can analyze log files generated by emulated network devices form the emulated network. In various implementations, the emulated network devices can be implemented using virtual machines.

This example log file analysis engine 1848 is also arranged modularly and hierarchically. A log file analysis 1870 receives log files 1828 and may conduct a first stage analysis of the log files 1828. For example, the log file analysis 1870 may sort log files by their type, and invoke an appropriate sub-module for analyzing each log file by its type. In this example, the log file analysis engine 1848 includes sub-modules for analyzing message logs 1872, authentication logs 1874, and user logs 1876. The sub-modules may each be assisted by one or more plugins 1882. The log file analysis engine 1848 may include sub-modules for analyzing other logs 1880, including any of the many logs that may be generated by network devices but that are not illustrated here.

The message logs 1872 sub-module analyzes message logs. Message logs contain global system messages, often including messages that are also found in other message logs, such as mail and authentication logs. Analyzing message logs may provide a comprehensive view of the activity seen by a emulated device in the emulated network. The message logs 1872 sub-module may also analyze message logs based on information provided by other analysis engines. For example, message logs may be searched for activity related to a suspect IP address or username, found through network analysis.

The authentication logs 1874 sub-module analyzes log files related to user authentication. Authentication logs include information such as a history of logins (including usernames, login times, and logout times) and the authentication mechanism used. Examining log files may be useful for finding, for example, repeated login attempts, password scanning (e.g., multiple login attempts with the same username and different passwords), and/or logins using deliberately released usernames and passwords. Authentication logs can also be searched for activity related to, for example, a suspect username or around a specified time. The key words or search strings may be provided by other analysis engines.

The user logs 1876 sub-module analyzes log files that record user-level activity. User logs may capture the actions of one user. For example, a user log may include commands entered by a user, files opened or closed by the user, applications launched by the user, other systems accessed by the user, and so on. Examining user logs may be useful, for example, when an outside actor has gained access to the emulated network using stolen or leaked credentials. Hence, user logs may be examined for information related to a specific user, which may be identified by another analysis engine.

The sub-modules may each make a determination as to whether a log file being analyzed indicates malicious activity. The sub-modules may make this determination with the assistance of one or more attached plugins 1882. The sub-modules may provide their determinations to the log file analysis 1870. The log file analysis 1870 may use the determinations made by the sub-modules to generated indicators 1890 that describe and/or identify activity seen in the log files 1828. These indicators 1890 may be referred to as dynamic indicators. For example, indicators 1890 generated by the log file analysis engine 1848 may include a list of login attempts, usernames associated with log in attempts, commands entered by a user that has infiltrated the emulated network, and/or changes made within the emulated network, among other things. The indicators 1890 may indicate that no malicious activity was found, or that malicious activity was definitely found. In some implementations, the indicators may alternatively or additionally provide a weight value that indicates the probability of malicious activity.

Figure 19:
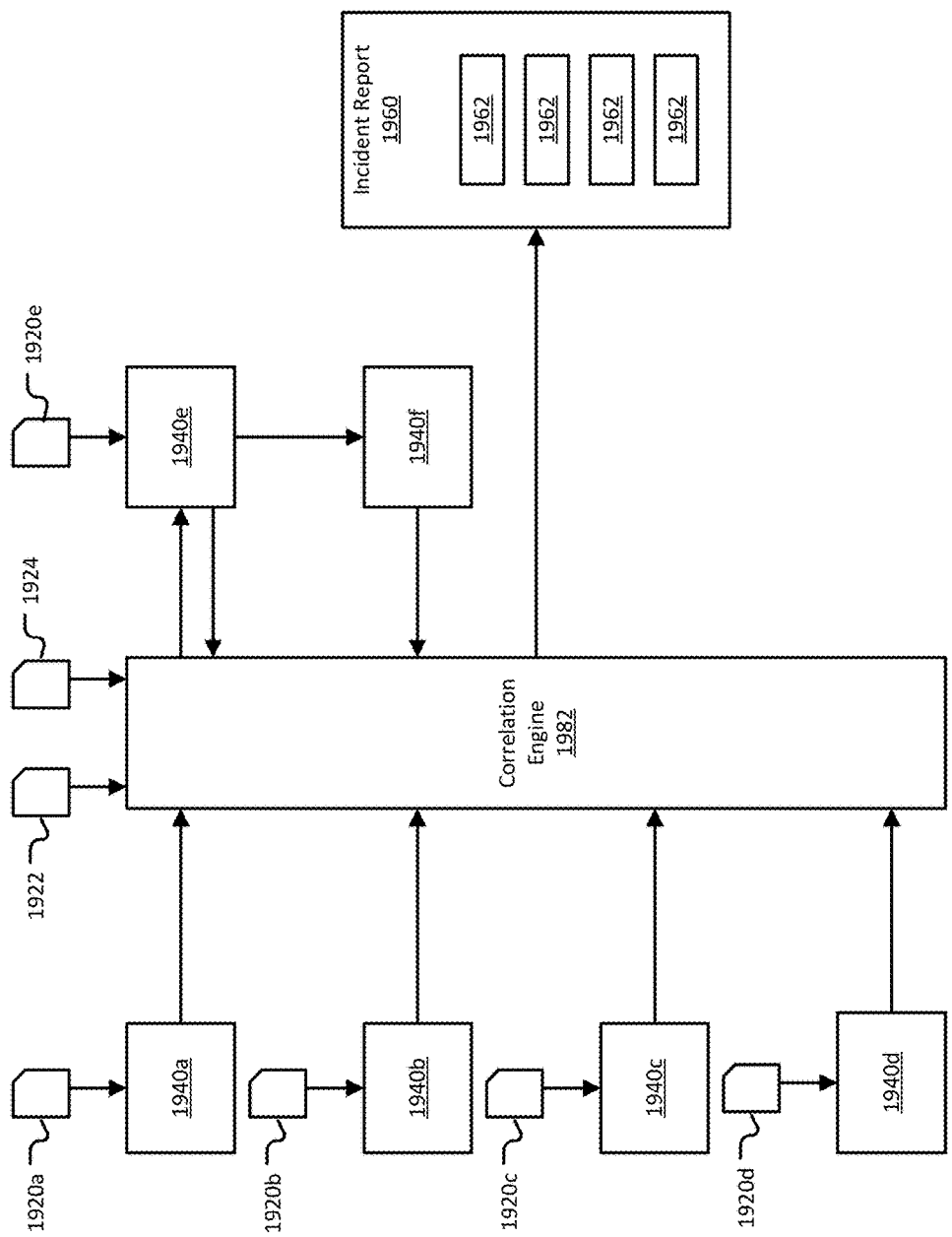
FIG. 19 illustrates an example of the order or sequence in which analysis engines can be run, as well as a correlation engine for correlating the results from the various analysis engines.

In various implementations, the analysis engines described in FIGS. 15-18 may be launched by the analytic engine in a predetermined sequence. FIG. 19 illustrates an example of the order or sequence in which analysis engines 1940a-1940f can be run, as well as a correlation engine 1982 for correlating the results from the various analysis engines 1940a-1940f. In various implementations, the analytic engine executes the analysis engines 1940a-1940f in a predetermined order, which can be modified. The execution order may be based on current threat intelligence from the network security community. For example, the security community may learn that certain malware has been released on a particular date, or that several websites have suffered denial of service (DoS) attacks. In this example, the threat intelligence engine can be configured to watch particularly for this denial of service attacks that look similar to the attacks seen at those websites. For example, the network protocol analysis engine can be placed first or early in the execution order, so that the network protocol analysis engine can catch streams of packets that appear to be related to a denial of service attack. New threat intelligence may be received once a day or several times a day, and analytic engine may adjust the execution of the analysis engines 1940a-1940f accordingly.

In some implementations, the analytic engine can also determine the order in which to execute the analysis engines from what can be learned from suspect network traffic. For example, an attack may take the form of a large amount of irrelevant or inappropriate email (e.g., spam email) being received by a network. The nature of this email as spam may be identified by the network's security infrastructure, and the analytic engine may use this information to invoke a email analysis engine first. The email analysis engine may conduct an analysis of the headers of the suspicious email, and determine, for example, that the email does not have a valid header (e.g., the sender's email address is invalid or has been spoofed). The result of the email header analysis can be provided to a file analysis engine and/or a log file analysis engine to determine whether attachments included in the suspect email are malicious. In contrast, should the email header analysis engine find nothing wrong with the email, then the file and log file analysis engines need not be run.

In various implementations, the analytic engine may also be able to add new analysis engines to the sequence, remove analysis engines from the sequence, and/or add or remove plugins for an analysis engine. The analytic engine may make these changes to new or different network threats and/or to update the functionality of the analytic engine. In some implementations, updates and changes to the analytic engine can be provided over the Internet. In some implementations, the analytic engine can be updated without needing to shut it down or take it off line.

In the example illustrated in FIG. 19, four analysis engines 1940a-1940d are initially launched in parallel. These four analyses engines 1940a-1940d can be one of the web-based network protocol analysis engine, other network protocol analysis engine, file activity analysis engine, log file analysis engine, or some other analysis engine included in the analytic engine. The four initial analysis engines 1940a-1940d receive as input incident data 1920a-1920d of an appropriate type (e.g., a web-based network protocol analysis engine receives web-based network traffic data; a file analysis engine receives files, etc.) The initial analysis engines 1940a-1940d can be run in parallel or sequentially; in this particular example, there is no requirement that they be run in a specific order. In some cases, there may be a requirement that the result from one analysis engine 1940a-1940d be provided to another analysis engine 1940a-1940d. In various implementations, additional or fewer analysis engines 1940a-1940f can be run initially.

Each of the initial analysis engines 1940a-1940d may produce results. These results may indicate whether a particular piece of data from the incident data 1920a-1920d is malicious, is safe, or has an undetermined status. Results that indicate particular data is safe and some results that indicate an undetermined status may be discarded, or are otherwise set aside. Results that indicate particular data is malicious, and thus very likely related to an actual attack, may be provided to the correlation engine 1982.

The correlation engine 1982 correlates the results from the various analysis engines to produce an incident report 1960. One or more of the results may indicate that the site network has, in fact, suffered an attack. For example, one or more servers in the emulated network may have crashed. The correlation engine 1982 attempts to reconstruct the sequence of events that led up to the harm caused by the attack. The analysis engines 1940a-1940f may identify events in the incident data 1920a-1920e that, by themselves, are probably malicious (e.g., downloading of a malware file). Many events in the incident data 1920a-1920e may, alone, appear innocent (e.g., receiving an email). The correlation engine 1982 attempts to connect these events, which may appear to be unrelated, and thereby reconstruct the course of the attack. Furthermore, the correlation engine 1982, in most implementations, has access to all of the data captured for the incident, and thus may be able to relate single events to events that happened both before and after. In many cases, having reconstructed the course of the attack, the report from the correlation engine 1982 can be used to identify malicious activity related to the attack.

For example, one analysis engine 1940a may indicate to the correlation engine 1982 that a malware file was downloaded to a server in the emulated network. Another analysis engine 1940b may indicate that servers in the emulated network crashed because their memory was flooded with garbage data. The correlation engine 1982 may search the incident data 1920a-1920e for a connection between these events. To continue the example, the correlation engine 1982 may find that the malware file launched a process on each of the servers that crashed. The correlation engine 1982 may further find that the servers' memory started to fill once these processes were started.

The correlation engine 1982 can also be in identify and deconstruct attacks that can otherwise be difficult to trace. One example of an attack that is difficult to trace is a "dropper" attack. A dropper is a malware installer that surreptitiously carries viruses, back doors, or other malicious software. A dropper file by itself does not cause harm directly, and cannot be identified by simple checks such as examining its file extension. Once on a computing system, the dropper file can be inadvertently activated by a user attempting to open the file, or may exploit a security vulnerability to activate itself. Once activated, the dropper file unpacks and executes its contents, which is often a malware file.

A dropper can be detected in various ways by correlating the dropper's contents—which, for purposes of the following examples, will be referred to as the contents file—back to the dropper. For example, the contents file may be executed on an emulated network device, and its malicious behavior may be both exposed and captured in log files generated by the emulated network device. As another example, a static scan of the contents file may reveal its malicious nature. As another example, the contents file, once invoked, may make calls to a command and control server located on the Internet. A command and control server (C&C server) is a centralized computer that issued commands to a botnet, and receives reports back from coopted computing systems. This malicious behavior may be captured in log files generate an emulated network device on which the contents file is launched.

In each of the above examples, the correlation engine 1982 may look for the contents file (e.g., by looking for a digital signature generated for the contents file) in other log files, and find it in a log file generated when the dropper file was itself executed. The dropper file's relationship with the contents file will thus cause the otherwise benign-seeming dropper file to be classified as malicious. Additionally, the correlation engine 1982 may be able to identify how the dropper file itself came to be on the network. For example, the correlation engine 1982 may look for the dropper file in email attachments (e.g., using a digital signature generated for the dropper file), and/or may look for the dropper file in network packets that were part of a download from the Internet. In this way, the correlation engine 1982 may be able to trace the events in the dropper attack independently from when the various events in the attack occurred.

Before being able to produce an incident report 1960, the correlation engine 1982 may require additional results for additional analysis engines 1940e-1940f. For example, to continue to previous example, the correlation engine 1982 may have determined that a malware file causes the servers to crash, but so far does know where the malware file came from or how it came to be placed in the network. The analysis engine may, in this example, invoke additional analysis engines 1940e-1940f to obtain more information. For example, one analysis engine 1940e may be invoked to search log files for a time at which the malware file was downloaded. Another analysis engine 1940f may be invoked to search network packets for the malware file. From the results from these analysis engines 1940e-1940f, the correlation engine 1982 may be able to identify where the malware file came from (e.g., an IP address of the sender) and when it was downloaded to the emulated network.

The correlation obtained so far, however, may not yet describe the whole incident. In some cases, the incident data 1920a-1920e may be incomplete. For example, suspect network traffic may be diverted to the emulated network when some network traffic is identified as suspect. The attack on the network, however, may have started before the suspect network traffic is identified, and may have escaped detection. Activity resulting from this network traffic may thus not have been captured in the incident data 1920a-1920e. In some implementations, the correlation engine 1982 thus may also receive additional data 1922, 1924, such as log files, from the site network. This additional data 1922, 1924 may include data 1922 captured by network packet monitors and data 1924 captured by computing systems in the site network, among other data available from the site network. In these implementations, the correlation engine 1982 may correlate events in the incident with events recorded in the additional data 1922, 1924. To continue the previous example, the correlation engine 1982 may learn from the additional data that a user in the site network received an email from a trusted source with an apparently innocent link, and that by following the link to a website, the user triggered downloading of the malware file.

In some implementations, the correlation engine 1982 may be able to iteratively search the incident data 1920a-1920e, repeatedly trying different searches to make connections between different events. In some implementations, the correlation engine 1982 may be able to replay the events in an incident to determine if it has found the events related to the attack, and/or to determine what resulted from a particular series of events. For example, the threat intelligence engine may receive a sequence of events, and may execute each event in the sequence in the r.

Once the correlation engine 1982 has made a best attempt at determining the events in an attack, the correlation engine 1982 may produce an incident report 1960. The incident report 1960 includes one or more indicators 1962, each of which describe an event.

VI. Multiphase Threat Analysis and Correlation

Understanding the course of events in an attack that lead to harm on network may be useful in better defending a network. As discussed above, a network threat detection and analysis system may include a targeted threat intelligence engine that can analyze data collected over the course of an attack, and correlate seemingly unrelated events to reconstruct how the attack occurred.

Figure 20:
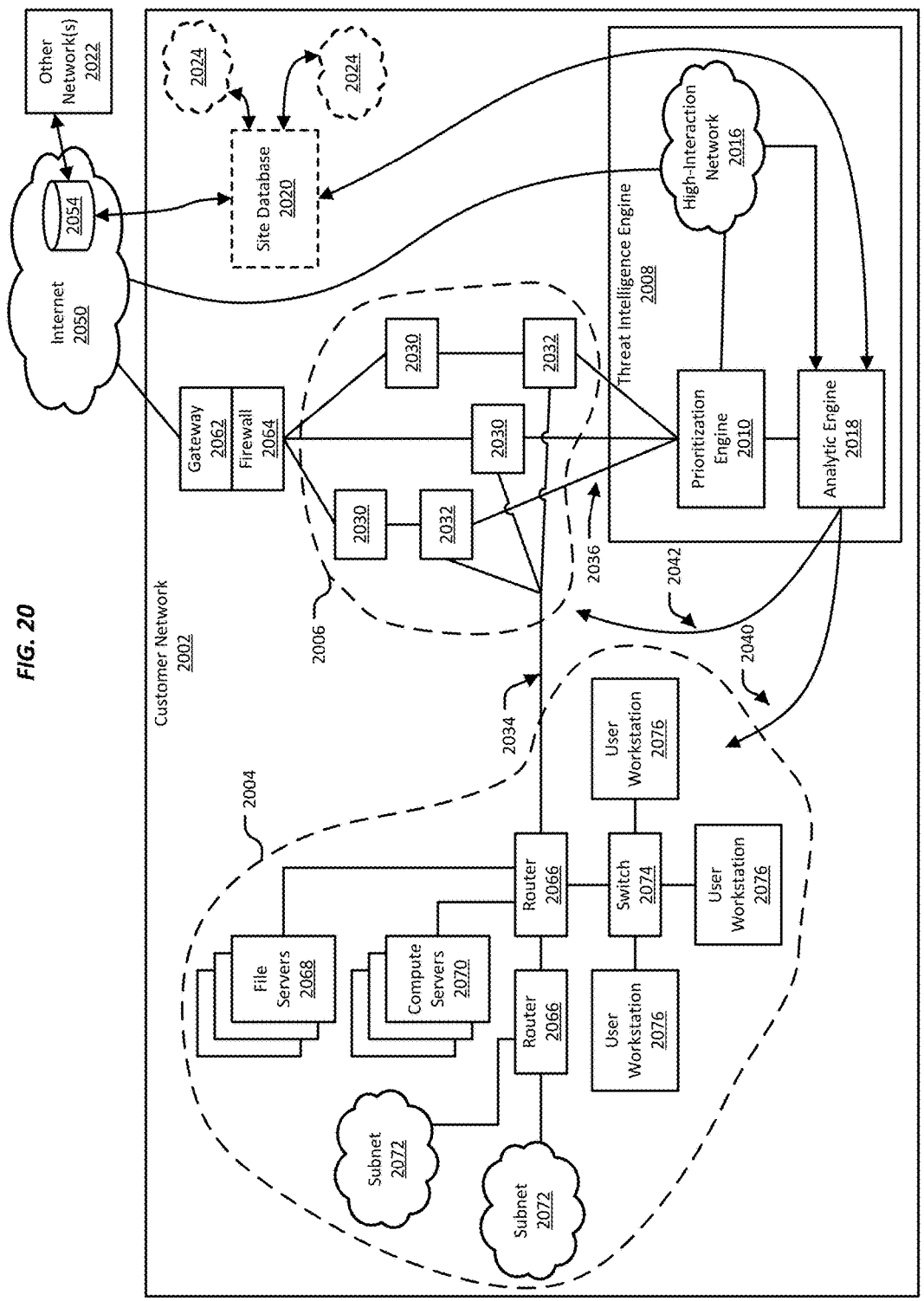
FIG. 20 illustrates an example of a customer network that includes a targeted threat intelligence engine.

FIG. 20 illustrates an example of a customer network 2002 that includes a targeted threat intelligence engine 2008. A customer network is a network that may be found at a large or small business, at a school campus, in a government building, or in a private home. A customer network may be described as a local area network (LAN) or a group of LANs. A customer network may include network infrastructure devices, such as routers, switches, hubs, repeaters, and controllers, among others. A customer network may also include various computing systems, such as servers, desktop computers, laptop computers, tablet computers, personal digital assistants, and smart phones, among others. A customer network may also include other electronic devices with network interfaces, such as televisions, entertainment systems, thermostats, and refrigerators, among others.

In this example, the customer network 2002 includes a gateway device 2062 that connects the customer network 2002 to other networks, such as the Internet 2050. The gateway device 2062 may be, for example, a modem used to connect to telephone, cable, digital subscriber line (DSL), satellite, optical fiber lines. In some cases, a gateway device 2062 may include integrated router functionality. The gateway device 2062 may include a firewall 2064, or may be connected to a firewall 2064 device. Generally, all network traffic coming into or going out of the customer network 2002 passes through the gateway device 2062 and the firewall 2064. Some customer networks may have multiple gateways to outside networks, where each gateway functions as a point of entry for outside network traffic to enter the customer network 2002. Each of these gateways typically includes a firewall.

The customer network 2002 of this example also includes a network security infrastructure 2006. The network security infrastructure 2006 adds additional monitoring and filtering for network traffic that survives filtering by the firewall. The network security infrastructure 2006 may include network security tools 2030, 2032, such as for example anti-virus tools, IPS, IDS, email filters and spam detectors, and file transfer protocol (FTP) filters, among others. Some network security tools 2030, 2032 may be multi-layered, such that network packets that survive analysis by a first security tool 2030 are then analyzed by a second security tool 2032. For example, email traffic may first be filtered for viruses, and then be filtered for spam.

The network security infrastructure 2006 identifies network traffic that appears to be legitimate and safe, and forwards this probably legitimate network traffic to the customer site's network 2004.

The site network 2004 is where the hardware, software, and internal users of the customer network 2002 can be found, and where the operations of the customer network 2002 occur. In this example, the site network 2004 includes several routers 2066 that connect a switch 2074, multiple servers 2068, 2070, and several subnets 2072 together. The site network 2004 may receive apparently legitimate network traffic 2034 through one of the routers 2066. The switch 2074 further connects user workstations 2076 to the site network 2004. The customer network's 2002 users may access the site network 2004 using the user workstations 2076, and/or other wired or wireless devices.

The servers in this example include a group of file servers 2068. The file servers 2068 may provide storage for files used by the customer network's 2002 users and/or for data stored and/or operated on by the customer network 2002. For example, the file servers 2068 may store product and customer data when the customer network 2002 belongs to an online merchant, or may store financial data when the customer network 2002 belongs to a financial institution. The servers in this example also include a group of compute servers 2070. The compute servers 2070 may provide processing resources for software used by the customer network's 2002 users and/or for the operation of the customer network 2002. For example, the compute servers 2070 may provide hosting for the customer network's 2002 website or websites, and/or may provide databases for volumes of data stored and/or operated on by the customer network 2002, and/or may provide distributed computing resources when the customer network 2002 is part of an engineering firm.

The site network 2004 may further include subnets 2072. A subnet or "subnetwork" is a separate part of a network. Generally, a subnet is logically or physically distinct from other parts of a network. A subnet may include additional routers, switches, user workstations, and/or servers.

The site network 2004 described here is provided as an example. A customer site's network may be less complex or more complex than is illustrated by this example, and may include network infrastructure not described here.

As noted above, the network security infrastructure 2006 may separate apparently legitimate network traffic 2034 from suspect network traffic 2036. Suspect network traffic 2036, which ordinarily may be discarded by the network security infrastructure 2006, is forwarded to the targeted threat intelligence engine 2008. In some cases, some network packets may be flagged for inspection but otherwise look legitimate. In these cases, the network traffic may be both forwarded to the site network 2004 and also forwarded to the threat intelligence engine 2008. The threat intelligence engine 2008 attempts to determine what harm, if any, the suspect network traffic 2036 may cause to the site network 2004. The threat intelligence engine 2008 may subsequently produce indicators that identify and/or describe any harm caused by the suspect network traffic 2036. In various implementations, the threat intelligence engine 2008 may include a prioritization engine 2010, a high-interaction network 2016, and an analytic engine 2018.

The prioritization engine 2010 analyzes the suspect network traffic 2036 and attempts to identify whether the suspect network traffic 2036 represents a known threat. Known threats include, for example, previously identified malware, packets from IP addresses known to send malicious network traffic, and authentication requests previously associated with unauthorized users, among many others. Because these threats were previously identified, in most cases the network security infrastructure 2006 likely has already been configured to identify and block network traffic associated with these threats. Alternatively or additionally, the prioritization engine 2010 may determine that the threat posed by the suspect network traffic 2036 is one that the site network 2004 is not vulnerable to. For example, the suspect network traffic 2036 may include a virus designed to exploit a vulnerability version 1.0 of a standard operating system, while none of the computers in the site network 2004 are running that particular operating system or that version of the operating system. Because the site network 2004 is not vulnerable to this attack, in some cases suspect network traffic 2036 associated with the attack need not be analyzed.

The prioritization engine 2010 may include a database of indicators describing network threats that the threat intelligence engine 2008 has previously identified. In some implementations, the prioritization engine's 2010 database may also include indicators received from a central database 2054 located outside of the customer network 2002. When the suspect network traffic 2036 is a known threat, and/or is a threat the site network 2004 is not vulnerable to, then the prioritization engine 2010 may take note of the identity of the threat and then discard the suspect network traffic 2036.

When the prioritization engine 2010 determines that the suspect network traffic 2036 is associated with an unknown threat, then the threat intelligence engine 2008 may direct the suspect network traffic 2036 to the high-interaction network 2016 for detailed analysis.

The high-interaction network 2016 is a self-contained, closely monitored network that can be quickly reconfigured, repaired, brought up, or taken down. The high-interaction network 2016 is not a part of the site network 2004, and exists within a physically and/or virtually isolated, contained space. The high-interaction network 2016, however, appears and behaves just as does a real network, including having a connection to the Internet 2050. Additionally, the high-interaction network 2016 may be configurable, so that it may resemble the site network 2004 or only a part of the site network 2004, as explained in further detail below. The high-interaction network 2016 can be configured to resemble another network entirely, should the need arise. In most cases, however, the threat intelligence engine 2008 is configured to detect threats to the site network 2004, thus high-interaction network 2016 will more often emulate the site network 2004.

The high-interaction network 2016 may be built using a number of testing devices, such as physical routers, switches, and servers. Alternatively or additionally, the high-interaction network 2016 may exists as a fully emulated network residing on one or more servers. In a fully emulated network, the testing devices may be software processes configured to resemble routers and servers. Alternatively or additionally, the high-interaction network 2016 may be constructed using a combination of physical devices and emulated devices. In some implementations, the high-interaction network 2016 may reside at a cloud service provider, and thus be located outside of the customer network 2002.

The high-interaction network 2016 provides a controlled space for conducting static, dynamic, and network analysis of the suspect network traffic 2036. In the high-interaction network 2016, the suspect network traffic 2036 may be free to engage in whatever activity it may be capable of, including doing harm. Doing harm is specifically allowed so that how the suspect network traffic 2036 caused the harm, and the nature of the harm, may be captured. Additionally, the high-interaction network 2016 may include automated processes that respond to activity initiated by the suspect network traffic 2036; for example, automated processes may respond just as would a human network user. Any activity initiated by the suspect network traffic 2036 within the high-interaction network 2016 is closely monitored and recorded.

The threat intelligence engine 2008 sends activity logs, memory snapshots, and any other information generated by analyzing the suspect network traffic 2036 in the high-interaction network 2016 to the analytic engine 2018. As discussed in further detail below, the analytic engine 2018 may process data collected in the high-interaction network 2016 to determine whether the suspect network traffic 2036 was truly malicious or was, in fact, harmless. In either case, the analytic engine 2018 may produce indicators that describe the suspect network traffic 2036. As described in further detail below, the indicators may include characteristics that uniquely identify the suspect network traffic 2036, any effect that resulted from interacting with the contents of the suspect network traffic 2036, and/or any activity triggered by the suspect network traffic 2036 within the high-interaction network 2016.

In some implementations, the indicators generated by the analytic engine 2018 may be used to verify 2040 whether the site network 2004 has already suffered the attack identified by the indicators. For example, the threat intelligence engine 2008 may identify an email that contained a virus. The email may have been flagged as suspect because it was addressed to a user that does not exist within the customer network 2002. The threat intelligence engine 2008 may, using the high-interaction network 2016, allow the virus to affect a simulated user work station, and see what effect the virus has on the simulated workstation. For example, the virus may modify operating system settings in the simulated workstation to make the simulated workstation more vulnerable to attack. The analytic engine 2018 may subsequently generate indicators that identify the malicious email and describe the effect of the virus. The threat intelligence engine 2008 may then use these indicators to verify 2040 whether any user workstations 2076 in the site network 2004 has already received the malicious email and been infected by this virus.

In some implementations, threat intelligence engine 2008 may also use the indicators to update 2042 the security infrastructure 2006. For example, the threat intelligence engine 2008 may identify new malware that should be blocked by an anti-virus tool, new external IP addresses that should be blocked by the firewall, or user accounts that have been compromised, among others.

In some implementations, the threat intelligence engine 2008 can also analyze suspect network traffic 2036 associated with a known threat. In these implementations, rather than discarding this suspect network traffic 2036, the prioritization engine 2010 may be configured to send this suspect network traffic 2036 to the high-interaction network 2016. The high-interaction network 2016 can then, for example, be used to see how susceptible the site network 2004 may be to the threat posed by the suspect network traffic 2036. The analytic engine 2018 may produce indicators that describe how the high-interaction network 2016 reacted to the threat. These indicators can then be used to improve the network security infrastructure 2006.

In some implementations, the threat intelligence engine 2008 may also send indicators generated by the analytic engine to a site database 2020. The customer network 2002 may have a site database 2020 when the customer network 2002 has additional site networks 2024. For example, a business occupying a campus with multiple buildings may have a separate network in each building. These separate networks may or may not be able to communicate with each other, but share a common owner and have common control. Each of these separate networks (which may be described as subnets) may be considered a site network 2004, 2024. Each additional site network 2024 may have its own threat intelligence engine. Each threat intelligence engine may send indicators that they generate to the site database 2020. Each threat intelligence engine may also receive indicators generated by the additional site networks 2024 from the site database 2020. By distributing threat indicators across the customer network 2002, the customer network 2002 as a whole may be made more secure.

In some implementations, the threat intelligence engine 2008 may also send indicators to a central database 2054 located outside the customer network 2002. In some implementations, the threat intelligence engine 2008 may send its indicators directly to the central database 2054. In implementations that include a site database 2020, the site database 2020 may send indicators for all the site networks 2004, 2024 to the central database 2054. The central database 2054 may also receive indicators from other networks 2022. These other networks 2022 may also include their own threat intelligence engines for analyzing suspect network traffic and generating indicators describing suspect network traffic. The central database 2054 may also share indicators between the other networks 2022 and the illustrated customer network 2002. That is, the customer network 2002 may receive indicators generated at the other networks 2022. By sharing indicators across networks 2002, 2022, all the networks 2002, 2022 may be made more secure.

Figure 21:
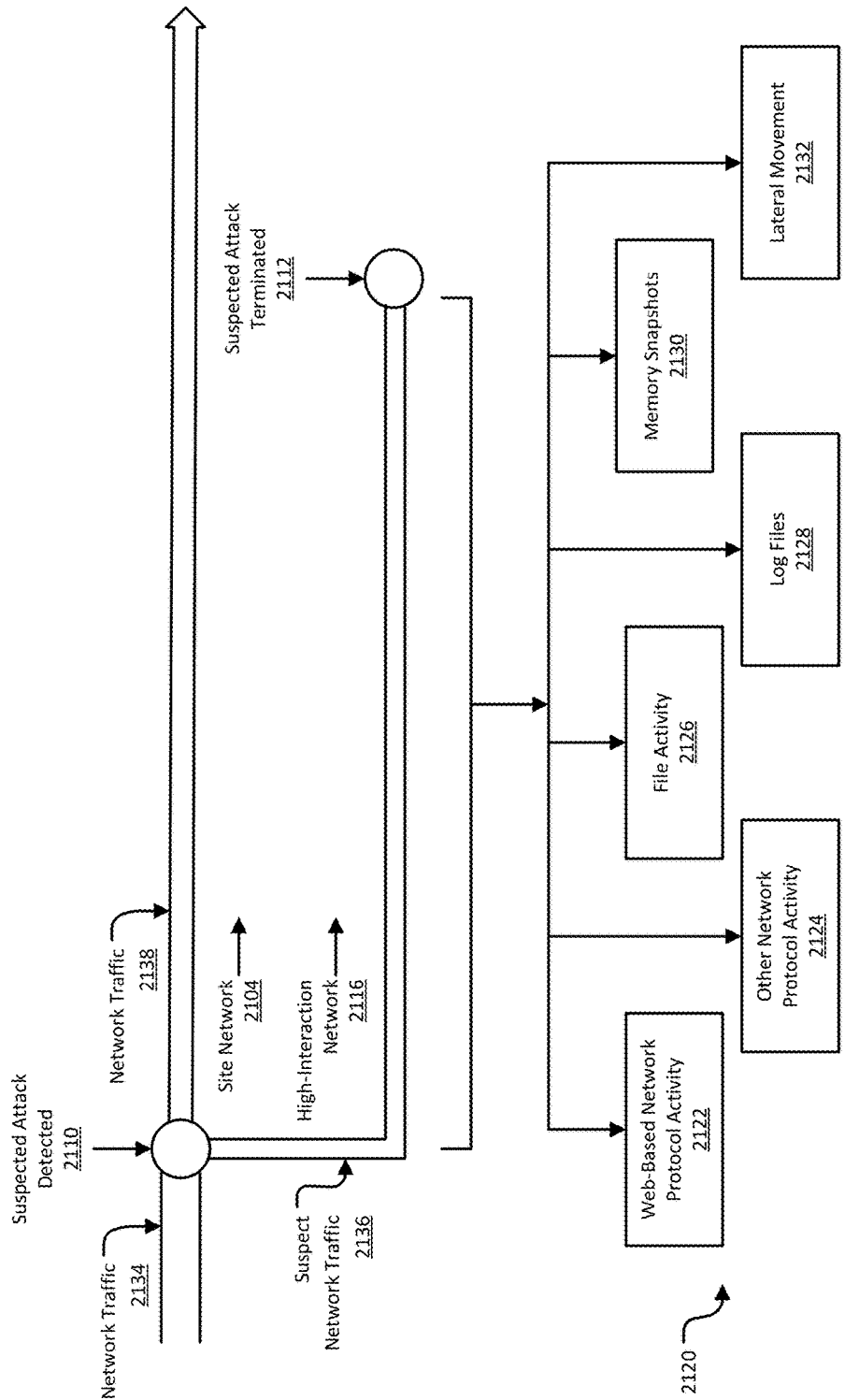
FIG. 21 illustrates examples of the data that may be captured by a high-interaction network as the high-interaction network interacts with and analyzes suspect network traffic.

FIG. 21 illustrates examples of the data 2120 that may be captured by a high-interaction network 2116 as the high-interaction network 2116 interacts with and analyzes suspect network traffic 2136. In various implementations, a threat intelligence engine may be configured to capture data 2120 over the course of an incident. An "incident" is an attack or suspected attack on a site network. Using the high-interaction network 2116, the threat intelligence engine may be able to capture data 2120 of various types as the attack or suspected attack progresses within the high-interaction network 2116. As discussed further below, once data 2120 for the majority of the incident has been captured, the threat intelligence engine may analyze the data 2120 and determine the course of events in the incident.

Before a suspected attack is detected 2110, a large amount of network traffic 2134 may be flowing through the site network 2104. As discussed above, once a suspected attack is detected 2110, suspect network traffic 2136 may be redirected to a high-interaction network 2116, while non-suspect network traffic 2138 continues to the site network 2104. The high-interaction network 2116 may thus capture data 2120 primarily for network traffic that appears to be related to the incident, rather than for all network traffic 2134 that may be flowing through the site network 2104 during the course of the incident. A large amount of the network traffic 2134 flowing through the site network 2104 during the incident may not be relevant to the incident, and thus need not be analyzed. Some unrelated network traffic may still be redirected to the high-interaction network 2116, but by attempting to segregate suspect network traffic 2136 from other network traffic 2138, the probability that the high-interaction network 2116 receives network traffic related to the incident is increased.

Some relevant network traffic may also be missed. For example, in some cases, the suspected attack may only be detected 2110 after some events related to the attack have occurred. In these cases, the events occurring before the suspected attacked is detected 2110 may be found during correlation of events relating to the incident, which is discussed further below.

As the suspect network traffic 2136 flows through the high-interaction network 2116, in various implementations, the threat intelligence engine may not yet attempt to ascertain what the suspected attack is attempting to do and/or how it is attempting to accomplish its goal. Events occurring in real time may be difficult to relate to events that have already occurred or have not yet occurred. Furthermore, many events may be themselves may appear harmless, and can be identified as harmful only once the entire course of events can be seen. Thus the threat intelligence engine captures as much data 2120 as possible during the course of the incident, and, as discussed below, attempts to analyze the course of the incident as a whole.

The incident may occur over the course of seconds, minutes, or hours. For example, an attack may involve visiting various webpages, logging into a website, downloading content, and/or uploading content. These events may require up to several minutes. During this time, the high-interaction network 2116 may capture data 2120 of various types. This data may include web-based network protocol activity 2122, other network protocol activity 2124, file activity 2126, log files 2128, memory snapshots 2130, and lateral movement 2132. Each of these data types are described in further detail below.

The threat intelligence engine may stop capturing data once a suspected attacked has terminated 2112. The suspected attack may be considered terminated 2112 when the suspected attack has accomplished its goal, such as stealing data, installing malware, or crashing the network. Alternatively or additionally, the suspected attack may be considered terminated 2112 when it appears that the suspected attacker has left the network. Alternatively or additionally, the suspected attack may be considered terminated 2112 when a suspected attacker's access to the high-interaction network 2116 is terminated by, for example, a network administrator. Additionally, in some implementations, the threat intelligence system may continue to capture data 2120 as the effects of the suspected attack on the high-interaction network 2116 are repaired or corrected, to put the high-interaction network 2116 back into the state it was in before the suspected attack was detected 2110.

Figure 22A:
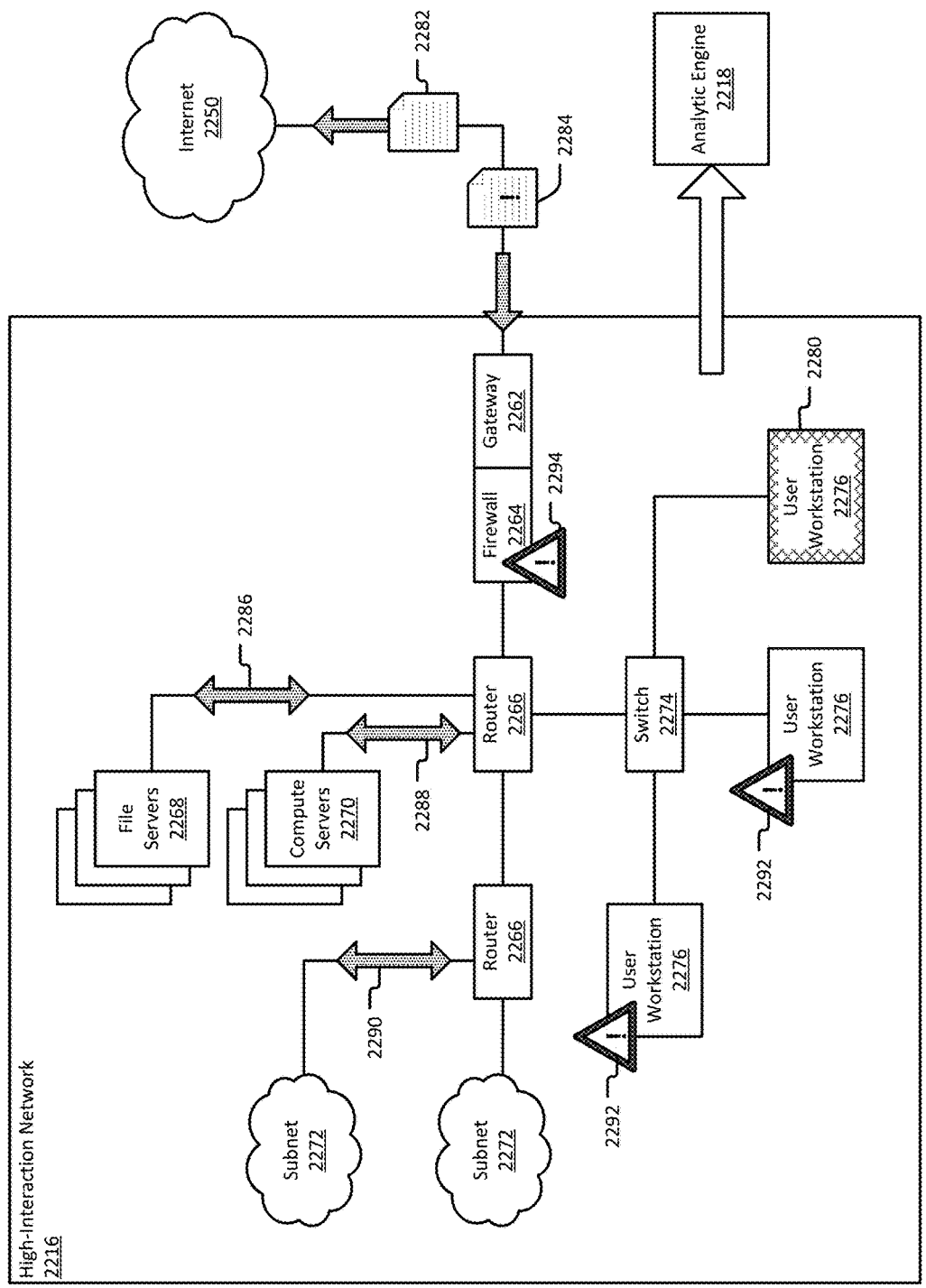
FIG. 22A-22C illustrate example configurations of a high-interaction network.

As noted above, the threat intelligence engine's high-interaction network can be configured to emulate all or part of a customer site's network. FIG. 22A illustrates one example of the configuration of a high-interaction network 2216. In this example, the high-interaction network 2216 has been configured to emulate nearly all of a site's network. Emulating all or nearly all of a site network may be useful when, for example, suspect network traffic has a potentially broad effect, or when the behavior of suspect network is particular unpredictable, or when the suspect network traffic is driven based on being fooled into believing it has infiltrated the site's real network.

In this example, the high-interaction network 2216 has been configured to emulate the site network for a particular customer site. As such, the high-interaction network 2216 of FIG. 22A includes test devices configured as routers 2266, a switch 2274, user workstations 2276, multiple servers 2268, 2270, and several subnets 2272. These user workstations 2276 may be configured just as are the user workstations in the site network, and may further include automated processes that emulate the activity of the site network's users. The servers include a group of file servers 2268 that emulate the files stored by the file servers in the site network. The servers also include a group of compute servers 2270 that provide the same processing resources provided by the compute servers in the site network. The high-interaction network 2216 may further include subnets 2272 that emulate the subnets found in the site network. The high-interaction network 2216 may further include a gateway 2262 that connects the high-interaction network 2216 to the Internet 2250, just as the site network has a gateway that connects it to the Internet. The gateway 2262 is attached to a firewall 2264, or may have an integrated firewall 2264, just as does the site network.

In some implementations, the high-interaction network 2216 may have fewer security measures than does the site network, so that the high-interaction network 2216 is more vulnerable to attack. For example, in the example illustrated in FIG. 22A, the high-interaction network 2216 does not include a network security infrastructure other than a firewall. In this example, the high-interaction network 2216 may be used to analyze the effect of suspect network traffic within the site network. In other words, the suspect network traffic can be released into what appears to be the site network as if the suspect network traffic was not caught by any network security tools. In other cases, the high-interaction network 2216 may include the network security infrastructure, for example when analyzing suspect network traffic's effect on the network security infrastructure as well as the site network.

Absence of the network security infrastructure also may make the high-interaction network 2216 more vulnerable to an attack. When suspect network traffic that constitutes a real attack is received at the site network, it is desirable to stop the attack as soon as possible, and mitigate or repair any damage it caused. But when an actual attack is stopped right away, it may not be possible to learn what the intent of the attack was and what harm may have resulted. Having this information may be useful for, for example, gaining a better understanding network vulnerabilities, finding new or existing vulnerabilities in the site network, and possibly tracking down attackers, among other things. Thus making the high-interaction network 2216 more vulnerable to attack may encourage an attack, and by encouraging an attack more may be learned about it.

Processes in the high-interaction network 2216 may analyze suspect network traffic in several ways, including conducting static, dynamic, and network analysis. Static analysis involves extracting the contents of the suspect network traffic and applying various tools to the content to attempt to identify the content, determine what the content does (if anything), and/or determine whether the content is harmless or malicious. The content of the suspect network traffic may include, for example, webpages, email, and files such as formatted documents (e.g., Microsoft® Word, Excel, or PowerPoint documents or Portal Document Format (PDF) documents), text files documents, images (e.g. Joint Photographic Experts Group (JPEG) files or Graphic Interchange Format (GIF) files), audio, video, archives (e.g., "zip," tape archive (tar), Java archive (jar) files, etc.), or executable files, among others.

Static analysis of the content of suspect network traffic may include, for example, applying virus scanning to the content, extracting components from the content such as macros or scripts and then scanning the content, and/or opening the content using an appropriate application. Opening an executable file may trigger execution of the file, which may be conducted in a contained, emulated environment. Additionally, macros and/or scripts extracted from a file may be executed in an emulated environment. In some cases, static analysis may alternatively or additionally include deconstructing the content, including decompressing, decrypting, un-encoding, decompiling, and/or converting the content into another format, as appropriate. Subsequent to being deconstructing the content may be further analyzed to attempt to discover any hidden purpose behind the content. Malicious intent may be indicated, for example, by instructions to access password files, instructions to connect to input devices such as a keyboard or a screen, or code that attempts to exploit a vulnerability in a software application, among others. The result of the static analysis may be provided to the analytic engine 2218. The analytic engine may generate indicators describing the content, which may be referred to as static indicators. Static indicators may include, for example, the content's type (e.g., webpages, email, documents, or programs), a description of anything questionable found in the content, and/or identification information that uniquely identifies the content. In some implementations, the identification information may be a digital signature, generated, for example, by applying the MD5 algorithm, Secure Hash Algorithm 1 (SHA-1), or SHA-2 to the content. The static analysis results may also be used to drive dynamic analysis.

Dynamic analysis of the suspect network traffic involves interacting with content extracted from the suspect network traffic and monitoring and recording any activity that results from interacting with the content. For example, in some implementations, the high-interaction network 2216 may launch a virtual machine that emulates a user workstation 2276. This emulated user workstation 2276 may hereafter be referred to as the release point 2280, because it serves as the point from which the content is released. At the release point, the content may be downloaded, opened, and/or executed, as appropriate for the specific content. For example, when the content includes webpages, the webpages maybe downloaded, including downloading any graphic or executable files included in the webpages. Automated processes may then interact with the webpages, including selecting links and causing additional webpages, graphics, and/or executable files to be downloaded. Any executable files, if not automatically launched, may be launched by an automated process.

In some cases, depending on the nature of the content found in the suspect network traffic, the high-interaction network 2216 may release the content elsewhere, such as at a compute 2270 or file server 2268, or at the firewall 2264. For example, suspect network traffic that is attempting to open ports at the firewall 2264 may be more effectively released at the emulated firewall 2264.

Monitoring tools may track any calls made by programs launched by executing files found in the suspect network traffic, including calls made to an emulated operating system and/or to emulated hardware. In some cases, these calls may be harmless, while in other cases the calls may be malicious. For example, the high-interaction network 2216 may see questionable file activity. Questionable file activity may include uploading 2282 of files from the high-interaction network 2216 to the Internet 2250. Files may be uploaded 2282 from the release point 2280 by a process triggered by interacting with the content of the suspect network traffic. Questionable file activity may also include downloading of files 2284 from the Internet 2250. For example, the content may trigger downloading 2284 of malware, key logging or screen capture tools, or some other program intended to infiltrate or attack the high-interaction network 2216. Questionable file activity may also include creating, copying, modifying, deleting, moving, decrypting, encrypting, decompressing, and/or compressing files at any device in the high-interaction network 2216.

Any activity triggered by interacting with the content of suspect network traffic is recorded and delivered to the analytic engine 2218. The analytic engine may produce indicators that describe the activity and/or uniquely identify the content that triggered the activity. These indicators may be referred to as file indicators. File indicators may include, for example, a list of modified files and/or directories, a list of content uploaded 2282 to or downloaded 2284 from the Internet, and/or a digital signature identifying the content from the suspect network traffic.

The high-interaction network 2216 may also conduct network analysis of the suspect network traffic. Network analysis may include analyzing and/or interacting with network protocol-related packets in suspect network traffic, and attempting to ascertain what effect the suspect network traffic is trying to achieve. For example, the suspect network traffic may include packets attacking 2294 the firewall 2264 by attempting to use a closed port at the firewall 2264. The high-interaction network 2216 may open the closed port to allow the packets into the high-interaction network 2216, and analyze these packets as suspect network traffic. As another example, the suspect network traffic may include domain name system (DNS) packets attacking 2290 one of the subnets by attempting to ascertain IP addresses the subnets 2272. The high-interaction network 2216 may provide IP addresses of the subnet 2272, and see if any suspect network traffic is received at those IP addresses. As another example, the user workstations 2276 may be attacked 2292 by packets making repeated login attempts. The high-interaction network 2216 may allow the login attempts to succeed.

Network analysis may occur in conjunction with dynamic analysis of the contents of suspect network traffic. For example, the contents may include tools for attacking 2292 the user workstations 2276 to steal credentials. Automated processes may provide credentials, and then watch for login attempts that use those credentials. Attacks 2290, 2292, 2294 may be encouraged so that as much information as possible can be learned about, for example, how the attack is initiated, what entity is behind the attack, and/or what effect each attack has, among other things. To encourage the attacks 2290, 2292, 2294, the high-interaction network 2216 may lower security barriers, and/or may deliberately provide information for infiltrating the high-interaction network 2216.

Network analysis also looks for lateral movement that may result from suspect network traffic. Lateral movement occurs when an attack on the high-interaction network 2216 moves from one device in the network to another. Lateral movement may involve malware designed to spread between network devices, and/or infiltration of the network by an outside entity. For example, an attack 2292 on the user workstations 2276 may result in user credentials being stolen and uploaded 2282 to an outside entity on the Internet 2250. The attack 2292 may also inform the outside entity about files available on the file servers 2268 and services provided by the compute servers 2270. The high-interaction network 2216 may subsequently see an attack 2286 on the file servers 2268 that uses the stolen credentials to gain access and ransom the files. The high-interaction network 2216 may also see an attack 2288 on the compute servers 2270, using the stolen credentials, to take the compute servers 2270 offline. Each of these attacks 2286, 2288 may be considered lateral movement of an attack 2292 that started at the user workstations 2276. The lateral movement can be captured and traced, for example, through log files generated by the user workstations 2276, the gateway 2262 and firewall, and the servers 2268, 2270, and/or memory snapshots of any of these devices.

The results of the various network analysis methods are provided to the analytic engine 2218. The analytic engine 2218 may produce indicators, which may be referred to as network indicators. Network indicators may include, for example, network protocols used by the suspect network traffic and/or a trace of the network activity caused by the suspect network traffic. The network indicators may alternatively or additionally uniquely identify the suspect network traffic. The identification may include, for example, a source of the suspect network traffic, particularly when the source is distinctive (e.g., the source is not a proxy that was used to obfuscate the true source of the suspect network traffic). The identification may also include a destination within the high-interaction network that received the suspect network traffic. The source information can be used to track down the sender of the suspect network traffic. The destination information can be used to locate machines in the real network that may have been affected by the suspect network traffic. The network indicators may also describe any effect caused by the suspect network traffic, such as stolen credentials, files held for ransom, or servers being taken offline.

In some cases, suspect network traffic may be innocent. For example, the suspect network traffic may include an email with an attached image file that was poorly named (e.g. a file named "pleaseopenthis" with no extension, that is, in fact, a harmless photograph). Static analysis may identify that the attachment as an image file, where opening the file shows that the image file is, in fact, only an image file, and not hidden malware. Dynamic analysis of the email and the attached file may result in nothing happening. Network analysis of the email may result in determining that the email was from an innocent sender. The information generated from the static, dynamic, and network analysis may also be sent to the analytic engine 2218, so that the innocent network traffic can be identified as such.

Figure 22B:
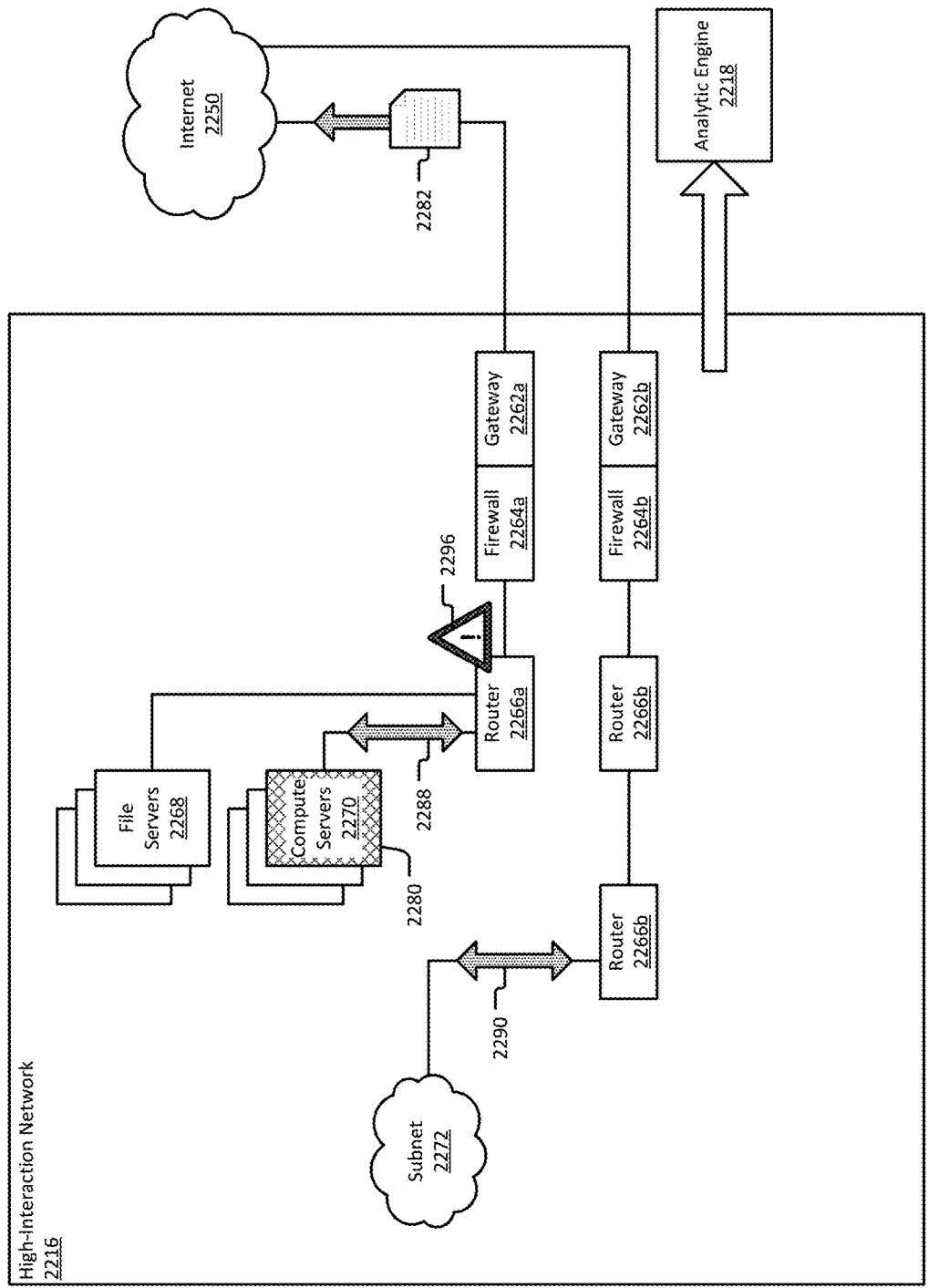

FIG. 22B illustrates another example of a possible configuration of the high-interaction network 2216. In this example, the high-interaction network 2216 has been configured with only a part of the site network. This example also illustrates that the high-interaction network 2216 can be used to emulate multiple parts of the site network at the same time.

In the illustrated example, the high-interaction network 2216 has been configured with test devices emulating the file servers 2268 and the compute servers 2270. Test devices are also emulating a gateway 2262a, firewall 2264a, and one router 2266a, so that the file servers 2268 and compute servers 2270 are accessible to the Internet 2250. The high-interaction network 2216 may have been configured with only the file servers 2268 and compute servers 2270 because suspect network traffic appears to be a direct attack 2288 on the servers 2268, 2270. For example, the suspect network traffic may include an attack 2288 in the form of an exceptionally large volume of database queries to a database hosted by the compute servers 2270, accompanied by database data being uploaded 2282 to the Internet. Since the suspect network traffic in this example constitutes database queries, the release point 2280 for this suspect network traffic is an appropriate compute server 2270. Furthermore, since the attack 2288 in this example is not likely to transition to other parts of the site network, such as the user workstations, the other parts of the site network have not been emulated.

In this example, the high-interaction network 2216 is also emulating a subnet 2272, along with separate routers 2266b and a separate a firewall 2264b and gateway 2262b to provide the subnet 2272 with access to the Internet 2250. The subnet 2272 and its routers 2266b, firewall 2264b, and gateway 2262b are, in this example, not connected to the emulated hardware for the file 2268 and compute 2270 servers. The subnet 2272 and its accompanying infrastructure may be emulated separately so that suspect network traffic directed specifically at the subnet 2272 may be analyzed separate from suspect network traffic directed at the file 2268 and compute 2270 servers. Suspect network traffic directed to the subnet 2272 may constitute an attack 2290 that is unrelated to suspect network traffic directed to the file 2268 and compute 2270 servers. For example, the attack 2288 on the compute servers 2270 may have involved with an attack 2296, such as an infiltration of the router 2266*a*, while the attack 2290 on the subnet 2272, may not have involved the router 226*b*. Hence, separate analysis may be more efficient. Separate analysis may also provide a more precise description of each stream of suspect network traffic.

Separate analysis may also lead to more efficient use of available resources. When only part of the site network is emulated, the high-interaction network 2216 may have idle resources, such as unused test devices and/or computing power. By using these resources to emulate another part of the site network, the high-interaction network 2216 can analyze more suspect network traffic at the same time. The result of the analysis provided by each individually emulated network part are provided to the analytic engine 2218 for analysis.

Figure 22C:
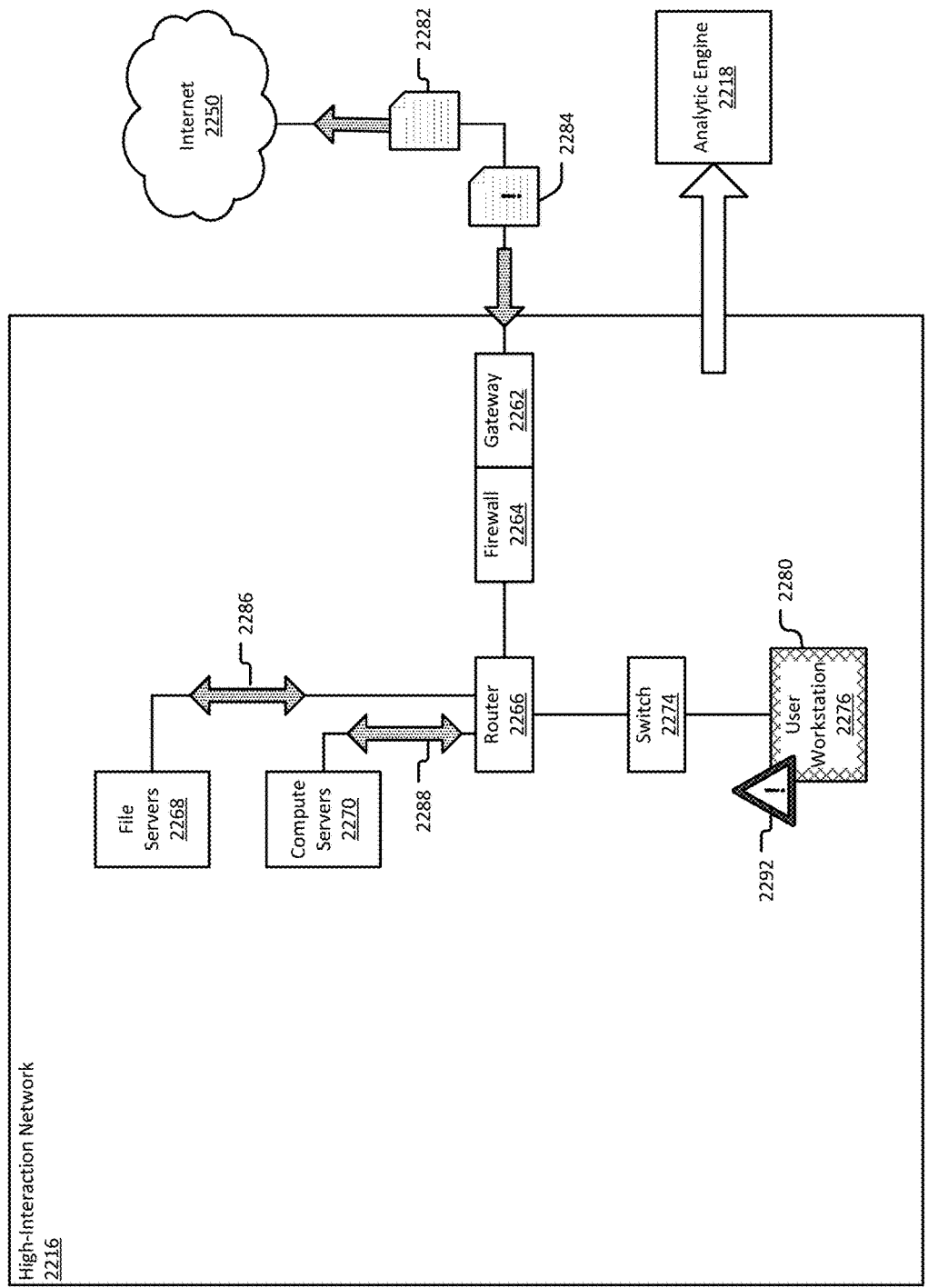

FIG. 22C illustrates another example of a possible configuration for the high-interaction network 2216. In this example, the high-interaction network 2216 has been configured to emulate the part of the site network that is accessible to a specific user. A user of the site network may have authorization to access only specific parts of the site network. Thus in this example, the high-interaction network 2216 has been configured with test devices emulating the specific user's workstation 2276, as well as the switch 2274, router 2266, firewall 2264, and gateway 2262 that connect the user's workstation 2276 to the Internet 2250. The high-interaction network 2216 may further be configured to with test devices emulating the one file server 2268 and one computer server 2270 that the user of this example is authorized to use.

Emulating only the part of the site network that is accessible to one user may be useful when suspect network traffic is directed at a specific user, or takes advantage of one user. For example, the user may be the target of a spoofing attack 2292. A spoofing attack 2292 may take the form of the user receiving email that appears to be from a person that the users knows, but that is, in fact, malicious email that is "spoofing," or pretending, to be from a known person. The spoof email may further have a malicious attachment, such as a key logger. The user's workstation 2276 is treated as the release point 2280 for the spoof email: an automated process, acting as would the user, opens the email and causes the key logger to be downloaded 2284. The automated process may subsequently enter key strokes, including the user's credentials, for capture by the key logger. The key logger may then upload 2282 the user's credentials to a malicious actor on the Internet 2250. Now armed with one user's credentials, an outside actor may attack 2288 the compute server 2270 or attack 2286 files on the file server 2268, using the user's stolen credentials. All of this activity, including downloading 2284 of the key logger, uploading 2282 of the user's credentials, and lateral movement of the attack to the file 2268 and compute 2270 server may be captured and sent to the analytic engine 2218 for analysis.

In each of the various examples illustrated in FIGS. 22A-22C, the high-interaction network 2216 may collect data about the an attack that was released into the high-interaction network 2216. For example, the high-interaction network 2216 may collect web-based network protocol activity, other network protocol activity, file activity log files, memory snapshots, and/or records of lateral movement within the high-interaction network 2216. This data may include a large number of routine events, events related to the attack, and events that are unrelated to the attack. Events related to the attack may also appear to be to be harmless on their own. Thus a threat analysis engine may analyze the data, determine which events were related to the attack, and how the events relate to each other. To do this analysis, the threat analysis engine may use a correlation process.

Figure 23:
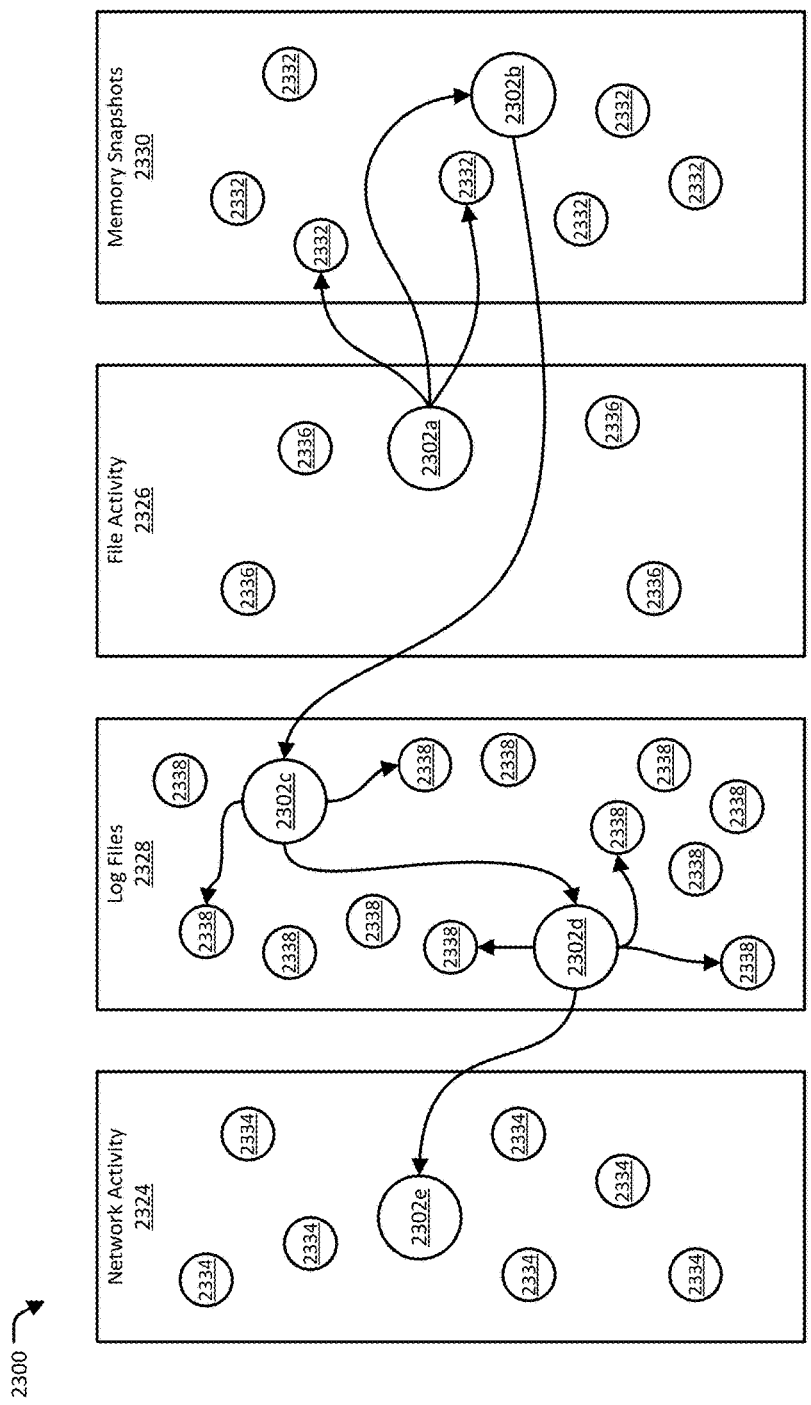
FIG. 23 illustrates an example of a correlation process.

FIG. 23 illustrates an example of a correlation process 2300. As discussed above, an analytic engine may receive, for a given incident, data 2324, 2328, 2326, 2330 of various types. In this example, the data includes network activity 2324, log files 2328, file activity 2326, and memory snapshots 2330.

The data 2324, 2328, 2326, 2330 of each type may further include many events 2334, 2338, 2336, 2332. Events are various things that occurred in the high-interaction network or on a particular emulated network device. For example, events may include files downloaded from the Internet, individual memory snapshots from a particular emulated network device, the entries in a log file, and/or packets received or sent. The data 2324, 2328, 2326, 2330 may include all the events that could be captured by the high-interaction network. Alternatively, the data 2324, 2328, 2326, 2330 may have been filtered to remove routine events, such as those related to maintenance of an emulated network device. Alternatively or additionally, the data 2324, 2328, 2326, 2330 may have been filtered to remove events known to be harmless. Even after filtering, the data 2324, 2328, 2326, 2330 may include a large number of events, many of which are probably unrelated to the attack. Additionally, many events may have been triggered by the attack, but may not have affected the ultimate outcome of the attack.

The various events 2334, 2338, 2336, 2332 may or may not be related to the attack. Some events may be malicious, but not have anything to do with the attack. Some events may be harmless by themselves, but be a direct cause of the harm intended by the attack. The correlation process 2300 attempts to connects events to each other to reconstruct the course of the attack, and ultimately to describe how the attack happened.

In the illustrated example, an attack may have resulted in servers crashing. A file analysis engine may have identified a malicious file event 2302*a* in the file activity 2326 data, specifically, downloading of a file identified as malware. The correlation process 2300 may thus attempt to find a connection between the malware file and the servers crashing.

In this example, the correlation process 2300 may look at memory snapshots 2330 of a crashed server. The correlation process 2300 may find that, between one snapshot and another, the crashed server suddenly ran out of memory, an event that occurred after the malware file was downloaded. The correlation process 2300 may further identify a memory event 2302*b*—specifically, the starting of a process that generated data—that occurred when the server started running out of memory. It may appear, at this point in the analysis, that the file event 2302*a* (downloading of the malware) lead to the memory event 2302*b* (launching of a process that consumed the memory of server), which lead to the server crashing.

The correlation process 2300 of this example may thus have determined how the servers crashed, but has not yet determined how the malware file came to be on the network in the first place. The malware may have gotten onto the network through a network vulnerability, which should be identified.

To determine how the malware file came to be on the network, the correlation process 2300, in this example, may generate a digital signature for the malware file, as an identifier for the file. The correlation process 2300 may next search log file 2328 data for the digital signature, and find a web event 2302*c*, here showing that the malware file was downloaded from a particular website. The website by itself may generally be safe, and the log file 2328 data may show many events 2338 related to the website. Thus, the correlation process 2300, in this example, may next search the log files for events related to both the website and the malware file. This search may locate a user event 2302*d*, here showing that a particular user visited the website and caused the malware file to be downloaded.

Now it may be desirable, in this example, to determine why the particular user visited the website and caused the malware file to be downloaded. While it may be possible to simply ask the particular user, the user may not be available, may not recall, may not have herself visited the website, may be a compromised account, or may be a non-existent account. Thus, as a next step in this example, may search network activity 2324 data for activity related to the particular user. In some cases, the network activity 2324 data may not have been captured as part of the incident, and may instead come from regular activity in the site network. In this example, the correlation process 2300 may identify a network event 2302*e* for this specific user, here identifying an email received by the use that contained a link to the website from which the malware was downloaded. The email may have been received by a trusted sender, and otherwise not have been flagged as suspect.

The correlation process 2300 may now have sufficient information to describe how the attack happened: first, a user received an innocent email with a link; second, the user followed the link to an otherwise legitimate website; third, following the link caused the malware file to be downloaded; fourth, the malware file launched processes that overloaded the memory of several servers, causing the servers to crash. The correlation process 2300 can further generate an incident report for this example attack. The incident report may include an indicator that describes each of the events in the attack.

Another example of a correlation process may include analysis of incident data collected from releasing suspect network traffic in a high-interaction network and data collected from the site network itself. In this example, the site network may have received an email, where the address of the sender of the email is a decoy email address. A decoy email address is an email address configured by a network security system to resemble an email address that could be used by a user of the site network, but which is, in fact, not presently in use. For example, decoy email addresses can be configured using the names of past employees, or variations of the names of present employees. In various implementations, decoy email addresses may be added to the email address books of legitimate users. Alternatively or additionally, decoy email addresses can be added to address books on emulated network devices that are acting as deceptions.

Generally, decoy email addresses are not used by legitimate users or processes in a site network. Thus, receiving an email that includes a decoy email address as the sender address automatically makes the email suspect. The email may be particularly suspect when it includes links and/or attachments. A suspect email with a decoy email address as the sender address may thus be routed to the threat intelligence system for analysis.

The threat intelligence system may generate incident data for the suspect email by detonating the email in the high-interaction network. Detonating the email may include following a link, executing an attachment, and/or analysis of a header part of the email. The incident data may show, for example, that detonating the email caused the user workstation at which the email was detonated to send emails to each address in an address book stored on the user workstation, where these emails each included the same suspect link and/or attachment. In other words, the incident data may show that the suspect email replicated and distributed itself, sending itself to each of the addresses in the address book.

Having learned the manner and mode of attack that could be triggered by the suspect email, the threat analysis engine may next attempt to correlate the events that lead to the initial receipt of the suspect email. For example, the threat analysis engine may determine which network devices in the site network had address books that included the decoy email address. Alternatively or additionally, the threat analysis engine may examine the path information in the suspect email's header to identify where the suspect email came from. The threat intelligence engine may next determine whether any network device in the site network received an email similar to the suspect email, and/or whether any network device sent a similar email to each of the addresses in the network device's own address book. From this information, the threat intelligence engine may be able to determine which specific network device or devices were the source of the suspect email. The threat intelligence engine may then produce an incident report, describing the manner of the attack and possibly also identifying where the suspect email came from initially.

Figure 24:
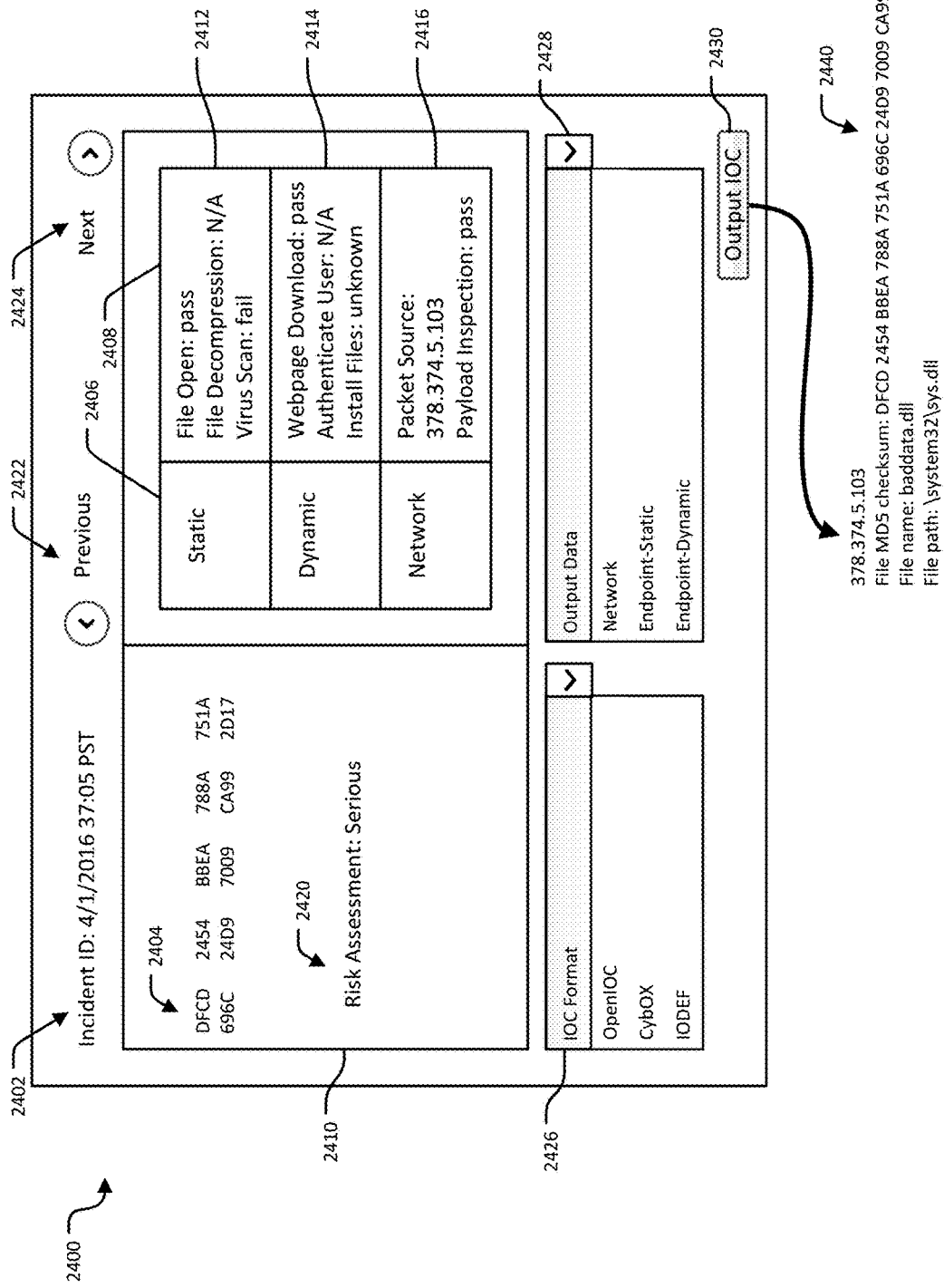
FIG. 24 illustrates an example of the information that may be available in an incident report, and how the information may be provided to a network administrator.

FIG. 24 illustrates an example of the information that may be available in an incident report, and how the information may be provided to a network administrator. FIG. 24 illustrates an example of a user interface 2400. The user interface 2400 may provide a way to display an incident report, search and view an incident report, and to produce indicators of compromise, which may be used to defend a network from a similar attack.

An incident report may include an incident identifier 2402. The incident identifier 2402 may be a time and/or date stamp, and/or a string (e.g. "michaelangelo") that can be used to identify and/or describe the attack. The incident identifier 2402 may be used by the network security community to identify the attack should it appear in other networks.

The user interface 2400 in this example includes a display area 2410 for displaying the incident timeline, and individual events in the incident. In this example, the display area 2410 displays, on the left-hand side, an event identifier 2404, which may uniquely identify a particular event. In this example, an MD5 hash is used as the event identifier 2404. The left side of the display area 2410 also displays a risk assessment 2420 for the event. In various implementations, the user interface 2400 may also display a risk assessment for the whole incident.

The right-hand side of the user interface 2400 of this example displays tests 2408 run for each analysis type 2406, possibly also with each test's result. As discussed above, the threat analysis engine may conduct static 2412, dynamic 2414, and network 2416 analysis on a particular piece of data from suspect network traffic. Each analysis type 2406 may further various tests 2408. The user interface 2400 may display the results of each of these tests.

The user interface 2400 of this example may also provide a "Previous" button 2422 to display a preceding event and a "Next" button 2424 to display the next event.

The user interface 2400 of this example may also enable a network administrator to obtain indicators of compromise 2440 that describe one or multiple events. In this example, the user interface 2400 includes a dropdown menu 2426 that allows the network administrator to select a format for the indicators of compromise 2440. The formats may be those used by various network security companies, such as McAfee® and Symantec™, or various open source formats. The user interface 2400 may also include a dropdown menu 2428 that allows the network administrator to select which data to include in the indicators of compromise 2440. The user interface 2400 may further include a button 2430 that will cause the indicators of compromise 2440 to be generated.

As noted, the indicators of compromise 2440 may be formatted to include information used by antivirus tools, malware detectors, spam filters, and other network security tools. In this example, the indicators of compromise include an identity of the threat actor (here, the IP address of a website), and data related to a malicious file (here, a digital signature for the file, the name of the file, and where the file was found at the conclusion of the attack).

Figure 25:
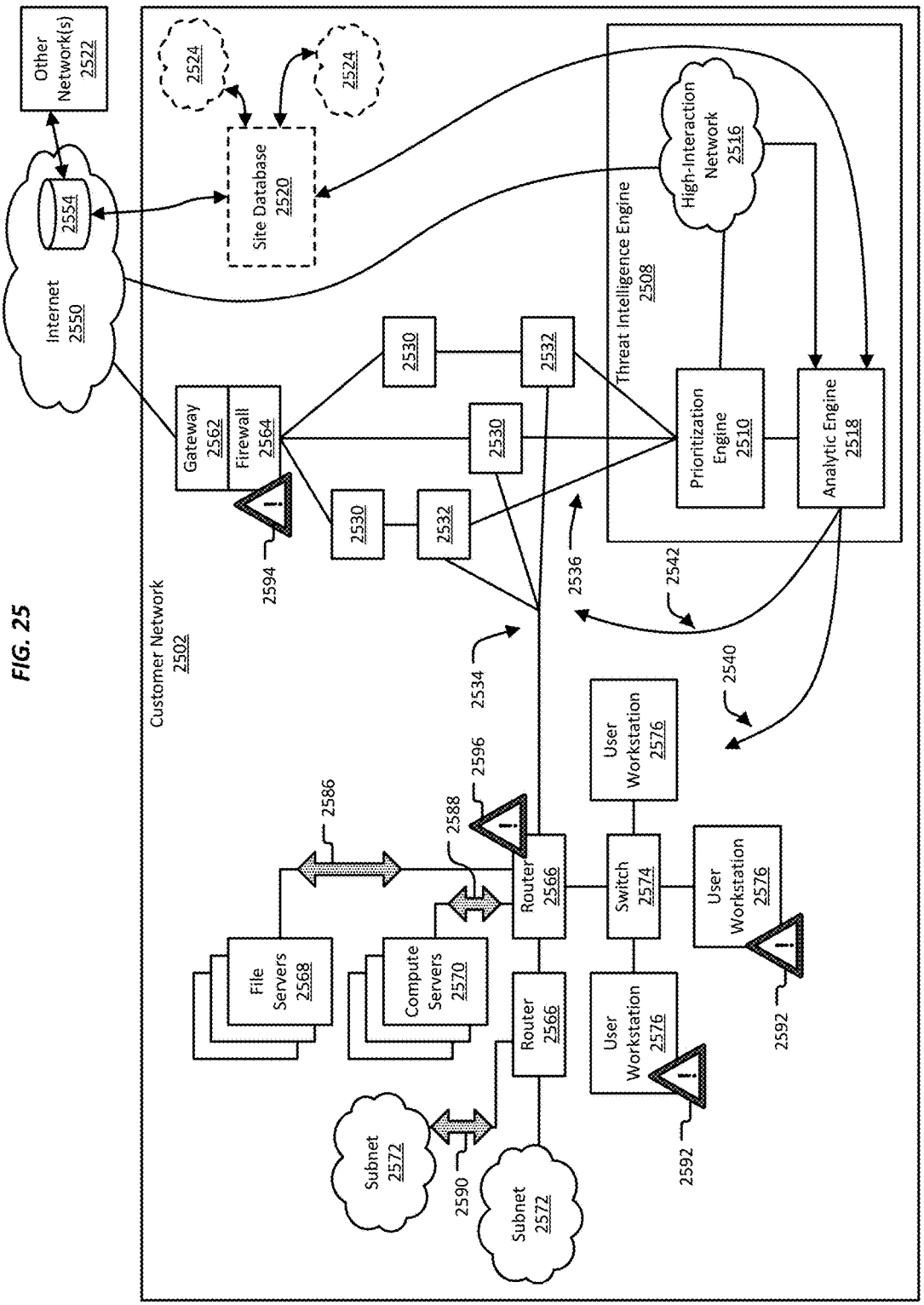
FIG. 25 illustrates examples of ways in which the threat intelligence engine may use indicators generated by its analytic engine.

In addition to being provided to a network administrator, the indicators generated for an incident may be added to an indicators database. A threat intelligence engine may use the indicators in the indicators database in various ways. FIG. 25 illustrates examples of ways in which the threat intelligence engine 2508 may use indicators generated by its analytic engine 2518. FIG. 25 illustrates an example of a customer network 2502 that includes a threat intelligence engine 2508. The customer network 2502 in this example includes a gateway 2562 for communicating with other networks, such as the Internet 2550. The gateway 2562 may include an integrated firewall 2564, or may be attached to a firewall 2564 device. Generally, all network traffic coming into or going out of the customer network 2502 passes through the gateway 2562 and firewall 2564.

The firewall 2564 generally controls what network traffic can come into and go out of the customer network 2502. The customer network 2502 in this example includes additional network security tools 2530, 2532, such as anti-virus scanners, IPS, IDS, and others. The network security tools 2530, 2532 may examine network traffic coming into the customer network 2502, and allow network traffic that appears to be legitimate 2534 to continue to the site's network. The network security tools 2530, 2532 may direct suspect network traffic 2536 to the threat intelligence engine 2508.

The site network is where the hardware, software, and internal users of the customer network 2502 can be found, and where the operations of the customer network 2502 occur. In this example, the site network includes several routers 2566 that connect together a switch 2574, a group of file servers 2568, a group of compute servers 2570, and several subnets 2572. The switch 2574 further connects several user workstations 2576 to the site network.

As discussed above, the threat intelligence engine 2508 examines suspect network traffic and attempts to determine whether the suspect network traffic may, in fact, be malicious. The threat intelligence engine 2508 in this example includes a prioritization engine 2510, a high-interaction network 2516, and an analytic engine 2518. The prioritization engine 2510 analyzes suspect network traffic 2536 and attempts to determine whether the suspect network traffic 2536 represents a known threat. When the suspect network traffic 2536 is associated with a known threat, then the threat intelligence engine 2508 may log the occurrence of the suspect network traffic 2536, and do nothing more. In some implementations, the threat intelligence engine 2508 may be configured to provide suspect network traffic 2536 associated with a known threat to the high-interaction network 2516 for analysis. Doing so may be useful, for example, to see how well the customer network 2502 can handle the known threat.

Suspect network traffic 2536 that is not associated with a known threat may be provided to the high-interaction network 2516 to attempt to determine if the suspect network traffic 2536 constitutes a threat, and if so, what the nature of the threat is. Within the high-interaction network 2516, the suspect network traffic 2536 may be allowed to do whatever harm it was designed to do. The suspect network traffic 2536, or an entity that is driving the suspect network traffic 2536, may further be encouraged to act, for example by lowering security barriers within the high-interaction network 2516 and/or surreptitiously leaking credentials to the entity.

Any activity triggered by the suspect network traffic 2536 inside the high-interaction network 2516 may be recorded and provided to the analytic engine 2518. The analytic engine 2518 may analyze the recorded activity and generate indicators to describe and/or identify the suspect network traffic 2536, as described above.

The threat intelligence engine 2508 may use the indicators in several ways. For example, in some implementations, the threat intelligence engine 2508 may use the indicators to verify 2540 whether the site network has already been compromised. The site network may already be compromised if it has previously received suspect network traffic 2536 that has been analyzed by the threat intelligence engine 2508. For example, the threat intelligence engine 2508 may find that a virus 2592 has been downloaded to the user workstations 2576. Indicators may inform the threat intelligence engine which workstations 2576 to check, and where to find the virus. The indicators may further show that the virus was downloaded through interactions by the workstations' 2576 users, for example, with a malicious website.

As another example, the threat intelligence engine 2508 may find that ports at the firewall 2564 have been opened 2594. The threat intelligence engine 2508 may further find that a router's 2566 configuration has been changed 2596, making the site network accessible to an outside actor. Indicators may inform the threat intelligence engine 2508 to check the firewall 2564 and router 2566 for these changes.

As another example, the threat intelligence engine 2508 may be able to use indicators to trace lateral movement that was captured in the high-interaction network 2516. For example, the threat intelligence engine 2508 may, based on theft of credentials at a user workstation 2576, look for unauthorized access 2588 to resources provided by the compute servers 2570. The threat intelligence engine 2508 may also look for unauthorized access to the file servers 2568, and unauthorized downloading 2586 of files from the file servers 2568. The threat intelligence engine 2508 may further look for unauthorized logins 2590 into a subnet 2572.

Another way in which the threat intelligence engine 2508 may use the indicators is to update 2542 the network security tools 2530, 2532. For example, the threat intelligence engine 2508 may identify malware that is not known to an anti-virus tool, may find malicious IP addresses or websites that should be blocked by the firewall, or may identify attached files that should be removed from incoming network traffic.

In some implementations, the threat intelligence engine 2508 may also send its indicators to a site database 2520. The customer network 2502 may have a site database 2520 when the customer network 2502 has multiple additional site networks 2524. Each of these site networks 2524 may be provided with its own threat intelligence engine. The individual threat intelligence engines may also provide indicators to the site database 2520. Indicators from different site networks 2524 may be shared between the site networks 2524. Each site network may thereby be defended against attacks that it has not yet experienced.

In some implementations, the threat intelligence engine 2508 may also send its indicators to a central database 2554 located on the Internet 2550. In implementations that include a site database 2520, the site database 2520 may send indicators for all of the customer network 2502 to the central database 2554. The central database 2554 may also receive indicators from other networks 2522. The central database 2554 may share the indicators from the other networks 2522 with the customer network's 2502 threat intelligence engine 2508. By sharing indicators between the other networks 2522 and the customer network 2502, all of the networks 2502, 2522 may be made more secure.

VII. Enterprise DNS Analysis

In various implementations, one type of threat that can be detected and analyzed by a multi-phase threat analysis and correlation platform is a threat perpetrated using DNS. DNS requests and replies can receive little scrutiny from firewalls and other network security infrastructure. DNS can thus provide a vehicle for bypassing a network security perimeter, and releasing various kinds of attacks, such as zero-day attacks, cache poisoning, denial of service attacks, distributed denial of service attacks, DNS amplification, fast-flux DNS, and others.

Figure 26:
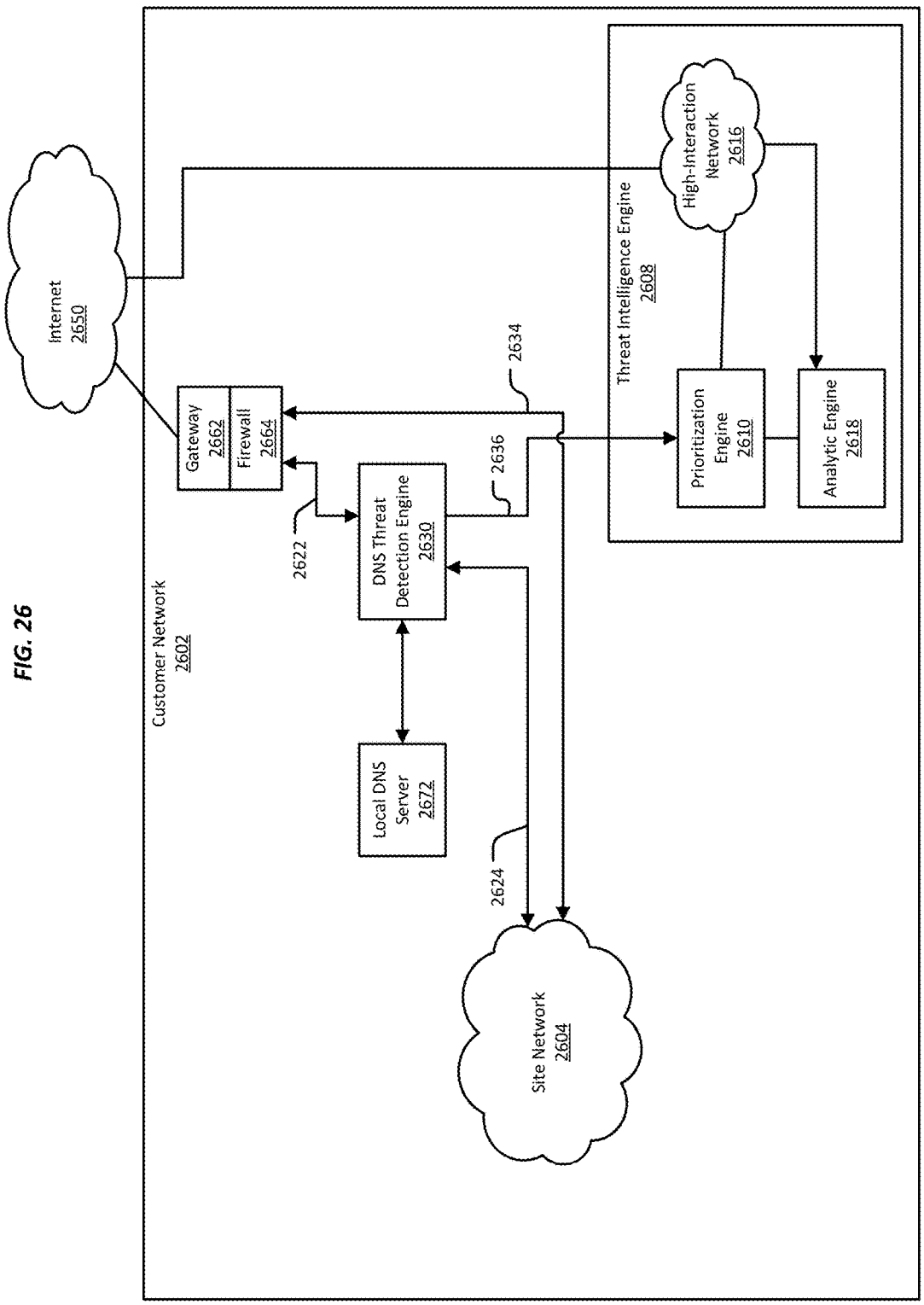
FIG. 26 illustrates an example of a customer network that includes a DNS threat detection engine.

In various implementations, a DNS threat detection engine can fill security gaps in the Domain Name System. FIG. 26 illustrates an example of a customer network 2602 that includes a DNS threat detection engine 2630. A customer network is a network that may be found in a large or small business, a school campus, a government office, or a private home. A customer network may be described as LAN or a group of LANs. The customer network 2602 in this example includes a site network 2604. As used herein, the site network 2604 is where the hardware, software, and users of the customer network 2602 are located, and where the normal business of the customer network 2602 occurs.

The example customer network 2602 includes a gateway 2662, which is a device that enables connections to other networks, such as the Internet 2650. Examples of gateways include modems, routers, servers, among others. In most cases, the gateway 2662 includes an integrated firewall 2664. A firewall is a network security device that monitors incoming and outgoing network traffic. A firewall can determine to allow or block specific traffic based on a set of security rules. In some cases, the firewall 2664 may be a separate device from the gateway 2662. In some cases, the customer network 2602 can additional network security infrastructure, such as Intrusion Detection Systems (IDS), Intrusion Prevention Systems (IPS), and security information and event management (STEM), among others.

In this example, the customer network 2602 also includes a local DNS server 2672. The local DNS server 2672 can respond to both DNS requests originating in the site network 2604 (referred to here as internal DNS traffic 2624) and DNS requests originating outside of the customer network 2602 (referred to here as external DNS traffic 2622), including from the Internet 2650. In some cases, the customer network 2602 may have more than one DNS server. For example, the customer network 2602 may include multiple subnets, where several of the subnets include DNS servers. In some implementations, the customer network 2602 may not have any DNS server, and may rely on DNS services provided by an ISP or located in a neighboring network.

The customer network 2602 in the illustrated example further includes a DNS threat detection engine 2630. In various implementations, the DNS threat detection engine 2630 can be implemented using a dedicated hardware appliance, configured hardware and/or software specifically for receiving and analyzing DNS network traffic. Alternatively or additionally, the DNS threat detection engine 2630 can be a device that can be attached to connected to a DNS server. Alternatively or additionally, in some implementations, the DNS threat detection engine 2630 can be included in another network security system, such as a deception center. Alternatively or additionally, in some implementations, the DNS threat detection engine 2630 can be included in a DNS server, such as the local DNS server 2672, as discussed further below.

In various implementations, the DNS threat detection engine 2630 can be configured to sit between the firewall 2664 and the site network 2604. In these implementations, external DNS traffic 2622 that would ordinarily be handled by the local DNS server 2672 is instead directed to the DNS threat detection engine 2630. In some implementations, the firewall 2664 can be configured to direct all external DNS traffic 2622 to the DNS threat detection engine 2630, while directing all other network traffic 2634 to the site network 2604. In some implementations, the DNS threat detection engine 2630 can receive all network traffic that comes in from external networks, can filter external DNS traffic 2622 for analysis, and can send all other network traffic 2634 on to the site network 2604.

In various implementations, the DNS threat detection engine 2630 can also be configured to sit between the site network 2604 and the local DNS server 2672. In these implementations, all internal DNS traffic 2624 from the site network 2604, which would otherwise go directly to the local DNS server 2672 or outside of the customer network 2602 to an external DNS server, can instead go to the DNS threat detection engine 2630 for analysis. In these implementations, any other network traffic 2634 from the site network 2604 that is not for DNS purposes can bypass the DNS threat detection engine 2630. In some implementations, the DNS threat detection engine 2630 can receive all network traffic from the site network 2604. In these implementations, the DNS threat detection engine 2630 can filter DNS-related network traffic for analysis, and can send all other network traffic on to other networks.

In cases where the customer network 2602 includes more than one local DNS server 2672, the DNS threat detection engine 2630 can receive the external DNS traffic 2622 and internal DNS traffic 2624 for all the DNS servers. Alternatively or additionally, the customer network 2602 can include more than one DNS threat detection engine, where each DNS threat detection engine analyzes the DNS traffic for one or more DNS servers.

In various implementations, the DNS threat detection engine 2630 can analyze external DNS traffic 2622 and/or internal DNS traffic 2624 for a network threats. DNS traffic can include queries or requests for information, responses, and update messages, among other things. As noted above, the intended destination for the DNS traffic can be the local DNS server 2672, a DNS server outside of the customer network 2602 (e.g., on the internet 2650), a system in the site network 2604, or a system outside the customer network 2602.

In various implementations, the DNS threat detection engine 2630 maintain statistics for DNS traffic, such as the times of day or days of the week when external DNS traffic 2622 or internal DNS traffic 2624 is received, the quantity of the DNS messages received during these time windows, network addresses and/or domains of sources that transmitted the DNS messages, domain names that were queried, the number of response generated by the local DNS server 2672 or external DNS servers, whether the local DNS server 2672 was able to respond to a query or whether an external DNS server responded to a query, and so on. From these statistics, the DNS threat detection engine 2630 can determine DNS traffic patterns that are typical for the example customer network 2602. In some implementations, the DNS threat detection engine 2630 can also determine anomalies or outliers; that is, DNS traffic that is outside of the normal DNS traffic patterns for the example customer network 2602.

In various implementations, the DNS threat detection engine 2630 can also segregate DNS traffic that appears to include a network threat from DNS traffic that does not appear to pose a threat. When the DNS threat detection engine 2630 finds no threat in the DNS traffic, the DNS threat detection engine 2630 can send the traffic on to the destination for which the DNS traffic was originally intended. When the DNS threat detection engine 2630 finds a possible threat in the DNS traffic, the DNS threat detection engine 2630 can determine what should be done with this suspect DNS traffic. The DNS threat detection engine 2630 can include, for example, rules that the DNS threat detection engine 2630 can use to determine where to send suspect DNS traffic or for analyzing the suspect DNS traffic. In some implementations, the DNS threat detection engine 2630 can determine a new destination for the suspect DNS traffic, where the new destination can include a decoy system in the site network 2604 and/or a threat intelligence engine 2608 for detailed analysis.

In various implementations, the threat intelligence engine 2608 can include a prioritization engine 2610, a high-interaction network 2616, and an analytic engine 2618. The prioritization engine 2610 can analyze the suspect network traffic 2636 and can attempt to identify whether the suspect network traffic 2636 represents a known threat. The prioritization engine 2610 may include a database of indicators describing network threats that the threat intelligence engine 2608 has previously identified. When the prioritization engine 2610 determines that the suspect network traffic 2636 is associated with a threat, then the threat intelligence engine 2608 can direct the suspect network traffic 2636 to the high-interaction network 2616 for detailed analysis.

The high-interaction network 2616 is a self-contained, closely monitored network that can be quickly reconfigured, repaired, brought up, or taken down. The high-interaction network 2616 is not a part of the site network 2604, and exists within a physically and/or virtually isolated, contained space. The high-interaction network 2616, however, appears and behaves just as does a real network, including having a connection to the Internet 2650. The high-interaction network 2616 can include, for example, a decoy DNS server, which can receive the DNS messages in the suspect network traffic 2636. The decoy DNS server can receive and process the DNS message as would the local DNS server 2672, including releasing any malicious code or data that may be contained within the DNS messages. The malicious code or data can then be allowed to freely interact with systems in the high-interaction network 2616. In various implementations, the decoy DNS server can be implemented using a physical server. Alternatively or additionally, in some implementations, the decoy DNS server can be emulated.

As another example, when a suspect DNS message is a reply to a DNS query, the suspect DNS message can be sent to a deception system in the high-interaction network 2616 that has been configured to resemble the original recipient system in the site network 2604. The deception system can mimic the behavior of recipient system, including mimicking what the recipient system would do when receiving the suspect DNS message. Any malicious code or data in the suspect DNS message can be released in the deception system, where interaction between the malicious code or data and the deception system, as well as other network entities, can be analyzed.

The threat intelligence engine 2608 can send activity logs, memory snapshots, and any other information generated by analyzing the suspect network traffic 2636 in the high-interaction network 2616 to the analytic engine 2618. The analytic engine 2618 can process data collected in the high-interaction network 2616 to determine whether the suspect network traffic 2636 was truly malicious or was, in fact, harmless. In either case, the analytic engine 2618 can produce indicators that describe the suspect network traffic 2636. The indicators can include characteristics that uniquely identify the suspect network traffic 2636, any effect that resulted from interacting with the contents of the suspect network traffic 2636, and/or any activity triggered by the suspect network traffic 2636 within the high-interaction network 2616. In various implementations, the indicators can be used to improve the security of the customer network 2602, and/or to determine whether any systems in the customer network 2602 have already been compromised.

In addition to or instead of sending suspect DNS messages to the high-interaction network 2616, in some implementations, the DNS threat detection engine 2630 can instead send the suspect DNS messages to systems in the site network 2604. For example, the site network 2604 can include a deception mechanism configured as a decoy DNS server. Alternatively or additionally, the site network 2604 can include deception mechanisms configured to resemble user workstations, file servers, or other systems that can be recipients of DNS messages. Using one of these deceptions, the manner in which the suspect DNS messages, and/or anything malicious contained within the suspect DNS messages, can be analyzed.

In some implementations, the DNS threat detection engine 2630 can respond to the suspect DNS traffic by dynamically configuring new deceptions. For example, the DNS threat detection engine 2630 may receive a DNS query for a domain that does not exist in the customer network 2602, but that could exist. For example, the customer network 2602 may have a domain such as "www.home.com," but does not have "ftp.home.com." In this example, when the DNS threat detection engine 2630 receives a DNS query for "ftp.home.com," rather than informing the requester that the domain does not exist, the DNS threat detection engine 2630 may instead determine (using a threat profile and/or remediation rule, for example) to inform the requester that the domain does exist, and provide an IP address. The DNS threat detection engine 2630 can further cause a deception to be initiated, for example in the high-interaction network 2616 or using a deception in the site network 2604, with the domain "ftp.home.com" and the associated IP address. In various implementations, the deception can be configured with software, hardware, and/or data that may be found at the domain. For example, the domain "ftp.home.com" may include FTP servers, thus the deception can include an FTP service and decoy data.

In various implementations, the DNS threat detection engine 2630 can use the indicators output by the threat intelligence engine 2608 to modify and/or update the analysis capabilities of the DNS threat detection engine 2630. For example, the DNS threat detection engine 2630 can generate new threat profiles that use the indicators as characteristics of network threats. Threat profiles are discussed further below.

Figure 27:
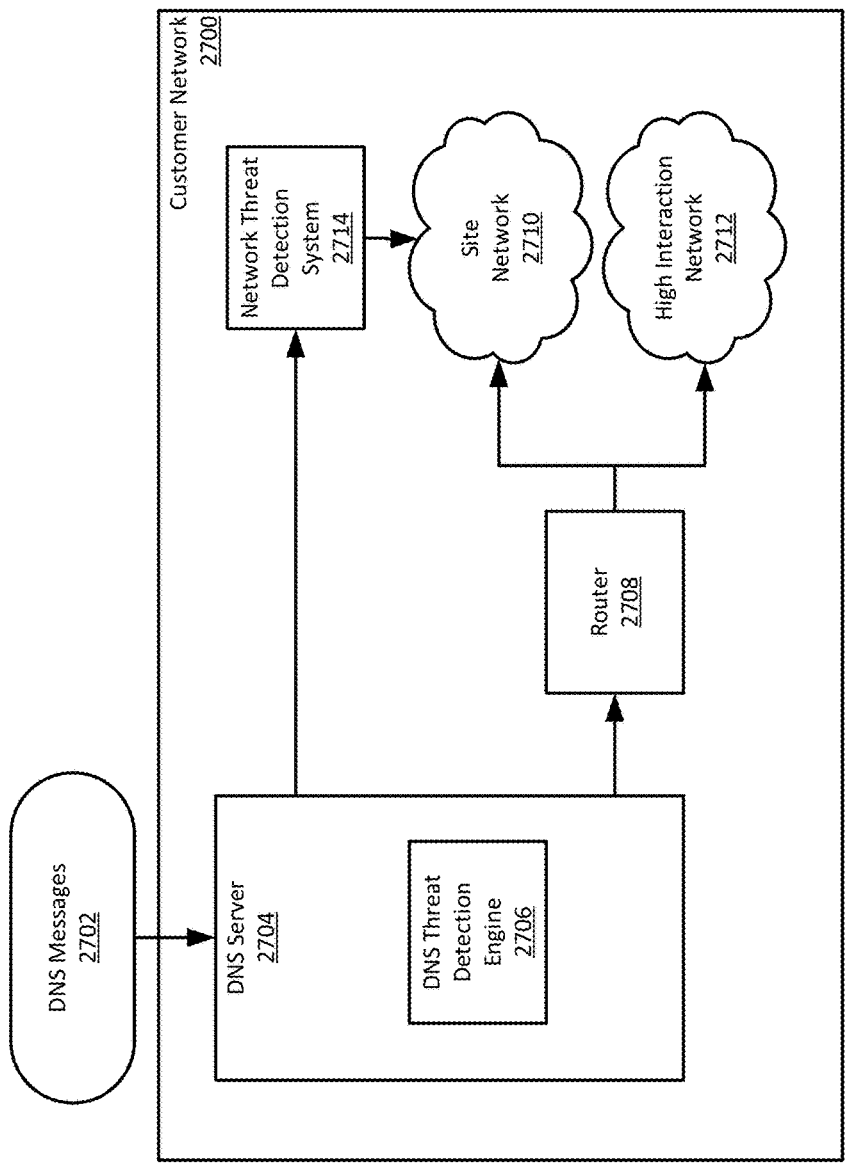
FIG. 27 illustrates example of a customer network that includes a DNS threat detection engine in a DNS server.

FIG. 27 illustrates example of a customer network 2700 that includes a DNS threat detection engine 2706 in a DNS server 2704. The customer network 2700 in this example includes a site network 2710, a network threat detection system 2714, and a high-interaction network 2712. In the illustrated example, a router 2708 can manage network traffic between the DNS server 2704, the site network 2710, and the high-interaction network 2712.

In the example illustrated in FIG. 27, the customer network 2700 includes a DNS server 2704 that hosts the DNS threat detection engine 2706. The DNS server 2704 can receive to both inbound and outbound DNS messages 2702, where "inbound" means coming from a source outside the customer network 2700 and "outbound" means addressed to a destination outside of the customer network 2700. The customer network 2700 may have additional DNS servers, which can also have a DNS threat detection engine 2706. In some cases, the customer network 2700 may not have any DNS server, and may rely on DNS services provided by an ISP and/or DNS servers in neighboring networks. In these cases, the DNS threat detection engine 2706 can reside in a system in the customer network 2700 that is communication with the DNS server. One example of such a system is a deception center.

In various implementations, the DNS threat detection engine 2706 can analyze the DNS messages 2702 received by the DNS server 2704, to determine whether the DNS messages 2702 include a threat to the customer network 2700. Once analyzed and processed, the DNS messages 2702 can be directed to a router 2708, where the DNS messages 2702 can be routed to the site network 2710 or the high-interaction network 2712. Which destination the DNS messages 2702 are routed to can be determined by the analysis conducted by the DNS threat detection engine 2706.

In various implementations, the site network 2710 can be in communication with a network threat detection system 2714 in the customer network 2700. The network threat detection system 2714 can be in further communication with the DNS server 2704 to receive data from DNS threat detection engine 2706 regarding DNS messages 2702. Using this data, in various implementations, the network threat detection system 2714 can deploy security mechanisms on the site network 2710 to track and analyze threats or attacks, as described further with respect to FIG. 29.

Figure 28:
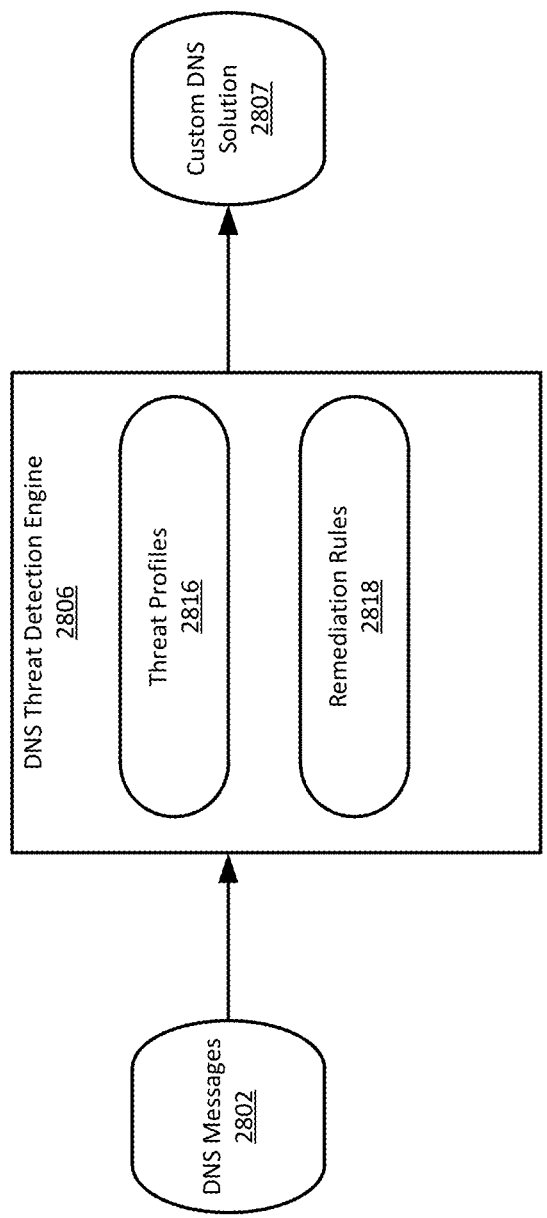
FIG. 28 illustrates an example of a DNS threat detection engine.

FIG. 28 illustrates an example of a DNS threat detection engine 2806. The example DNS threat detection engine 2806 can be implemented, for example, using a server on a network, or a group of servers on a network. Alternatively or additionally, in some implementations, the DNS threat detection engine 2806 can be implemented in a dedicated network appliance, such as a deception center.

The DNS threat detection engine 2806 can receive DNS messages 2802. The DNS messages 2802 can originate from outside of an enterprise network, or from within the enterprise network. A DNS server within the enterprise network would ordinarily handle the DNS messages 2802, including formulating a response or sending the DNS queries 2802 to another DNS server for resolution. In various implementations, the DNS threat detection engine 2806 examines DNS messages 2802 before the DNS messages 2802 are seen by the DNS server.

In various implementations, the DNS threat detection engine 2806 is configured to apply threat profiles 2816 and/or remediation rules 2818 to the DNS messages 2802. Threat profiles 2816 can include characteristics of a potential or actual network threat or a suspected or known network threat. For example, in some implementations, a threat profile 2816 can include an IP address or domain of a suspected or known network threat. In this example, when the source address of a DNS message 2802 is this IP address or domain, the DNS message 2802 can be flagged as suspect. As another example, a threat profile 2816 can include a geographic location, such that DNS messages 2802 that come from this geographic location are suspect. For example, a threat profile 2816 may identify that DNS queries originating in Russia are suspect. As another example, a threat profile 2816 can include a time at which a DNS message 2802 is received. For example, a threat profile 2816 may indicate that DNS messages received between 3:00 AM and 4:00 AM are suspect. As another example, a threat profile 2816 may indicate that a certain number of DNS messages received over a certain interval of time (e.g., a number of seconds, minutes, hours, or days) from a same source are suspect. In this example, the example DNS threat detection engine 2806 can count DNS messages 2802 received from a particular IP address, addressed to a particular subnet or domain, and/or all DNS messages 2802, among other examples. As another example, a threat profile 2816 may include examining DNS messages 2802 for non-existent domain names. For example, the example DNS threat detection engine 2806 can identify DNS queries that include domains that do not exist in the customer network, and flag these DNS queries as suspect.

In various implementations, the DNS threat detection engine 2806 can analyze a DNS message 2802 to identify one or more the threat profiles 2816 that apply the DNS message 2802. For example, the DNS threat detection engine 2806 can extract a subset of the DNS messages 2802 originating from the IP address "1.160.10.240," based on a threat profile identifying this IP address as being associated with a suspected or known network threat.

In various implementations, the threat profiles 2816 can be associated with remediation rules 2818. In these implementations, the DNS messages 2802 that are flagged by a threat profile 2816 can be processed according to a remediation rule 2818. A remediation rule 2818 can specify what should be done with the DNS message 2802. For example, a remediation rule 2818 can specify that a DNS message should be discarded, so that the DNS message 2802 never reaches its intended destination. As another example, a remediation rule 2818 can specify that a DNS message 2802 should be directed to the threat intelligence engine 2608 for analysis. As another example, a remediation rule 2818 can specify that a DNS message 2802 should be directed to a deception mechanism in the site network 2604. As another example, a remediation rule 2818 can specify that further DNS messages 2802 from a particular source or to a particular destination should be blocked by the firewall 2664. As another example, a remediation rule 2818 can specify that, for a domain that does not exist, a deception should be initiated that adopts the non-existent domain, and can respond to network traffic to the domain. In these and other examples, the DNS message 2802 may be modified according to the remediation rule 2818. Processed DNS messages can be output as a custom DNS solution 2807.

In various implementations, the custom DNS solution 2807 can divert DNS messages 2802 from an intended destination to a new destination. For example, the custom DNS solution 2807 can direct DNS messages 2802 to a high-interaction network for analysis. In this example, the custom DNS solution 2807 would include replacing the destination address for a DNS message with an address in the high-interaction network. For example, the high-interaction network can be configured to include a decoy DNS server, and the DNS message can be addressed to this decoy DNS server. In another example, the custom DNS solution 2807 can direct DNS message 2802 to deception system in the site network. In this example, the custom DNS solution 2807 can include substituting a network address for the deception system for the original destination address in the DNS message 2802.

When directed to the site network, security mechanisms can be deployed onto the site network by a network threat detection system, where the security mechanisms can monitor activity in the site network that may be related to the DNS messages 2802. In some implementations, the security mechanisms may be deployed based on characteristics of the DNS messages 2802, such as an originating IP addresses, an originating location, a time of receipt, domain names, and the like. For example, if a DNS message 2802 is for the domain name "ftp://private.google.com", a security mechanism can be deployed to the network system(s) that host the domain. In some implementations, the security mechanisms can be deployed based on the threat profile that flagged the DNS message 2802 as suspect.

In various implementations, an alert can be generated by the DNS threat detection engine 2806. The alert can inform a network administrator and/or the network's security infrastructure that some DNS messages 2802 have been correlated with a known or potential threat identified by a threat profile 2816. The alert may further specify the action that has been or will be taken in response, as specified, for example, by a remediation rule 2818 and/or custom DNS solution 2807. An alert may also be generated after the occurrence of any single event, e.g., after a domain name that does not exist in the network is seen in a DNS message 2802.

Figure 29:
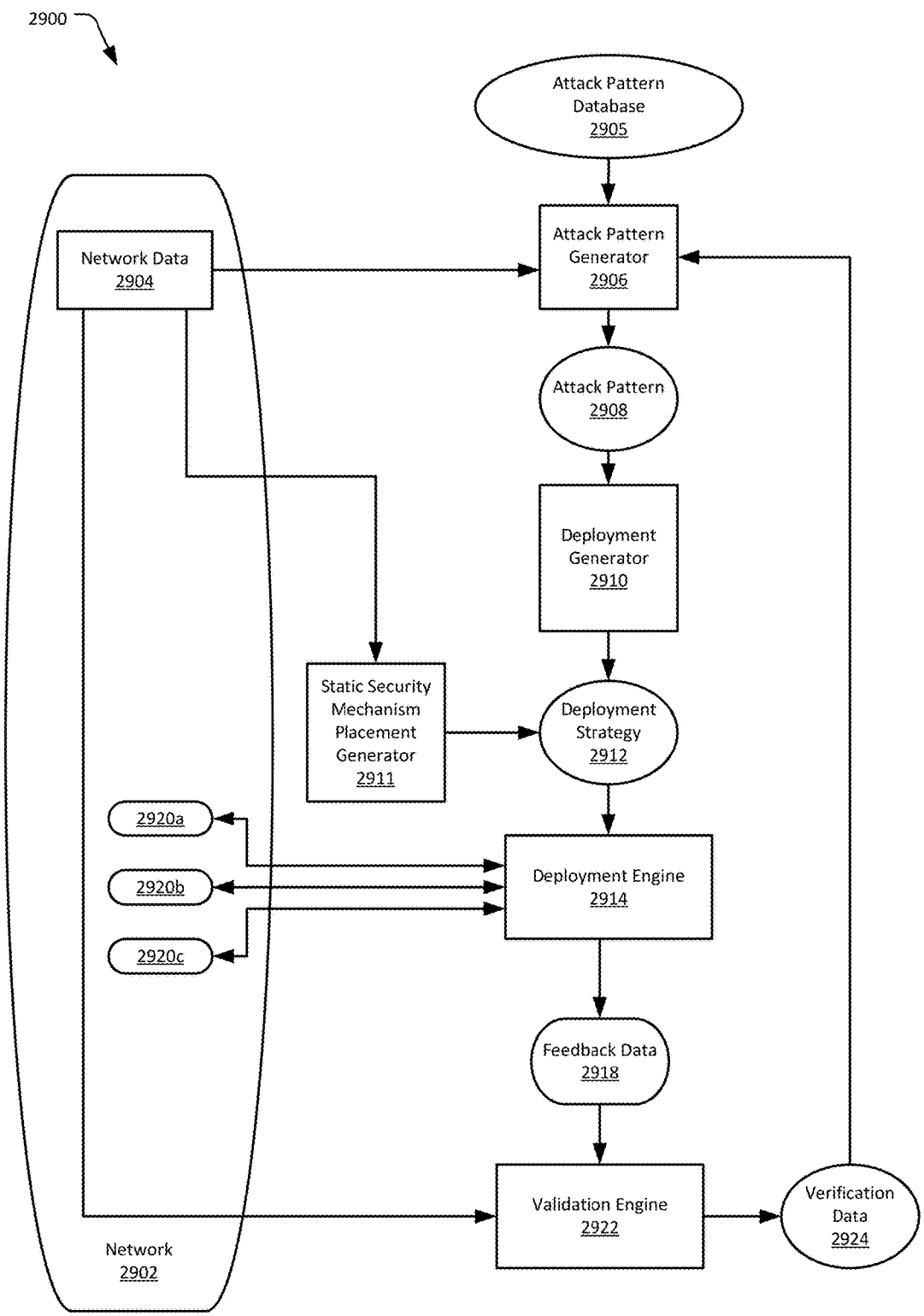
FIG. 29 illustrates an example of a network threat detection system.

FIG. 29 illustrates an example of a network threat detection system 2900 that can use characteristics of the subset of the DNS queries and/or an identified predetermined threat profile as inputs to deploy security mechanisms on a network 2902*a*. The security mechanisms may be used to locate, identify, and confirm a threat to the network 2902*a*.

Security mechanisms designed to deceive, sometimes referred to as "honeypots", may be used as traps to detect unauthorized use of a network. A deception-based security mechanism may be a computer attached to the network, a process running on one or more network systems, or a network site. A security mechanism may typically configured to offer services, real or emulated, to serve as bait for an attack on the network. Deception-based security mechanisms that take the form of data, also called "honey tokens," may be mixed in with real data in production servers in the network. Alternatively or additionally, emulated data may also be provided by emulated systems or services.

Deception-based security mechanisms are generally configured to appear as if they are legitimate parts of a network, but are, in fact, not part of the normal operation of the network. Consequently, normal activity on the network is not likely to access the security mechanisms. When a security mechanism does detect that it is being accessed, this access may possibly be by a malicious actor. In most cases, when an access occurs, the security mechanism may be configured to trigger an alert.

Deception-based security mechanisms may be placed statically into a network. This means that the location of the security mechanisms may be fixed in the network or within pre-determined parameters (e.g., a fileserver or compute server). The security mechanisms may be changed manually by a human system administrator, or automatically by fixed rules. In some cases, a static security mechanism may only be able to raise an alert when it is accessed unexpectedly, and may not be able to provide further information, or otherwise confirm that an attack has happened. Furthermore, static security mechanisms may not be able to adjust to changing conditions in the network. Furthermore, once a static security mechanism is identified by a malicious actor, the security mechanism can thereafter be avoided.

Security mechanisms may instead be placed in a targeted and dynamic fashion. Security mechanisms may be deployed in response to alerts raised in response to activity in the network. Furthermore, the security mechanisms may be selected and placed specifically to attract the attention of a possible attacker. The network threat detection system may also use security mechanisms to more effectively confirm that suspect activity is an actual attack. Security mechanisms may be deployed, removed, modified, or replaced in response to activity in the network, until sufficient information is gathered to confirm that an attack is, in fact, taking place.

Various security mechanisms exist for detecting and possibly stopping threats to a network. One category of security mechanisms may be described as deception systems. One type of deception system emulates a network resource, such as a server in the network or a service provided by the network. These types of deception systems may be referred to as "honeypots." These deception systems are intended to present themselves as a target for an attack. Because these deceptions systems only emulate network resources, legitimate users of the network are not likely to access them. Hence, access to a deception system may indicate a potential threat. Upon perceiving a potential threat, a deception system may raise an alert. The alert may be received and addressed by a human network administrator or by a security system provided for the network. Deception systems and other security mechanisms are described in further detail below.

The various components of the threat detection system 2900 may be implemented as discreet hardware components, as software components executing on different computing systems, as software components executing on one computing system, or as a combination of hardware components and software components in one or multiple computing systems. The threat detection system 2900 can be implemented on an enterprise network, a cloud network, or a hybrid network.

The threat detection system 2900 of FIG. 29 may be monitoring a network 2902*a*, which can also be an enterprise network, a cloud network, or a hybrid network. The network 2902*a* may include various interconnected network and client devices. As illustrated in FIG. 29, a static security mechanism placement generator 2911 and an attack pattern generator 2906 may collect network data 2904 from the network 2902*a*. This network data 2904 may come from various sources in the network. For example, the network data 2904 may include characteristics of a suspicious subset of DNS queries and/or an identified predetermined threat profile for a suspicious subset of DNS queries, as received from a DNS threat detection engine. The network data 2904 may be structured or unstructured. The network data 2904 may be stored locally or in the cloud.

The static security mechanism placement generator 2911 determines a selection and placement of static security mechanisms in network 2902a using network data 2904, and provides that selection and placement as a deployment strategy 2912. The static security mechanism placement generator 2911 may use a variety of data science techniques to generate a deployment strategy 2912. For example, the static security mechanism placement generator 2911 may build and implement a scoring model. In this example, the static security mechanism placement generator 2911 may take various network data 2904 as input, including traffic patterns (density, encrypted/non-encrypted, ratio, etc.), the value of the assets in each subnet, previous attack patterns, current alerts from other security products, and the like. A scoring model can be built based on some or all of these inputs, and the model can be used to determine the number, position, and type of static security mechanisms to deploy. The scoring model may be revised periodically based on new or modified inputs and the effectiveness of the previous deployment strategy 2912.

In an additional or alternative example, the static security mechanism placement generator 2911 may build and implement a probabilistic model. In this example, the static security mechanism placement generator 2911 may build correlation statistics, for example, between traffic patterns, asset types (and numbers) and the previous attack patterns, either in the same network 2902a or from threat intelligence gathered from a global database of attacks (not shown). These correlation statistics may be used to determine the probability of attack in different subnets and the type of target and pattern of attack. These probabilities may be used to determine the placement of the static security mechanisms.

The attack pattern generator 2906 may monitor and/or analyze the network data 2904 in conjunction with previous attack pattern data in the previous attack pattern database 2905 to determine if a network abnormality has occurred or is occurring. In one example, the attack pattern generator 2906 uses data science techniques to analyze the network data 2904. An identified network abnormality may fall within acceptable network usage, or may indicate a potential network threat. In these cases, the attack pattern generator 2906 may identify or isolate the pattern of network behavior that describes the network abnormality. This pattern of behavior may be provided as a suspected attack pattern 2908 to a deployment generator 2910.

The deployment generator 2910 may analyze the suspected attack pattern 2908. For example, the deployment generator 2910 may use the suspected attack pattern 2908 to identify within the network data 2904 all movements and interactions of the source of the attack with the network 2902a. The deployment generator 2910 may further determine what should be done to confirm that an attack occurred or is in progress. The deployment generator 2910 may have access to various security mechanisms, such as are described in further detail below. The deployment generator 2910 may determine which of the security mechanisms are most likely to be attractive to potential threats. The deployment generator 2910 may further determine how and where in the network 2902a to use or deploy one or more security mechanisms. The deployment generator 2910 may produce one or more deployment strategies 2912 that each include one or more security mechanisms to deploy, as well as how and where in the network 2902a those security mechanisms should be deployed.

The deployment generator 2910 may employ one or more of a variety of data science techniques to analyze the attack pattern 2908 and adjust the deployment strategy 2912. These adjustments may be directed towards establishing more attractive traps for the particular potential threat, and/or towards obtaining more information about the particular potential threat. For example, the deployment generator 2910 may call for dynamically adjusting or changing the nature of an already deployed security mechanism 2920a-2920c. Alternatively or additionally, the deployment generator 2910 may determine that a security mechanism 2920a-2920c can be disabled or removed from the network 2902a. Alternatively or additionally, the deployment generator 2910 may cause different security mechanisms to be deployed. Alternatively or additionally, the deployment generator 2910 may change the deployment locations of the security mechanisms. These changes may be reflected in the deployment strategy 2912, and may be implemented by the deployment engine 2914.

The deployment strategy 2912 may be provided to a deployment engine 2914. The deployment engine may deploy one or more security mechanisms 2920a-2920c into the network 2902a in accordance with the deployment strategy 2912. The deployment strategy 2912 may call for placing the security mechanisms 2920a-2920c at locations in the network 2902a where they are most likely to attract the attention of potential threats. For example, the security mechanisms 2920a-2920c could be placed in high traffic areas of the network 2902a, or portions of the network 2902a having high value or sensitive assets, as indicated by network data 2904.

Once placed in the network 2902a, the security mechanisms 2920a-2920c may begin collecting data about activity or interactions related to them. For example, the security mechanisms 2920a-2920c may record each time that they are accessed, what was accessed, and, with sufficient information, who accessed them (i.e., the source of the access or interaction). The security mechanisms 2920a-2920c may provide this data to the deployment engine 2914.

The deployment engine 2914 may provide feedback data 2918 from the security mechanisms 2920a-2920c to a validation engine 2922. Feedback data 2918 represents the data about interactions related to the security mechanisms 2920a-2920c. The validation engine 2922 may analyze the feedback data 2918 from the security mechanisms 2920a-2920c in conjunction with the network data 2904 to identify network abnormalities and to determine whether any actual attacks have occurred or are in progress. In some cases, network abnormalities on the network 2902a may be legitimate activity. For example, a network bot (e.g., an automated system) may be executing a routine walk of the network. In this example, the network bot may be accessing each Internet Protocol (IP) address available, and thus may also access a security mechanism deployed to resemble a network device using a specific IP address. In other cases, however, a network abnormality may be a port scanner that is attempting to collect IP addresses for illegitimate purposes. The validation engine 2922 may use the feedback data 2918 in conjunction with the network data 2904 to confirm that the activity is malicious. The validation engine 2922 may provide verification data 2924, which may include confirmed attacks in some implementations. Thus, the verification data 2924 may, in some cases, confirm that an attack has occurred or is occurring, and may include some or all of feedback data 2918. In other cases, the verification data 2924 may indicate that no attack has happened, or that more information is needed.

The validation engine 2922 may use one or a variety of data science techniques to implement its functions. For example, the validation engine 2922 may implement statistical analysis with pattern matching to generate an attack signature if one or more interactions are part of a new confirmed attack, or may use an existing attack signature to confirm one or more interactions as an attack. Specifically, the validation engine 2922 may detect the signature of the source of the attack to confirm an attack. Specifically, when an attack is identified, certain data may be gathered to determine the particular combination of network packets and services accessed, payloads delivered, files changed on the server, etc. From all the activities on the network and on the server, statistical analysis may be used to precisely identify the anomalous activity that belongs to this attack. The signature of the source of the attack pattern represents the minimal activity that identifies the attack. For example, the activity may be the payload contained in one network packet. In another example, the activity may be the changes to the registry on the server. In still another example, the activity may be a user access.

The validation engine 2922 may alternatively or additionally include a data mining engine which may trace back an attack pattern using attack data, such as who tried to access which service at what port and at what time. For example, if an access is noticed at a security mechanism, certain data may be gathered, such as a user identifier associated with the access, the time of the access, the machine from where the access occurred, the type of service accessed, etc. The data mining engine may then trace back the user access pattern from the machine where the access occurred. The data mining engine may also determine if the accessed machine, as well as other machines, have been compromised.

The validation engine 2922 may alternatively or additionally include a pattern matching engine that may be used in conjunction with big data analysis to analyze the entire network to determine if the attack pattern or signature is observed anywhere else in the network. The network traffic and host data may be quite large, in the gigabytes or terabytes range. Big data analysis comprises a set of computational methods to analyze data of such large volume. The signature may be developed by statistical analysis, as described above. In some implementations, the network may be analyzed along the time axis.

The verification data 2924 may be provided to the attack pattern generator 2906. The attack pattern generator 2906 may analyze the verification data 2924 to adjust the suspected attack pattern 2908 provided to the deployment generator 2910. The threat detection system 2900 may continue monitoring the network 2902 until one or more conditions are satisfied. For example, the threat detection system 2900 may continue monitoring the network 2902 until it is explicitly stopped or paused by a user. If no active threats are detected by the threat detection system 2900, the static security mechanism placement generator 2911 may place and activate new static security mechanisms, and further monitoring may be paused until an interaction has occurred with one of the placed security mechanisms. Monitoring of the network 2902 may also be paused or minimized based on the load on the threat detection system 2900 and network 2902. For example, the priority threshold of the suspected attacks, for which the security mechanisms are deployed, may be adjusted up or down so as to not affect the regular operation of the network 2902.

Figure 30:
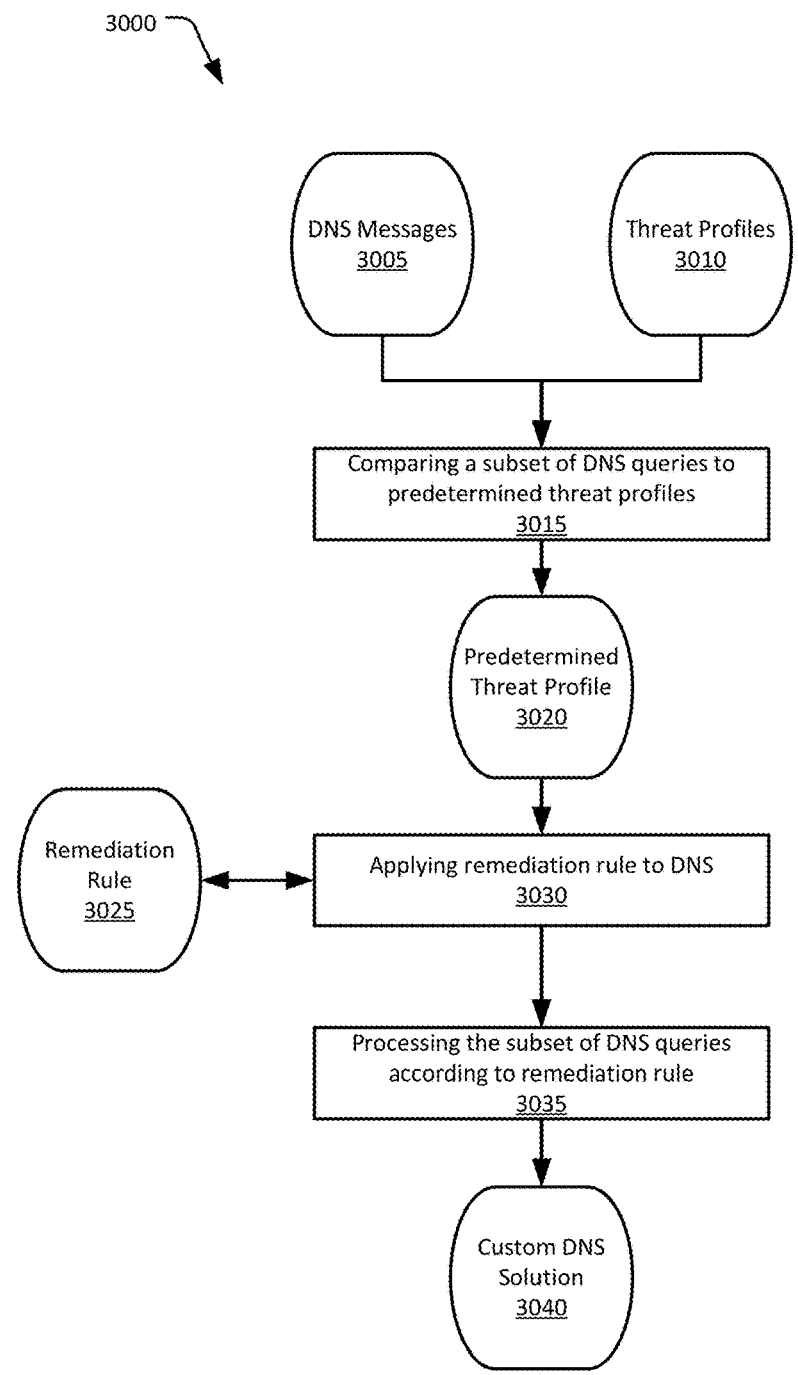
FIG. 30 illustrates an example of a process of for monitoring traffic with a DNS threat detection engine.

FIG. 30 illustrates an example of a process 3000 of for monitoring traffic with a DNS threat detection engine. At step 3015, DNS messages 3005 are compared to threat profiles 3010. When a DNS message 3005 include characteristics identified by a threat profile 3010 as suspect, the particular threat profile 3020 can be identified by step 3015. The particular threat profile 3020 can include one or more characteristics of a potential or actual network threat, or a suspected or known network threat that may be associated with the DNS messages 3005.

At step 3030, a remediation rule 3025 can be applied to the DNS messages 3005 identified at step 3015. The remediation rule 3025 can correspond to the particular threat profile 3020, and may specify one or more actions to be taken. For example, the particular threat profile 3020 may single out DNS queries originating in Russia, and the remediation rule 3025 may specify that those DNS queries be redirected to a high-interaction network.

At step 3035, the DNS messages 3005 can be processed according to the remediation rule 3025 to provide a custom DNS solution 3040. The custom DNS solution 3040 may divert the DNS messages 3005 from intended destinations. In the above example, the custom DNS solution 3040 may provide an IP address that directs the DNS messages 3005 to the high-interaction network. In another example, the custom DNS solution 3040 may direct the DNS messages 3005 to deception mechanisms in the site network.

Specific details were given in the preceding description to provide a thorough understanding of various implementations of systems and components for network threat detection and analysis. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for network threat detection and analysis.

As used below, any reference to a series of examples is to be understood as a reference to each of those examples disjunctively (e.g., "Examples 1-4" is to be understood as "Examples 1, 2, 3, or 4").

Example 1 is a method, the method comprising receiving, at a network device on a network, a Domain Name System (DNS) message. The network device includes a DNS threat detection engine. A DNS threat detection engine includes one or more threat profiles, where a threat profile includes one or more characteristics of a network threat associated with DNS. A threat profile is associated with a remediation rule. The method further includes determining that the DNS message includes a characteristic associated with a particular threat profile from the one or more threat profiles. The method further includes determining a new destination for the DNS message, where the new destination is determined using a remediation rule associated with the particular threat profile. The method further includes modifying the DNS message, where modifying includes changing an original destination for the DNS message to the new destination. The method further includes transmitting the modified DNS message, wherein, when the modified DNS message is received at the new destination, the modified DNS message is analyzed to determine whether the DNS message is associated with a threat to the network.

Example 2 is the method of example 1, where the new destination includes a high-interaction network Example 3 is the method of example 1-2, where the new destination includes a decoy DNS server.

Example 4 is the method of examples 1-3, the method further including configuring a new deception mechanism, where configuring includes using the characteristic associated with the particular threat profile. The method further includes deploying the new deception mechanism on the network.

Example 5 is the method of examples 1-4, the method further includes configuring a new deception mechanism, where configuring includes using the particular threat profile. The method further includes deploying the new deception mechanism on the network.

Example 6 is the method of examples 1-5, the method further including identifying a domain name associated with the DNS message. The method further includes determining that the domain name does not exist in the network.

Example 7 is the method of examples 1-6, wherein the DNS message is received from a source outside the network.

Example 8 is the method of examples 1-7, wherein the DNS message is received from a source inside the network.

Example 9 is the method of examples 1-8, wherein the original destination for the DNS message is a DNS server in the network.

Example 10 is a network device. The network device includes one or more processors and a non-transitory computer-readable medium. The non-transitory computer-readable medium includes instructions that, when executed by the one or more processors, cause the one or more processors to perform operations including steps according the method(s) of examples 1-9.

Example 11 is a computer-program product tangibly embodied in a non-transitory machine-readable storage medium. The computer-program product includes instructions that, when executed by one or more processors, cause the one or more processors to perform the method(s) of examples 1-9.

What is claimed is:

1. A computer-implemented method, comprising:
   receiving, at a network device on a network, a Domain Name System (DNS) message, wherein the network device includes a DNS threat detection engine, wherein the DNS threat detection engine includes one or more threat profiles, wherein a threat profile includes one or more characteristics of a network threat associated with DNS, and wherein the threat profile is associated with a remediation rule;
   determining that the DNS message includes a characteristic associated with a particular threat profile from the one or more threat profiles;
   determining a new destination for the DNS message, wherein the new destination is determined using a particular remediation rule associated with the particular threat profile;
   modifying the DNS message, wherein modifying includes changing an original destination for the DNS message to the new destination;
   transmitting the modified DNS message, wherein, when the modified DNS message is received at the new destination, the modified DNS message is analyzed to determine whether the DNS message is associated with a threat to the network;
   configuring a new deception mechanism, wherein configuring includes using the characteristic associated with the particular threat profile; and
   deploying the new deception mechanism on the network.

2. The method of claim 1, wherein the new destination includes an emulated network.

3. The method of claim 1, wherein the new destination includes a decoy DNS server.

4. The method of claim 1, wherein configuring includes using the particular threat profile.

5. The method of claim 1, further comprising:
   identifying a domain name associated with the DNS message; and
   determining that the domain name does not exist in the network.

6. The method of claim 1, wherein the DNS message is received from a source outside the network.

7. The method of claim 1, wherein the DNS message is received from a source inside the network.

8. The method of claim 1, wherein the original destination for the DNS message is a DNS server in the network.

9. A network device on a network, comprising:
   one or more processors; and
   a non-transitory computer-readable medium including instructions that cause one or more processors to perform operations including:
   receiving a Domain Name System (DNS) message, wherein the network device includes a DNS threat detection engine, wherein the DNS threat detection engine includes one or more threat profiles, wherein a threat profile includes one or more characteristics of a network threat associated with DNS, and wherein the threat profile is associated with a remediation rule;
      determining that the DNS message includes a characteristic associated with a particular threat profile from the one or more threat profiles;
      determining a new destination for the DNS message, wherein the new destination is determined using a particular remediation rule associated with the particular threat profile;
      modifying the DNS message, wherein modifying includes changing a destination for the DNS message to the new destination;
      transmitting the modified DNS message, wherein, when the modified DNS message is received at the new destination, the modified DNS message is analyzed to determine whether the DNS message is associated with a threat to the network; and
      configuring a new deception mechanism, wherein configuring includes using the characteristic associated with the particular threat profile; and
      deploying the new deception mechanism on the network.

10. The network device of claim 9, wherein the new destination includes an emulated network.

11. The network device of claim 9, wherein the new destination includes a decoy DNS server.

12. The network device of claim 9, wherein configuring includes using the particular threat profile.

13. The network device of claim 9, wherein the non-transitory computer-readable medium further includes instructions that, cause the one or more processors to perform operations including:
   identifying a domain name associated with the DNS message; and
   determining that the domain name does not exist in the network.

14. The network device of claim 9, wherein the DNS message is received from a source outside the network.

15. The network device of claim 9, wherein the DNS message is received from a source inside the network.

16. The network device of claim 9, wherein the destination for the DNS message is a DNS server in the network.

17. A computer-program product tangibly embodied in a non-transitory machine-readable storage medium, including instructions that cause one or more processors of a network device on a network to:
   receive a Domain Name System (DNS) message, wherein the network device includes a DNS threat detection engine, wherein the DNS threat detection engine includes one or more threat profiles, wherein a threat profile includes one or more characteristics of a network threat associated with DNS, and wherein the threat profile is associated with a remediation rule;

determine that the DNS message includes a characteristic associated with a particular threat profile from the one or more threat profiles;

determine a new destination for the DNS message, wherein the new destination is determined using a particular remediation rule associated with the particular threat profile;

modify the DNS message, wherein modifying includes changing a destination for the DNS message to the new destination;

transmit the modified DNS message, wherein, when the modified DNS message is received at the new destination, the modified DNS message is analyzed to determine whether the DNS message is associated with a threat to the network; and configure a new deception mechanism, wherein configuring includes using the characteristic associated with the particular threat profile; and deploy the new deception mechanism on the network.

18. The computer-program product of claim 17, wherein the new destination includes emulated network.

19. The computer-program product of claim 17, wherein the new destination includes a decoy DNS server.

20. The computer-program product of claim 17, wherein configuring includes using the particular threat profile.

* * * * *

UNITED STATES PATENT AND TRADEMARK OFFICE
CERTIFICATE OF CORRECTION

PATENT NO. : 10,362,057 B1
APPLICATION NO. : 15/615403
DATED : July 23, 2019
INVENTOR(S) : Erik Wu Page 1 of 1

It is certified that error appears in the above-identified patent and that said Letters Patent is hereby corrected as shown below:

On the Title Page

Add --Related U.S. Application Data
(60) Provisional application No. 62/345,976, filed Jun. 6, 2016.--

In the Specification

Column 1, Line 7, delete "63/345,976" add --62/345,976--

Column 1, Line 7 after "Jun. 6, 2016," add --entitled "Enterprise DNS Analysis"--

Column 1, Line 7-8 after "Enterprise DNS Analysis" delete "which is incorporated herein by reference in its entirety"

Signed and Sealed this
Fifteenth Day of October, 2019

Andrei Iancu
*Director of the United States Patent and Trademark Office*